United States Patent
Kiwaki et al.

(10) Patent No.: US 9,033,012 B2
(45) Date of Patent: May 19, 2015

(54) TIRE HAVING A CIRCUMFERENTIAL GROOVE INCLUDING A FIRST GROOVE PORTION AND A SECOND GROOVE PORTION

(75) Inventors: Yukihiro Kiwaki, Higashimurayama (JP); Takaaki Kojima, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 145 days.

(21) Appl. No.: 13/510,472

(22) PCT Filed: Oct. 21, 2010

(86) PCT No.: PCT/JP2010/068599
§ 371 (c)(1),
(2), (4) Date: Jul. 20, 2012

(87) PCT Pub. No.: WO2011/062026
PCT Pub. Date: May 26, 2011

(65) Prior Publication Data
US 2012/0273106 A1    Nov. 1, 2012

(30) Foreign Application Priority Data

Nov. 18, 2009  (JP) ................ 2009-263284
Dec. 4, 2009   (JP) ................ 2009-276252
Dec. 4, 2009   (JP) ................ 2009-276254

(51) Int. Cl.
*B60C 11/00*  (2006.01)
*B60C 11/04*  (2006.01)
(Continued)

(52) U.S. Cl.
CPC ......... *B60C 11/0302* (2013.04); *B60C 11/0306* (2013.04); *B60C 11/12* (2013.01); *B60C 11/13* (2013.01); *B60C 2011/0388* (2013.04); *B60C 2011/1361* (2013.04); *Y10S 152/901* (2013.01)

(58) Field of Classification Search
CPC ............ B60C 11/13; B60C 2011/0355; B60C 2011/0362; B60C 2011/0367; B60C 2011/0369; B60C 2011/1361; B60C 11/1353; B60C 11/045; B60C 11/1369
USPC ............. 152/209.25, 209.18, 209.19, 209.22, 152/209.21, 209.15, DIG. 4, DIG. 3
See application file for complete search history.

(56) References Cited

U.S. PATENT DOCUMENTS 3,727,661 A    4/1973  Hoke
4,423,760 A *  1/1984  Treves et al. ............. 152/209.21
(Continued)

FOREIGN PATENT DOCUMENTS

JP    09048216 A  *  2/1997
JP    2001-30718 A     2/2001
(Continued)

OTHER PUBLICATIONS

Machine Translation: JP09-048216; Ikeki, Shigetaka; No date.*
(Continued)

*Primary Examiner* — Steven D Maki
*Assistant Examiner* — Kendra Shin
(74) *Attorney, Agent, or Firm* — Sughrue Mion, PLLC

(57) ABSTRACT

A tire 1 comprises rib-shaped land portions 20 extending in a tire circumferential direction TC and has a circumferential groove 30 adjacent to the land portions 20 and extending in the tire circumferential direction TC. Tread contact surfaces 10 of the land portions 20 form smooth surfaces with no gap when a normal load is applied and the tread contact surfaces are in contact with a road surface. The circumferential groove 30 includes a shallow groove portion 40 extending in the tread-width direction TW, and a deep groove portion 50 adjacent to the shallow groove portion 40 in the tire circumferential direction and extending in the tread-width direction. A deep groove portion 50 is recessed more inwardly in a tire radial direction TR than the shallow groove portion 40 with a groove bottom 40c of the shallow groove portion 40 being an upper end of the deep groove portion 50.

8 Claims, 39 Drawing Sheets

(51) Int. Cl.
  *B60C 11/113* (2006.01)
  *B60C 11/03* (2006.01)
  *B60C 11/12* (2006.01)
  *B60C 11/13* (2006.01)

(56) References Cited

U.S. PATENT DOCUMENTS

| | | | | |
|---|---|---|---|---|
| 4,739,812 | A * | 4/1988 | Ogawa et al. | 152/209.14 |
| 6,488,064 | B1 * | 12/2002 | Radulescu | 152/209.14 |
| 7,350,552 | B2 * | 4/2008 | Radulescu | 152/209.18 |
| 2002/0092591 | A1 * | 7/2002 | Cortes | 152/209.18 |
| 2005/0126670 | A1 * | 6/2005 | Godefroid | 152/209.22 |
| 2006/0090828 | A1 | | 5/2006 | Yamane |
| 2007/0006955 | A1 | | 1/2007 | Fukunaga |
| 2010/0200134 | A1 | | 8/2010 | Murata |

FOREIGN PATENT DOCUMENTS

| | | |
|---|---|---|
| JP | 2004-66922 A | 3/2004 |
| JP | 2004-352023 A | 12/2004 |
| JP | 2005-170381 A | 6/2005 |
| JP | 2009-40156 A | 2/2009 |
| WO | 2004/048130 A1 | 6/2004 |

OTHER PUBLICATIONS

International Search Report for PCT/JP2010/068599 dated Jan. 25, 2011.

European Search Report issued in European Application No. 10831422.0 dated Jul. 9, 2013.

Japanese Office Action issued in Japanese Application No. 2009-181623 dated Aug. 6, 2013.

* cited by examiner

FIG. 3
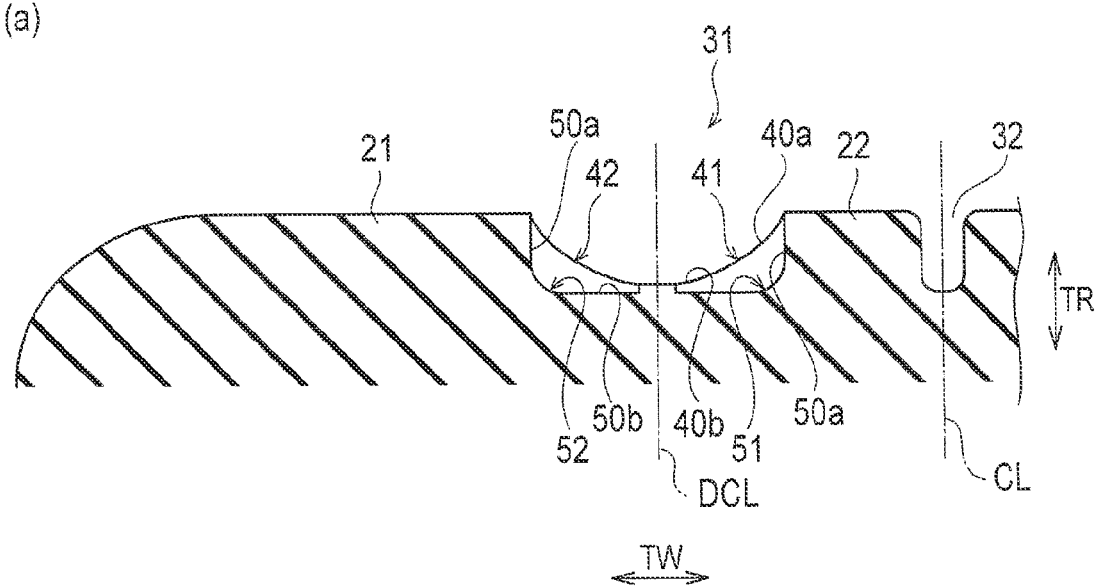
(a)
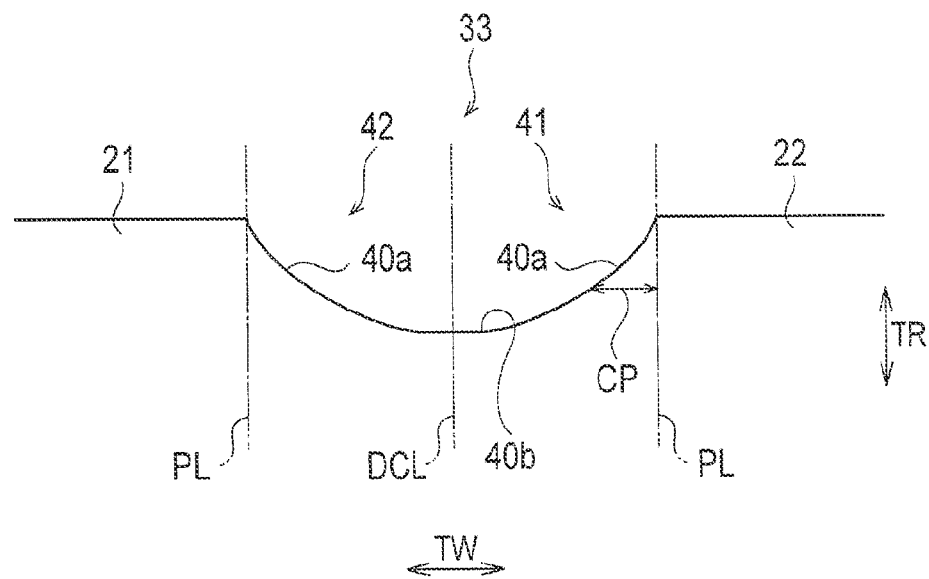
(b)

FIG. 13
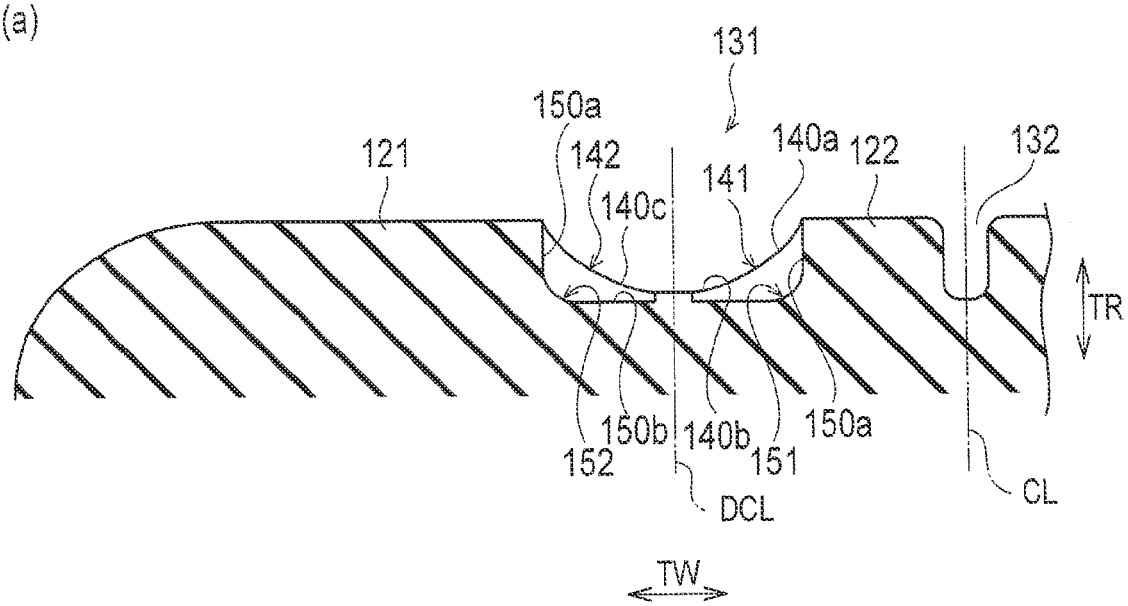
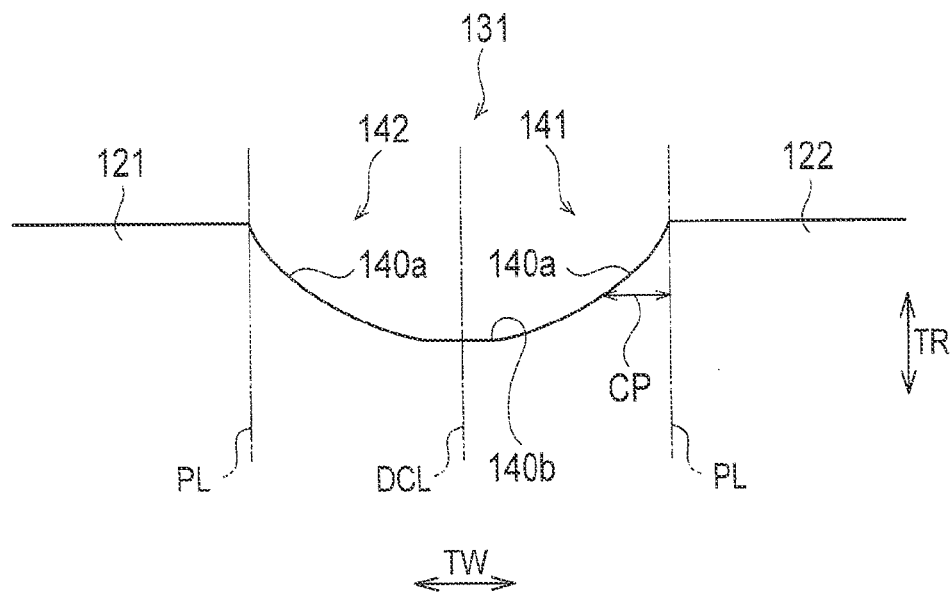

FIG. 21
(a)
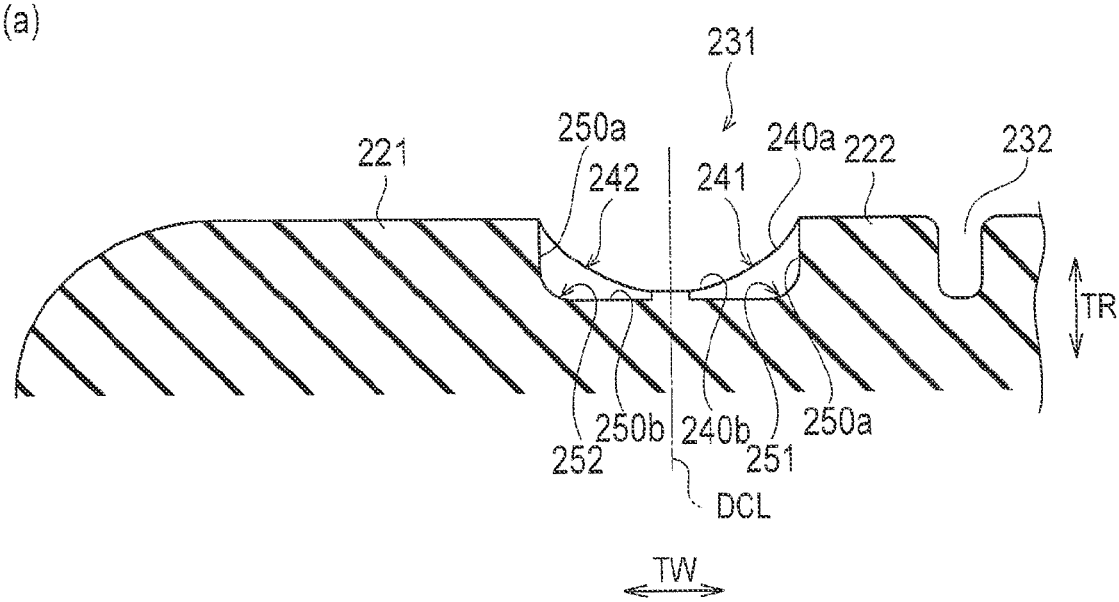
(b)
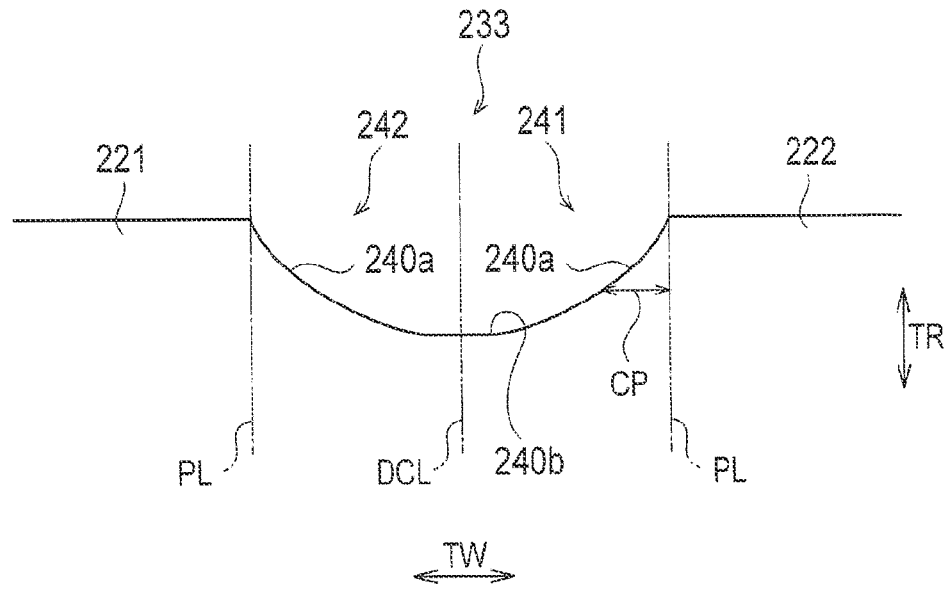

FIG. 29
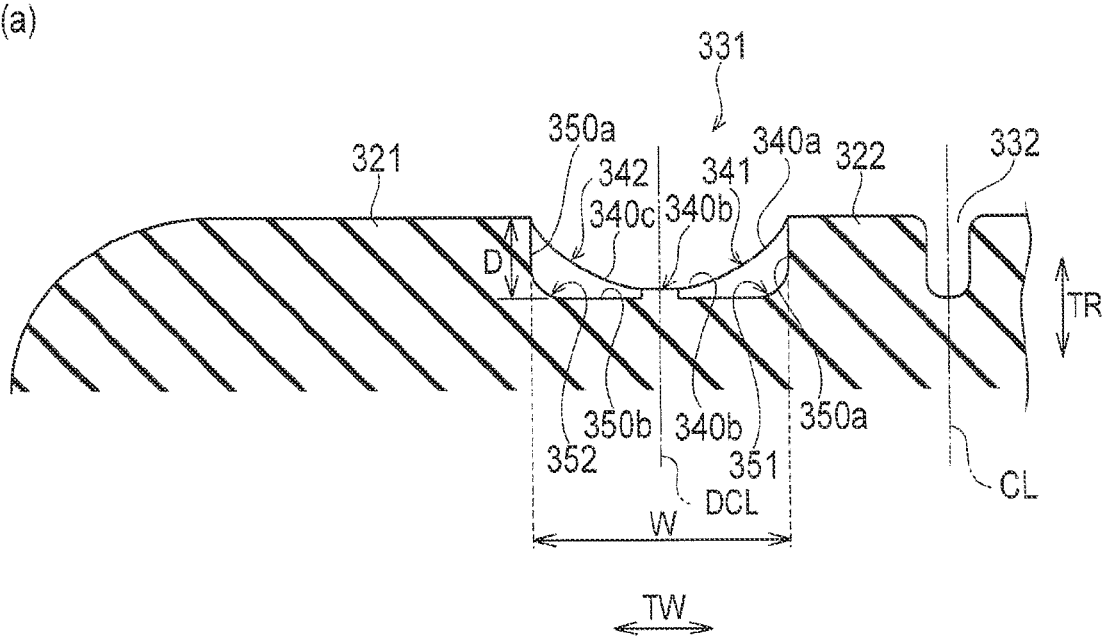
(a)
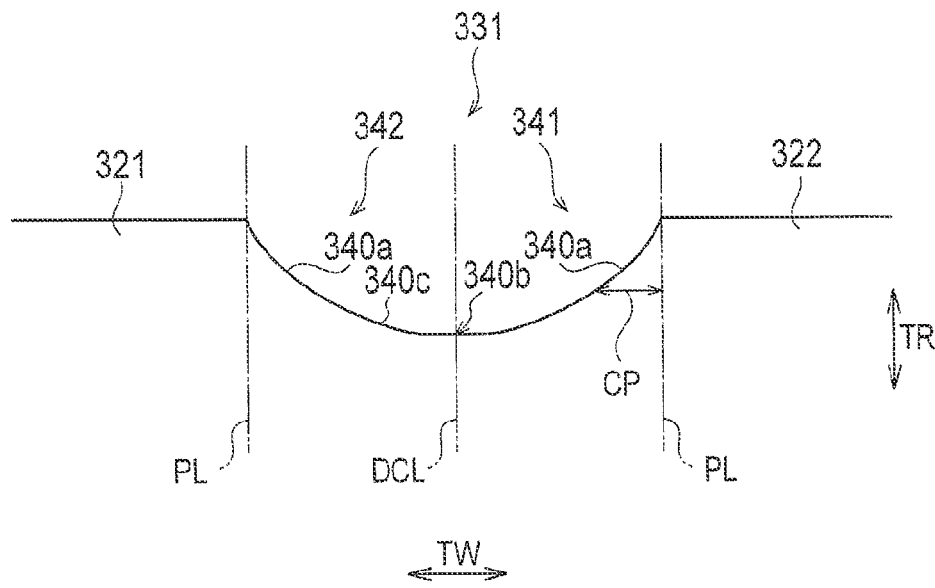
(b)

FIG. 36

| | Comparative example | Example |
|---|---|---|
| Structure of circumferential groove | ↓10° R3 ↑8.4mm | ↓10° R1.5 R3 ↑8.4mm ↑0.5mm |
| Braking performance (brand-new) | 100 | 102 |
| Braking performance (worn) | 100 | 104 |

FIG. 37

| | Comparative example | Example |
|---|---|---|
| Structure of circumferential groove | 10° R3 8.4mm | 10° R1.5 R3 8.4mm 0.5mm |
| Braking performance | 100 | 104 |

FIG. 38
| | Comparative example | Example |
|---|---|---|
| Structure of circumferential groove | 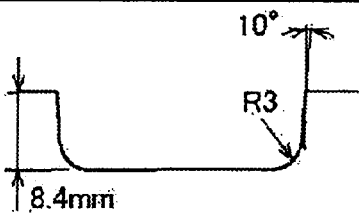 | 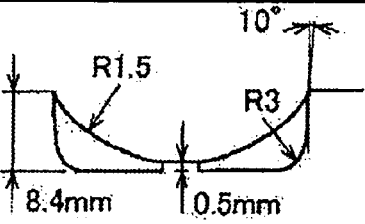 |
| Braking performance (brand-new) | 100 | 101 |
| Braking performance (worn) | 100 | 103.5 |

FIG. 39

| | Comparative example | Example |
|---|---|---|
| Structure of circumferential groove | ↕8.4mm, 10°, R3 | ↕8.4mm, ↕0.5mm, 10°, R1.5, R3 |
| Braking performance (brand-new) | 100 | 104 |
| Braking performance (worn) | 100 | 106 |

TIRE HAVING A CIRCUMFERENTIAL GROOVE INCLUDING A FIRST GROOVE PORTION AND A SECOND GROOVE PORTION

CROSS REFERENCE TO RELATED APPLICATIONS

This application is a National Stage of International Application No. PCT/JP2010/068599 filed Oct. 21, 2010, claiming priority based on Japanese Patent Application Nos. 2009-263284 filed Nov. 18, 2009, 2009-276252 filed Dec. 4, 2009, and 2009-276254 filed Dec. 4, 2009, the contents of all of which are incorporated herein by reference in their entirety.

TECHNICAL FIELD

The present invention relates to a tire including rib-shaped land portions extending in a tire circumferential direction, the tire having a circumferential groove formed which is adjacent to the land portion and which extends in the tire circumferential direction.

BACKGROUND ART

Conventionally, tires to be fitted to passenger automobiles and the like have widely employed a tread pattern in which lateral grooves extending in a tread width direction are formed in rib-shaped land portions extending in a tire circumferential direction, in order to improve the braking performance. For example, a tire is known in which many auxiliary lateral grooves are formed in rib-shaped land portions, the auxiliary lateral grooves extending in the tread width direction and dividing the land portions (For example, Patent Document 1).

In such a tire, a so-called edge component is increased by the many auxiliary lateral grooves and the braking performance is thereby improved.

PRIOR ART DOCUMENT

Patent Document

PATENT DOCUMENT 1: Japanese Patent Application Publication No. 2004-66922 (page 4, FIG. 1)

SUMMARY OF THE INVENTION

However, tires employing the tread pattern as described above have the following problems. Specifically, the rib-shaped land portions are divided into multiple blocks by the auxiliary lateral grooves. In an initial stage of wear of tire, the block-heights are large and the depths of the auxiliary lateral grooves are large. Accordingly, the block stiffness (shear stiffness) of the land portions is low and end portions of blocks on sides close to the auxiliary lateral grooves deform to turn up during braking of a vehicle fitted with the tire. The braking performance thereby deteriorates.

In view of this problem, an object of the present invention is to provide a tire which can exert a more stable braking performance from the initial stage of wear to a time after a certain amount of wear.

To solve the aforementioned problem, the present invention has following characteristics. First, a characteristic of the present invention is a tire (e.g., pneumatic tire 1) comprising rib-shaped land portions (land portions 20) extending in a tire circumferential direction (tire circumferential direction TC), the tire having a circumferential groove (circumferential groove 30) formed which is adjacent to the land portions and which extends in the tire circumferential direction, wherein contact surfaces (tread contact surfaces 10) of the land portions form smooth surfaces with no gap when a normal load is applied to the tire and the contact surfaces are in contact with a road surface, the circumferential groove includes: a first groove portion (shallow groove portions 40) formed between adjacent ones of the land portions; and a second groove portion (deep groove portions 50) being adjacent to the first groove portion in the tire circumferential direction and formed between the adjacent land portions, and the second groove portion is recessed more inwardly in a tire radial direction (tire radial direction TR) than the first groove portion with a groove bottom (groove bottom 40c) of the first groove portion being an upper end of the second groove portion.

In the characteristic described above, the contact surface in the land portion forms smooth surfaces with no gap when the normal load is applied to the tire and the contact surface is in contact with the road surface. This secures the block stiffness (shear stiffness) of the land portions compared to the case where gaps are formed when the contact surface in the land portions is in contact with the road surface. Accordingly, in an initial stage of wear of the tire, deformation of the land portions is suppressed during braking of a vehicle fitted with the tire and the braking performance can be thereby improved.

Moreover, the second groove portion is recessed more inwardly in the tire radial direction than the first groove portion with the groove bottom of the first groove portion being the upper end of the second groove portion. In this configuration, the heights of the land portions are made low and the block stiffness of the land portions can be secured from the initial stage of wear to a time after a certain amount of wear. Accordingly, deformation of the land portions, which is caused due to low block stiffness of the land portions, is suppressed and an edge component is increased by the first groove portion and the second groove portion. Hence, the braking performance is improved.

As described above, the contact surface in the land portions forms smooth surfaces and the second groove portion is recessed more inwardly in the tire radial direction than the first groove portion. This allows the tire to exert a more stable braking performance from the initial stage of wear to the time after the certain amount of wear.

Another characteristic of the present invention is the tire according to the first characteristic of the present invention, wherein a sidewall (sidewall 40a) of at least the first groove portion among the first groove portion and the second groove portion is inclined such that a distance (distance CP) between the sidewall and a straight line (straight line PL) becomes longer toward a deepest portion (deepest portion 40b) of the first groove portion in a cross-sectional view taken in a tread width direction (tread width direction TW) and the tire radial direction, the straight line being parallel to a tire equator line and passing through an end of a corresponding one of the land portions on a side close to the circumferential groove.

Another characteristic of the present invention is the tire according to the second characteristic of the present invention, wherein the sidewall of the first groove portion has a shape like a half-moon recessed inward in the tire radial direction in the cross-sectional view.

Another characteristic of the present invention is the tire according to the first to third characteristics of the present invention, wherein the contact surfaces of the land portions extend in the tire circumferential direction with no groove or recess portion formed therein.

According to the characteristics of the present invention, a tire is provided which can exert a more stable braking performance from the initial stage of wear to a time after a certain amount of wear.

BRIEF DESCRIPTION OF THE DRAWINGS

FIG. 3(a) is a tread-width-direction cross-sectional view (cross-sectional view along the line A-A of FIG. 1) showing part of the tread contact surface 10 of the pneumatic tire 1 of the embodiment. FIG. 3(b) is an enlarged schematic view showing only the circumferential groove 31 of FIG. 3(a).

FIG. 13(a) is a cross sectional view which is taken in a tire radial direction TR (the line A-A in FIG. 11), showing part of a tread contact surface 110 of the pneumatic tire 101 of the embodiment. FIG. 13(b) is an enlarged schematic view showing only the circumferential groove 131 is shown in FIG. 13(a).

FIG. 21(a) is a cross-sectional view showing part of the tread contact surface 210 of the pneumatic tire 201 of the embodiment.

FIG. 21(b) is an enlarged schematic view showing the circumferential groove 231 in FIG. 21(a).

FIG. 29(a) is a cross-sectional view (cross-sectional view taken along the line A-A in FIG. 27) showing part of the tread contact surface 310 of the pneumatic tire 301 of the embodiment.

FIG. 29(b) is an enlarged schematic view only showing the shallow groove portion 340 in FIG. 29(a).

FIG. 36 is a table showing evaluation results on braking performances of vehicles fitted with respective types of tires (in a brand-new state and in a worn state).

FIG. 37 is a table showing evaluation results on braking performances of vehicles fitted with respective types of tires.

FIG. 38 is a table showing evaluation results on braking performances and a noise performance of vehicles fitted with respective types of tires (in a brand-new state and in a worn state).

FIG. 39 is a table showing evaluation results on braking performances of vehicles fitted with respective types of tires.

MODES FOR CARRYING OUT THE INVENTION

First Embodiment

Figure 1:
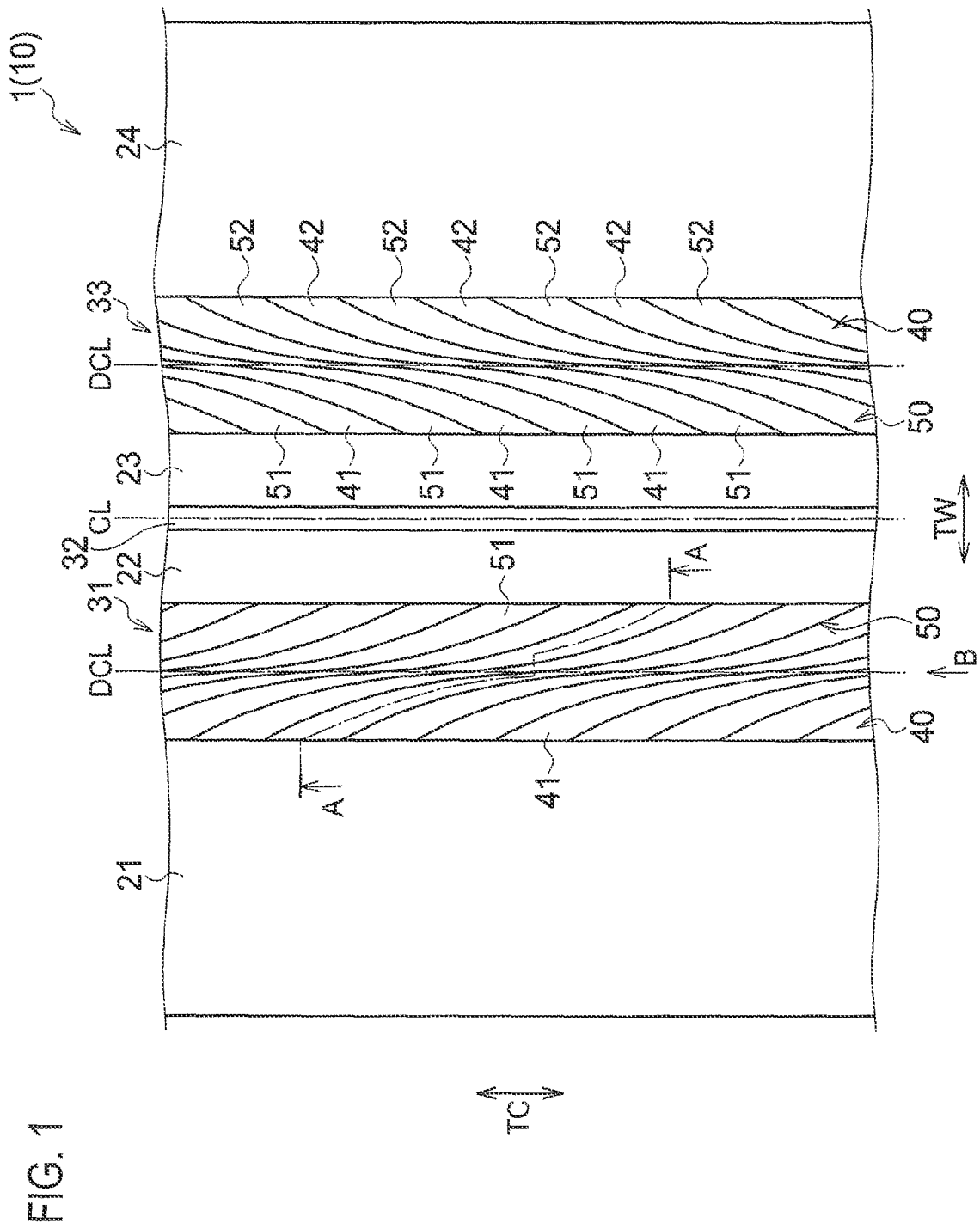
FIG. 1 is a developed view showing part of a tread contact surface 10 of the pneumatic tire 1 of the embodiment.

Next, a first embodiment of a pneumatic tire of the present invention is described with reference to the drawings. Specifically, descriptions are given of (1) an overall configuration of a pneumatic tire, (2) a detailed configuration of circumferential grooves, (3) modified examples, (4) comparative evaluations, (5) operations and effects, and (6) other embodiments.

Note that the same or similar portions are denoted by the same or similar reference numerals in the following descriptions of the drawings. It should be noted however that the drawings are schematic and proportions of dimensions and the like are different from the actual ones.

Accordingly, specific dimensions and the like should be determined in consideration of the following descriptions. Moreover, the drawings include parts showing the dimensional relationships and proportions different from each other, as matter of course.

(1) Overall Configuration of Pneumatic Tire

First, an overall configuration of a pneumatic tire 1 of the embodiment is described with reference to the drawings. FIG. 1 is a developed view showing part of a tread contact surface 10 of the pneumatic tire 1 of the embodiment. The pneumatic tire 1 may be filled with an inert gas such as a nitrogen gas instead of air.

As shown in FIG. 1, the pneumatic tire 1 includes rib-shaped land portions 20 extending in a tire circumferential direction TC. In the tread contact surface 10 in the land portions 20, circumferential grooves 30 are formed which are adjacent to the land portions 20 and which extend in the tire circumferential direction TC.

The tread contact surface 10 in the land portions 20 forms smooth surfaces with no gap when a normal load is applied to the pneumatic tire 1 and the tread contact surface 10 is in contact with a road surface. In the embodiment, the tread contact surface 10 in the land portions 20 extends in the tire circumferential direction with no grooves and recess portions formed therein.

The land portions 20 include a land portion 21, a land portion 22, a land portion 23, and a land portion 24 arranged sequentially from left to right in FIG. 1. Meanwhile, the circumferential grooves 30 include a circumferential groove 31, a circumferential groove 32, and a circumferential groove 33 arranged sequentially from left to right in FIG. 1.

The circumferential groove 31 and the circumferential groove 33 among the circumferential grooves 30 include shallow groove portions 40 (first groove portion) and deep groove portions 50 (second groove portion).

(2) Detailed Configuration of Circumferential Grooves

Figure 2:
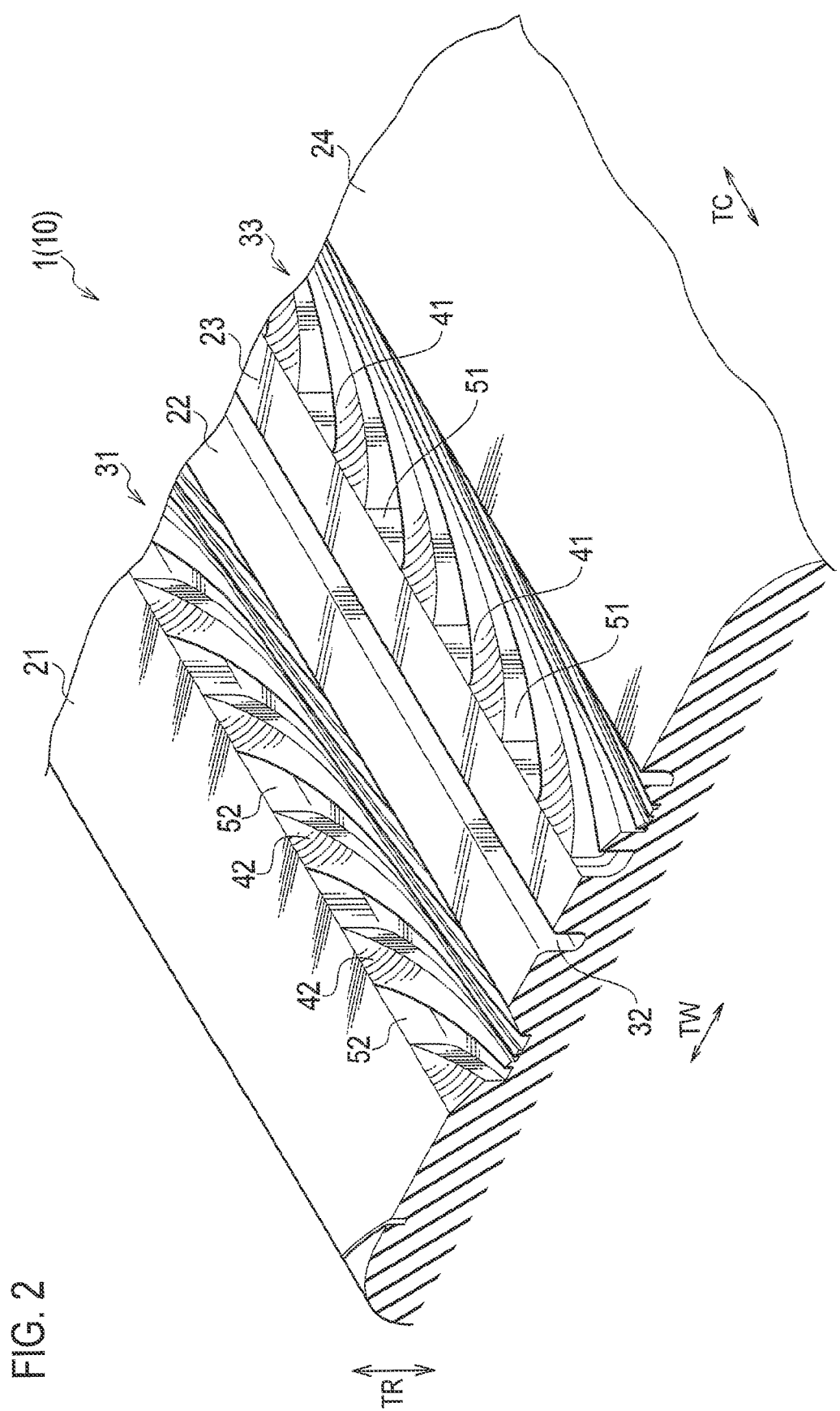
FIG. 2 is a perspective view showing part of the tread contact surface 10 of the pneumatic tire 1 of the embodiment.
Figure 4:
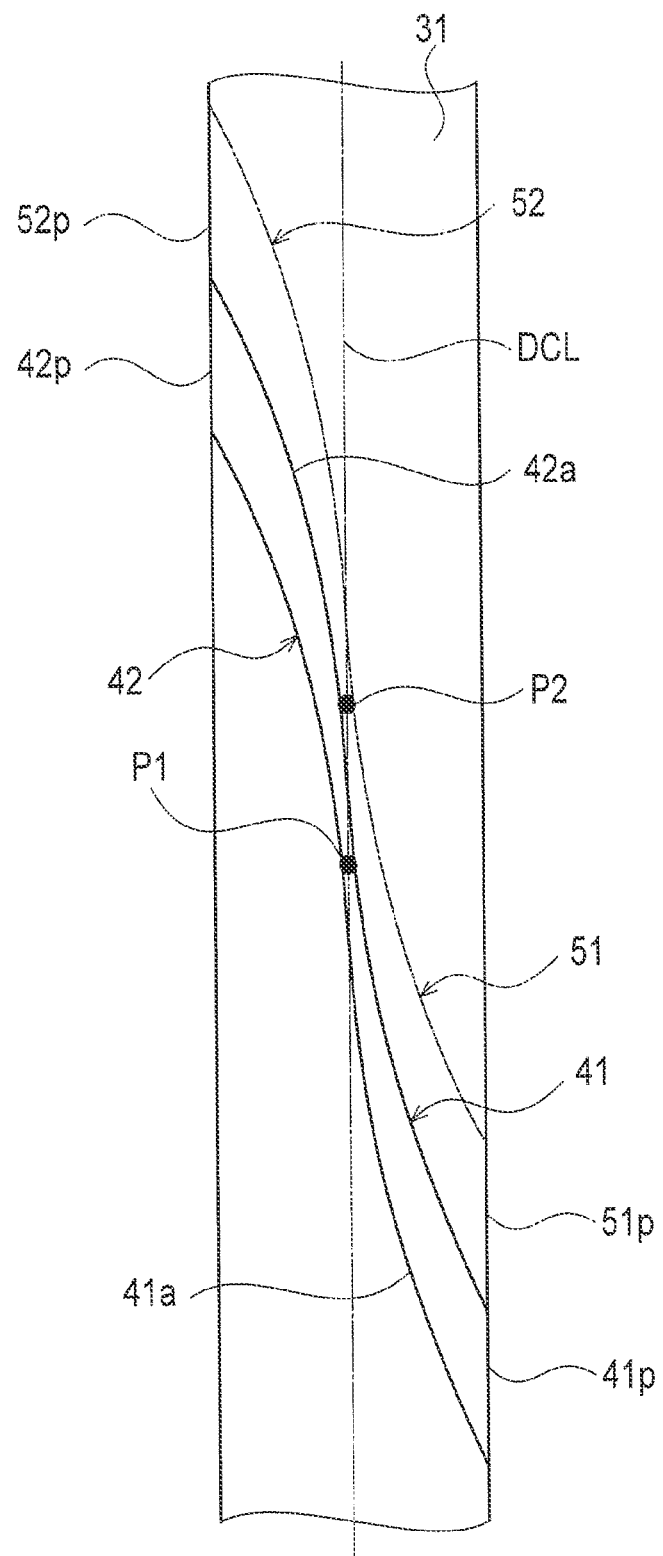
FIG. 4 is an enlarged schematic view showing the shallow groove portion 40 and the deep groove portion 50.

Next, descriptions are given of the detailed configuration of the circumferential groove 31 and the circumferential groove 33 described above with reference to the drawings. FIG. 2 is a perspective view showing part of the tread contact surface 10 of the pneumatic tire 1 of the embodiment. FIG. 3(*a*) is a tread-width-direction cross-sectional view (cross-sectional view along the line A-A of FIG. 1) showing part of the tread contact surface 10 of the pneumatic tire 1 of the embodiment. FIG. 3(*b*) is an enlarged schematic view showing only the circumferential groove 31 of FIG. 3(*a*). FIG. 4 is an enlarged schematic view showing the shallow groove portion 40 and the deep groove portion 50. Note that the tread-width-direction cross-sectional view shows a view of a cross section taken in a tread width direction TW and a tire radial direction TR.

In the descriptions below, the configuration of the circumferential groove 31 is mainly described since the configuration of the circumferential groove 31 and the configuration of the circumferential groove 33 are identical. FIGS. 3 and 4 show only the circumferential groove 31.

As shown in FIGS. 1 to 4, the shallow groove portions 40 are formed between the land portion 21 and the land portion 22 adjacent to each other. The sidewalls 40*a* of the shallow groove portions 40 each have a shape like a half-moon recessed inward in the tire radial direction TR, in the tread-width-direction cross section (see FIGS. 2 and 3).

As shown in FIG. 3(*b*), the sidewalls 40*a* of at least each of the shallow groove portions 40 among the shallow groove portions 40 and the deep groove portions 50 are inclined such that a distance CP between each sidewall 40*a* and a corresponding one of straight lines PL becomes longer toward a deepest portion 40*b* of the shallow groove portions 40 in the tread-width-direction cross section, the straight lines PL being parallel to a tire equator line CL and passing through ends of the land portions 20 on sides close to the circumferential grooves 30. Each shallow groove portion 40 is formed of an inner shallow groove 41 and an outer shallow groove 42 (see FIGS. 1 to 3).

The inner shallow groove 41 is located closer to the tire equator line CL than a groove center line DCL is, the groove center line DCL passing through the tread width direction TW of a corresponding one of the circumferential groove 31 and the circumferential groove 33. The outer shallow groove 42 is continuous with the inner shallow groove 41 and is located more outwardly in the tread width direction TW than the groove center line DCL.

The inner shallow groove 41 and the outer shallow groove 42 are curved to be opposite to each other in the tire circumferential direction TC. Specifically, as shown in FIG. 4, an outward protruding portion 41*a* protruding due to the curving of the inner shallow groove 41 and an outward protruding portion 42*a* protruding due to the curving of the outer shallow groove 42 are each located on a side close to the groove center line DCL. In other words, the inner shallow groove 41 and the outer shallow groove 42 are provided to be point symmetric to each other with respect to a center point P1 of the shallow groove portion 40 which is located on the groove center line DCL. Moreover, an end portion 41*p* of the inner shallow groove 41 on a side close to the land portion 22 and an end portion 42*p* of the outer shallow groove 42 on a side close to the land portion 21 are disposed to be offset from each other in the tire circumferential direction TC.

The deep groove portions 50 are adjacent to the shallow groove portions 40 in the tire circumferential direction TC, respectively, and extend in the tread width direction TW. Specifically, the deep groove portions 50 extend to curve in the tread width direction TW in a tread-contact-surface view. The deep groove portions 50 are recessed more inwardly in the tire radial direction TR than the shallow groove portions 40 with groove bottoms 40*c* of the shallow groove portions 40 being upper ends of the deep groove portions 50.

The deep groove portions 50 have a more rectangular shape than the shallow groove portions 40 in the tread-width-direction cross section. Specifically, the shape of sidewalls 50*a* of the deep groove portions 50 is a linear shape extending in the tire radial direction TR, in the tread-width-direction cross section. The shape of groove bottoms 50*b* of the deep groove portions 50 is a linear shape extending in the tread width direction TW, in the tread-width-direction cross section. Boarders between the sidewalls 50*a* and the groove bottoms 50*b* are such that the sidewalls 50*a* and the groove bottoms 50*b* are continuous in a curved shape in the tread-width-direction cross section. Each deep groove portion 50 is formed of an inner deep groove 51 and an outer deep groove 52 (see FIGS. 1 to 4).

The inner deep groove 51 is located closer to the tire equator line CL than the groove center line DCL is. The outer deep groove 52 is continuous with the inner deep groove 51 and is located more outwardly in the tread width direction TW than the groove center line DCL.

The inner deep groove 51 and the outer deep groove 52 are curved to be opposite to each other in the tire circumferential direction TC. Specifically, as shown in FIG. 4, an outward protruding portion 51a protruding due to the curving of the inner deep groove 51 and an outward protruding portion 52a protruding due to the curving of the outer deep groove 52 are each located on a side close to the groove center line DCL. In other words, the inner deep groove 51 and the outer deep groove 52 are provided to be point symmetric to each other with respect to a center point P2 of the deep groove portion 50 which is located on the groove center line DCL. Moreover, an end portion 51p of the inner deep groove 51 on a side close to the land portion 22 and an end portion 52p of the outer deep groove 52 on a side close to the land portion 21 are disposed to be offset from each other in the tire circumferential direction TC.

(3) Modified Examples

Next, modified examples of the tread contact surface 10 of the pneumatic tire 1 of the aforementioned embodiment are described with reference to the drawings. Note that portions which are the same as those of the tread contact surface 10 of the pneumatic tire 1 of the aforementioned embodiment are denoted by the same reference numerals and portions which are different are mainly described.

(3-1) Modified Example 1

Figure 5:
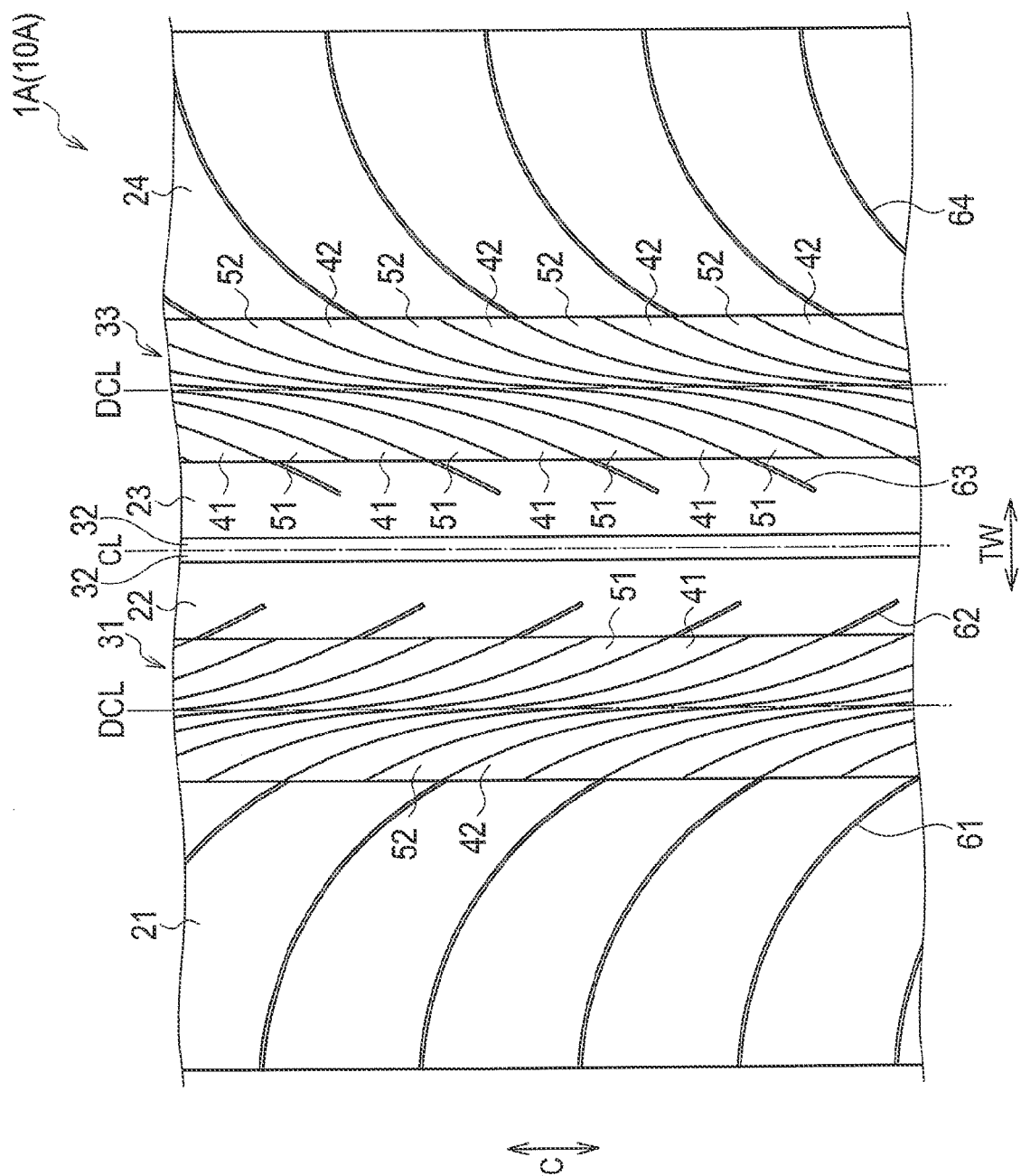
FIG. 5 is a developed view showing part of the tread contact surface 10A of the pneumatic tire 1A of Modified Example 1.
Figure 6:
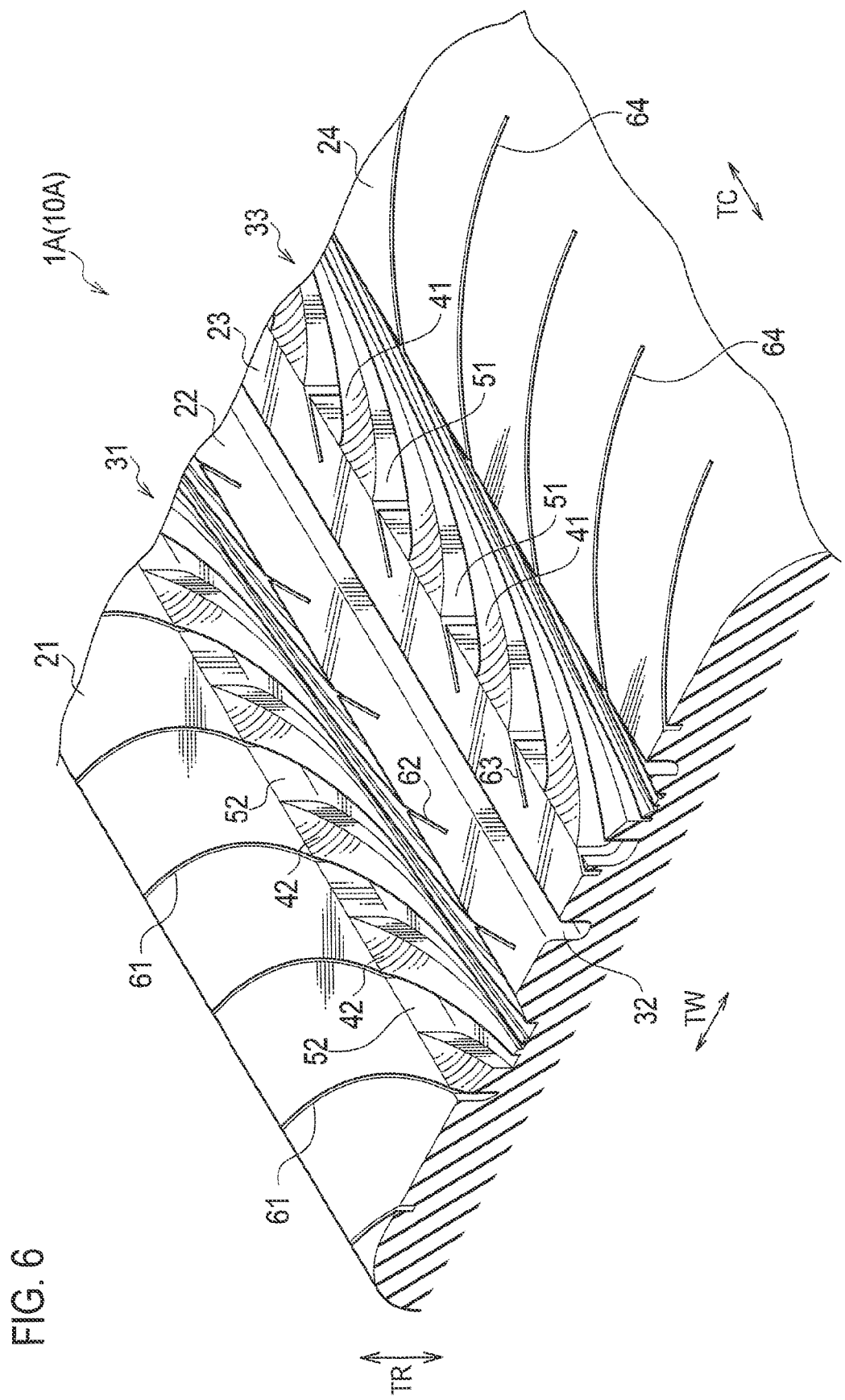
FIG. 6 is a perspective view showing part of the tread contact surface 10A of the pneumatic tire 1A of Modified Example 1.

First, a configuration of a tread contact surface 10A of a pneumatic tire 1A of Modified Example 1 is described with reference to the drawings. FIG. 5 is a developed view showing part of the tread contact surface 10A of the pneumatic tire 1A of Modified Example 1. FIG. 6 is a perspective view showing part of the tread contact surface 10A of the pneumatic tire 1A of Modified Example 1.

In the aforementioned embodiment, no grooves or recess portions are formed in the land portions 20. Meanwhile in Modified Example 1, as shown in FIGS. 5 and 6, multiple auxiliary lateral grooves 60 are provided in the land portions 20.

Specifically, a set of multiple auxiliary lateral grooves 61 and a set of multiple auxiliary lateral grooves 64 are formed respectively in the land portion 21 and the land portion 24 with predetermined intervals in the tire circumferential direction TC. Each of the auxiliary lateral grooves 61 and the auxiliary lateral grooves 64 extends to curve in the tread width direction TW in a tread-contact-surface view and is opened to the circumferential groove 31 or the circumferential groove 33. Each of the auxiliary lateral grooves 61 and the auxiliary lateral grooves 64 has a width smaller than the width of any of the circumferential groove 31, the circumferential groove 32, and the circumferential groove 33, in the tread width direction TW.

A set of multiple auxiliary lateral grooves 62 and a set of multiple auxiliary lateral grooves 63 are formed respectively in the land portion 22 and the land portion 23 with predetermined intervals in the tire circumferential direction TC. Each of the auxiliary lateral grooves 62 and the auxiliary lateral grooves 63 is provided on an extended line along a corresponding one of the auxiliary lateral grooves 61 or on an extended line along a corresponding one of the auxiliary lateral grooves 64. One end of each of the auxiliary lateral grooves 62 and the auxiliary lateral grooves 63, which is located on the outer side in the tread width direction TW, is opened to the circumferential groove 31 or the circumferential groove 33. Meanwhile, the other end of each of the auxiliary lateral grooves 62 and the auxiliary lateral grooves 63, which is located on a side closer to the tire equator line CL, is terminated in the land portion 22 or the land portion 23. Note that each of the auxiliary lateral grooves 62 and the auxiliary lateral grooves 63 has the same width as those of the auxiliary lateral grooves 61 and the auxiliary lateral grooves 64.

The tread contact surface 10A in the land portions 20 as described above forms smooth surfaces with no gap when a normal load is applied to the pneumatic tire 1 and the tread contact surface 10A is in contact with the road surface. Specifically, the land portions 20 defined by the aforementioned auxiliary lateral grooves 60 form the smooth surfaces in the following way. Portions of the land portions 20 which are adjacent in the tire circumferential direction TC come into contact with each other to close the auxiliary lateral grooves 60 (gaps) when the land portions 20 are in contact with the road surface.

(3-2) Modified Example 2

Figure 7:
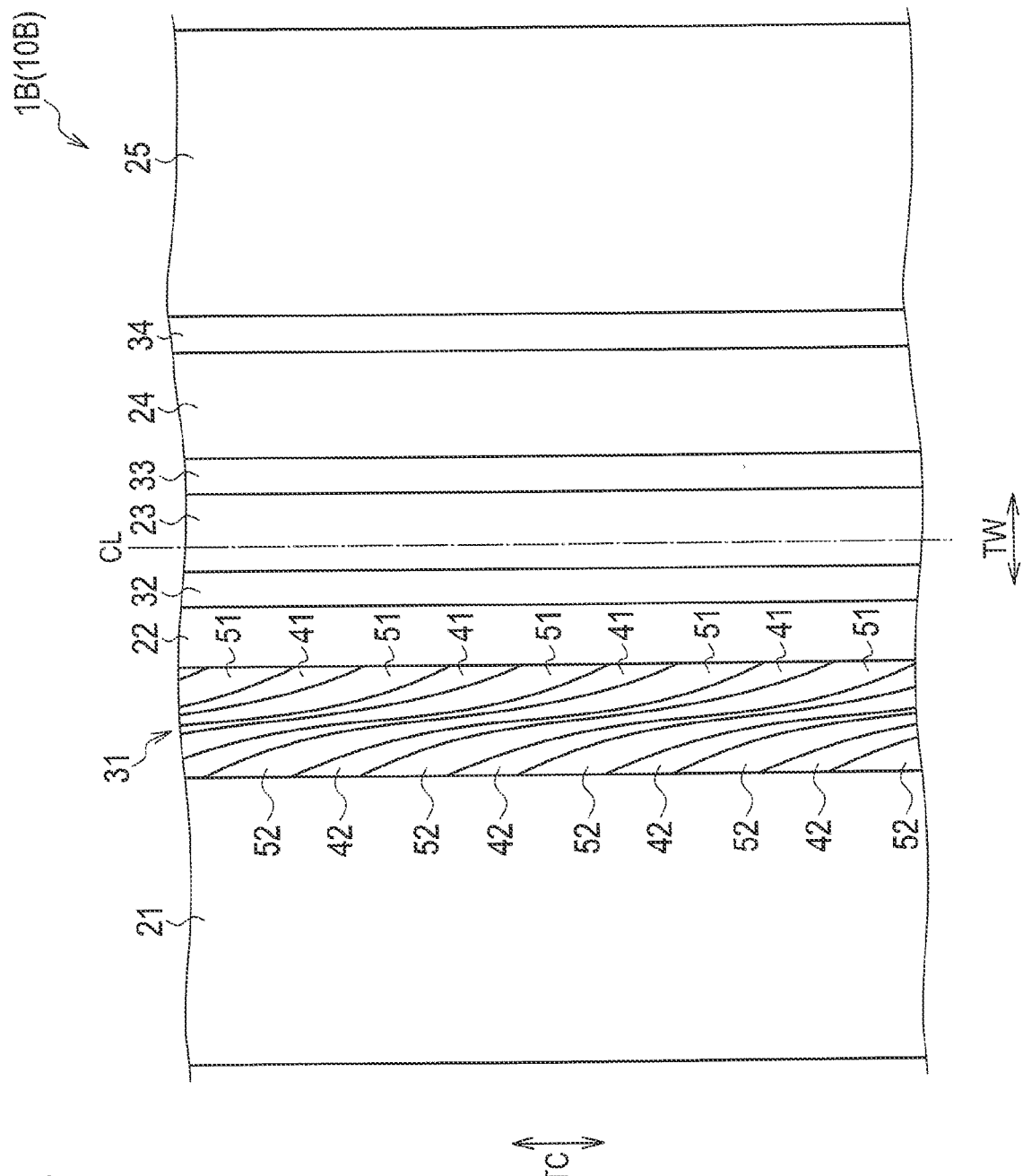
FIG. 7 is a developed view showing part of the tread contact surface 10B of the pneumatic tire 1B of Modified Example 2.
Figure 8:
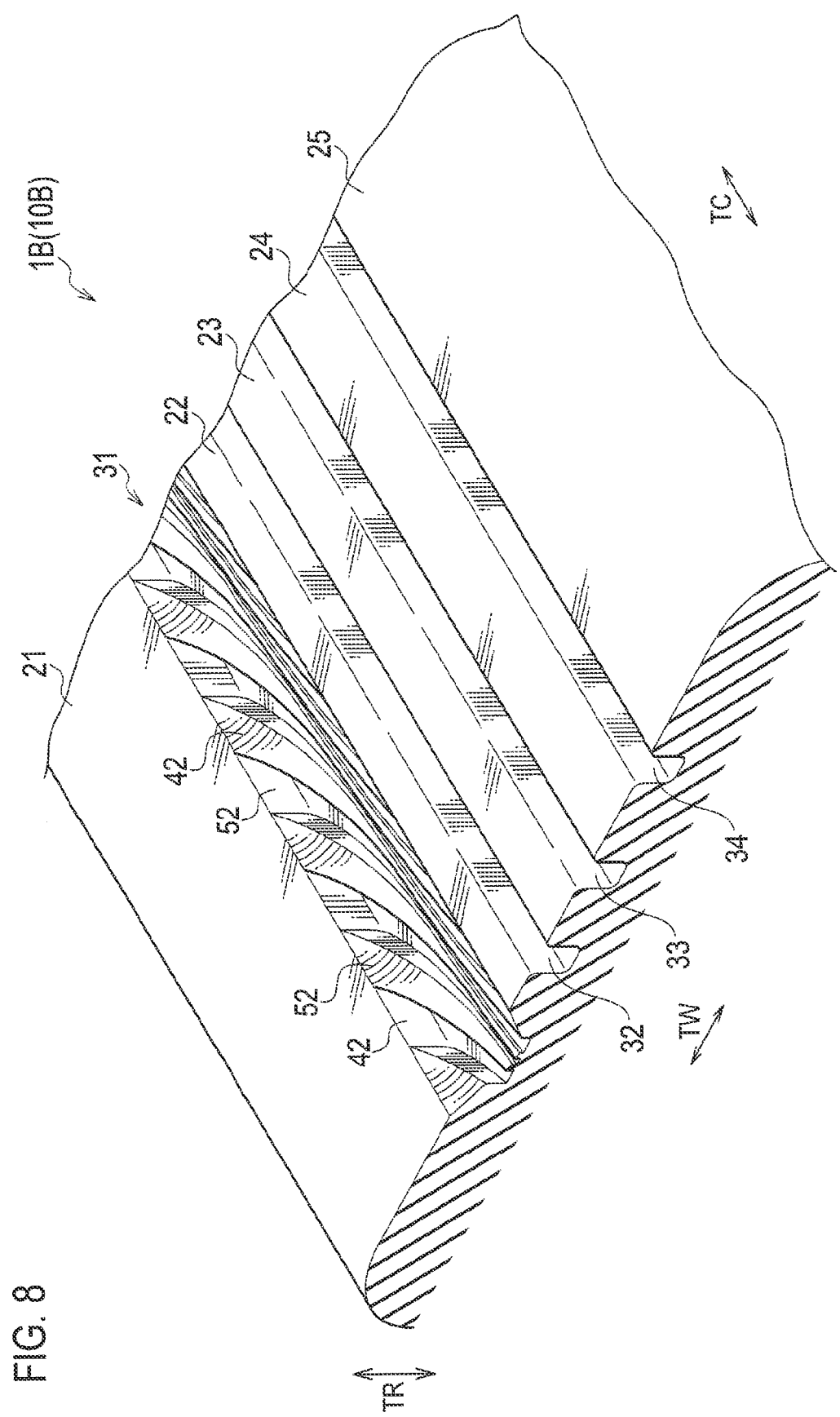
FIG. 8 is a perspective view showing part of the tread contact surface 10B of the pneumatic tire 1B of Modified Example 2.

Next, a configuration of a tread contact surface 10B of a pneumatic tire 1B of Modified Example 2 is described with reference to the drawings. FIG. 7 is a developed view showing part of the tread contact surface 10B of the pneumatic tire 1B of Modified Example 2. FIG. 8 is a perspective view showing part of the tread contact surface 10B of the pneumatic tire 1B of Modified Example 2.

In the embodiment described above, the shallow groove portions 40 and the deep groove portions 50 are provided in the two circumferential grooves (circumferential groove 31 and circumferential groove 33). Meanwhile in Modified Example 2, as shown in FIGS. 7 and 8, the shallow groove portions 40 and the deep groove portions 50 are provided in a single circumferential groove.

Specifically, the shallow groove portions 40 and the deep groove portions 50 are provided only in the circumferential groove 31 located leftmost with respect to the tire equator line CL. In Modified Example 2, the circumferential grooves 30 include four circumferential grooves. Specifically, the circumferential grooves 30 include the circumferential groove 31, the circumferential groove 32, the circumferential groove 33, and a circumferential groove 34.

The number of the circumferential grooves 30 and the configuration (the shapes, the number, and the like) of the auxiliary lateral grooves 60 are not limited to the ones described in the embodiment and can be selected appropriately depending on a purpose.

Moreover, the shallow groove portions 40 and the deep groove portions 50 are not necessarily provided only in the circumferential groove 31 located leftmost with respect to the tire equator line CL and may be provided, for example, only in the circumferential groove 32 and the circumferential groove 33 located near the tire equator line CL or only in the circumferential groove 34 located rightmost with respect to the tire equator line CL.

(3-3) Modified Example 3

Figure 9:
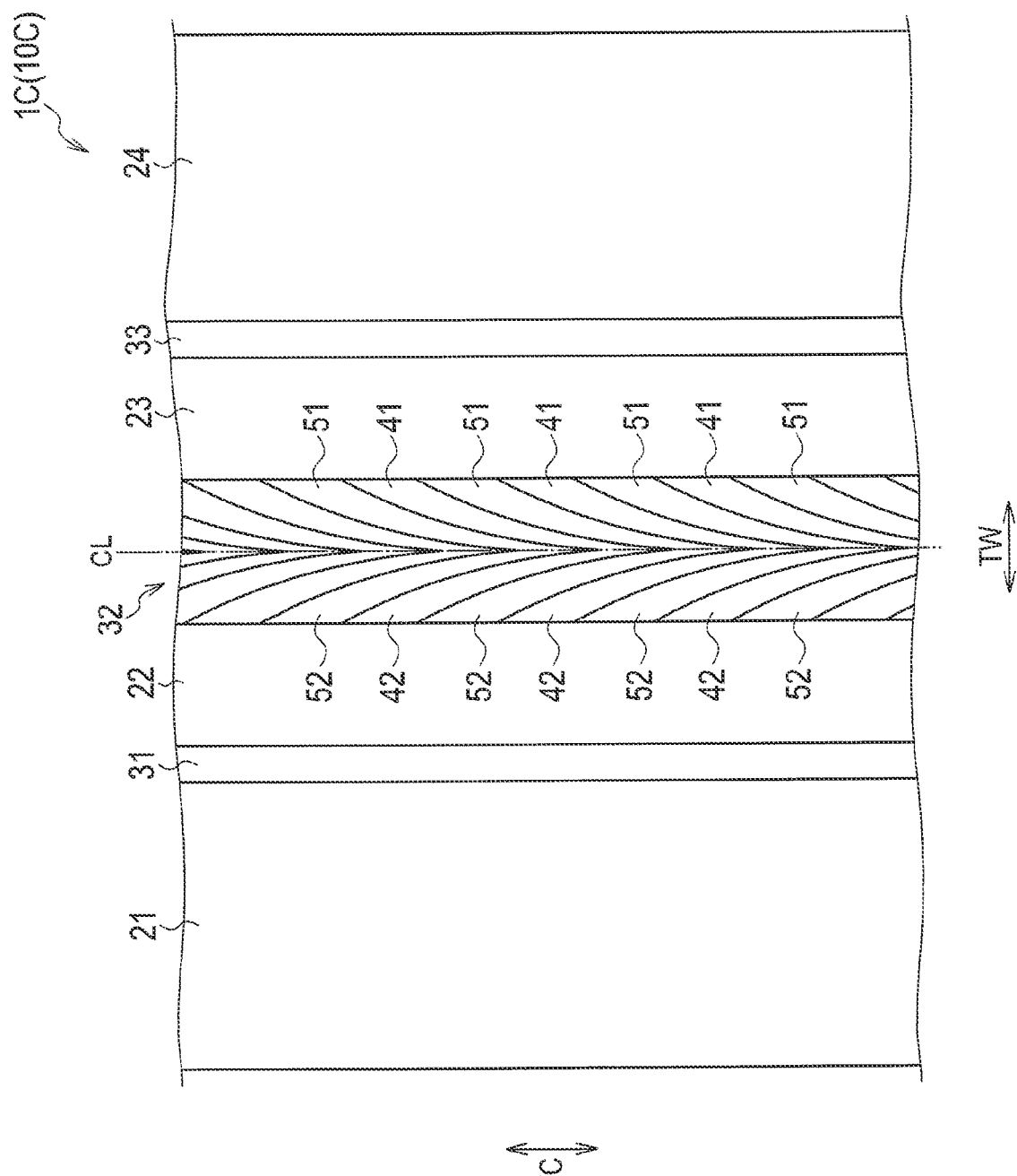
FIG. 9 is a developed view showing part of the tread contact surface 10C of the pneumatic tire 1C of Modified Example 3.
Figure 10:
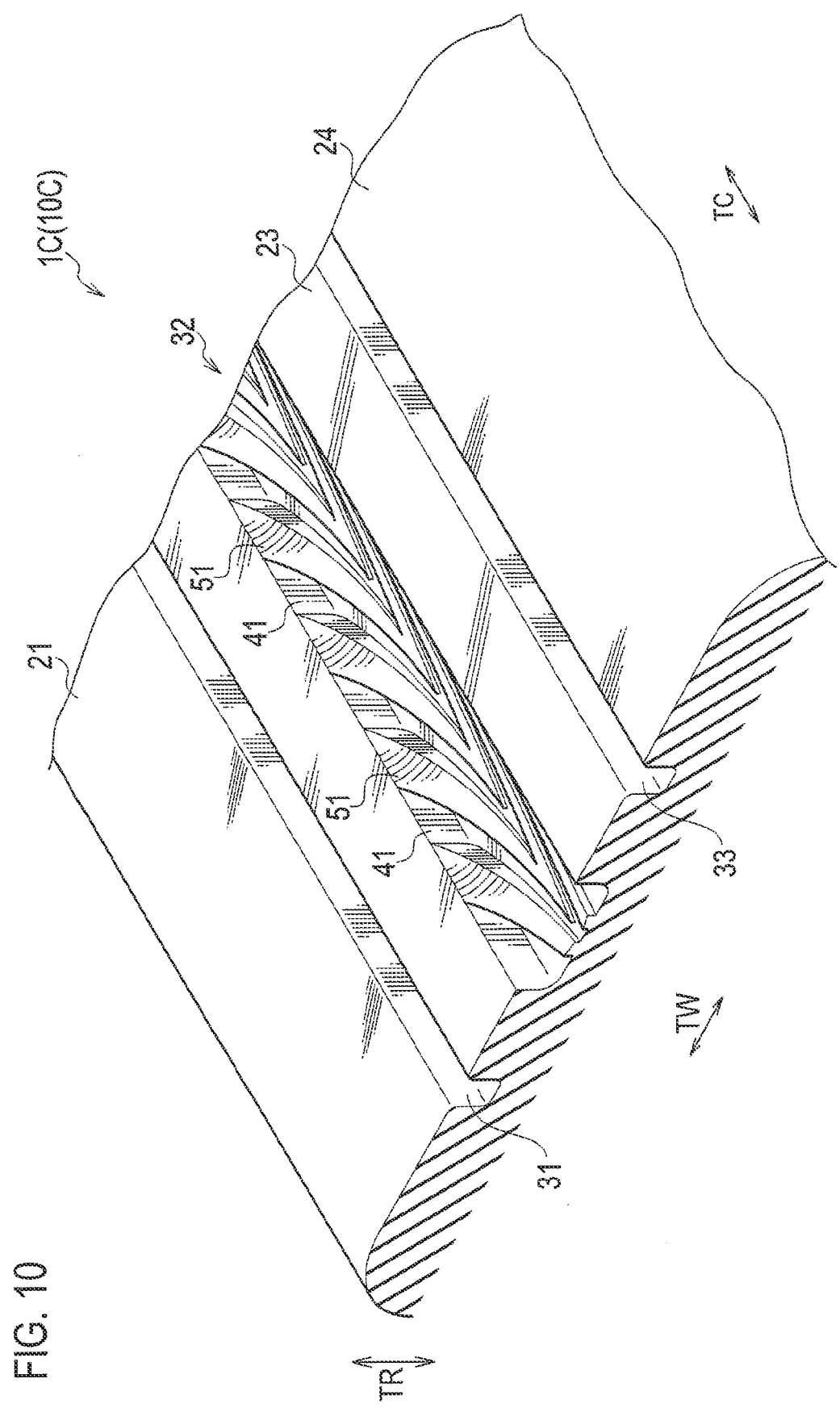
FIG. 10 is a perspective view showing part of the tread contact surface 100 of the pneumatic tire 1C of Modified Example 3.

Next, a configuration of a tread contact surface 10C of a pneumatic tire 1C of Modified Example 3 is described with reference to the drawings. FIG. 9 is a developed view showing part of the tread contact surface 10C of the pneumatic tire 1C of Modified Example 3. FIG. 10 is a perspective view showing part of the tread contact surface 100 of the pneumatic tire 1C of Modified Example 3.

In the aforementioned embodiment, the end portion 41p of each inner shallow groove 41 on the side close to the land portion 22 and the end portion 42p of the corresponding outer shallow groove 42 on the side close to the land portion 21 are disposed to be offset from each other in the tire circumferential direction TC. Moreover, in the embodiment, the end portion 51p of each inner deep groove 51 on the side close to the land portion 22 and the end portion 52p of the corresponding outer deep groove 52 on the side close to the land portion 21 are disposed to be offset from each other in the tire circumferential direction TC.

Meanwhile in Modified Example 3, as shown in FIGS. 9 and 10, the end portion 41p of each inner shallow groove 41 on the side close to the land portion 22 and the end portion 42p of the corresponding outer shallow groove 42 on the side close to the land portion 21 are disposed respectively at positions which are the same in the tire circumferential direction TC. In other words, the inner shallow grooves 41 and the outer shallow grooves 42 are provided to be line symmetric to each other with respect to the tire equator line CL (groove center line DCL).

Similarly, the end portion 51p of each inner deep groove 51 on the side close to the land portion 22 and the end portion 52p of the corresponding outer deep groove 52 on the side close to the land portion 21 are disposed respectively at positions which are the same in the tire circumferential direction TC. Moreover, the inner deep grooves 51 and the outer deep grooves 52 are provided to be line symmetric to each other with respect to the tire equator line CL (groove center line DCL).

In FIGS. 9 and 10, the circumferential grooves 30 include three circumferential grooves (circumferential groove 31, circumferential groove 32, and circumferential groove 33). Moreover, the shallow groove portions 40 and the deep groove portions 50 are provided only in the circumferential groove 32 located on the tire equator line CL.

Note that the number of the circumferential grooves 30 and the configuration (the shapes, the number, and the like) of the auxiliary lateral grooves are not limited to the ones described in the embodiment and can be selected appropriately depending on a purpose.

Furthermore, the shallow groove portions 40 and the deep groove portions 50 are not necessary provided only in the circumferential groove 32 located on the tire equator line CL and may be provided, for example, only in the circumferential groove 31 located leftmost with respect to the tire equator line CL or only in the circumferential groove 33 located rightmost with respect to the tire equator line CL.

(4) Comparative Evaluations

Next, descriptions are given of comparative evaluations performed using pneumatic tires of a comparative example and an example described below to further clarify the effects of the present invention. Specifically, (4-1) configurations of respective pneumatic tires and (4-2) evaluation results are described. Note that the present invention is not limited by these examples.

(4-1) Configurations of Respective Pneumatic Tires

Brief descriptions are given of the pneumatic tires of the comparative example and the example. Data on the pneumatic tires was measured under the following condition.

Tire size: 225/45R17
Rim size: 7J-17
Vehicle condition: Japanese FF car (displacement of 2000 cc)
Inflation pressure condition: Standard inflation pressure
Load condition: Load of the driver+600 N In the pneumatic tire of the comparative example, no shallow groove portions 40 or deep groove portions 50 described in the embodiment are formed in circumferential grooves. Moreover, auxiliary lateral grooves communicating with the circumferential grooves are formed in land portions. These auxiliary lateral grooves have a width larger than the width of the auxiliary lateral grooves 60 described in the embodiment.

Meanwhile, in the pneumatic tire of the example, the shallow groove portions 40 and the deep groove portions 50 are formed in the circumferential groove 30. No groove portions or recess portions are formed in the tread contact surface 10 of the pneumatic tire of the example.

It is assumed that the pneumatic tires of the comparative example and the example each have the tread pattern shown in the aforementioned embodiment (FIGS. 7 and 8). The pneumatic tires of the comparative example and the example are the same except for the configuration of circumferential grooves and the configuration of auxiliary lateral grooves.

(4-2) Evaluation Results

Next, descriptions are given of evaluation results on braking performances of vehicles fitted with the respective types of tires (in a brand-new state and in a worn state), with reference to FIG. 36.

(4-2-1) Braking Performance when Tires are Brand New

The braking performance when tires were brand new was evaluated as follows. An index of "100" is assigned to a distance (deceleration speed) at which the vehicle fitted with the pneumatic tires of the comparative example took to stop from a speed of 60 km/h by application of full brake on a test course having a water depth of 2 mm and a professional driver performed a feeling evaluation on a deceleration speed of the vehicle fitted with the pneumatic tires of the example. A larger index means a better braking performance.

As a result, as shown in FIG. 36, it was found that the braking performance of the vehicle fitted with the pneumatic tires of the example was better than the braking performance of the vehicle fitted with the pneumatic tires of the comparative example when the tires were brand new.

(4-2-2) Braking Performance when Tires are Worn

The braking performance when tires were worn (worn 50%) was evaluated as follows. As in the case with the test of braking performance when the tires were brand new, an index of "100" is assigned to a deceleration speed of the vehicle fitted with the pneumatic tires of the comparative example and a professional driver performed a feeling evaluation on a deceleration speed of the vehicle fitted with the pneumatic tires of the example. A larger index means a better braking performance.

As a result, as shown in FIG. 36, it was found that the braking performance of the vehicle fitted with the pneumatic tires of the example was better than the braking performance of the vehicle fitted with the pneumatic tires of the comparative example when the tires were worn.

(5) Operations and Effects

In the embodiment described above, the tread contact surface 10 forms the smooth surfaces having no gap when the normal load is applied to the pneumatic tire 1 and the tread contact surface 10 is in contact with the road surface. Specifically, the state were the tread contact surface 10 forms the smooth surfaces includes: a state where no grooves or recess portions (for example, auxiliary lateral grooves 60) are formed in the tread contact surface 10 (FIGS. 1 and 2); and a state where, even when grooves and recess portions (for example, auxiliary lateral grooves 60) are formed in the tread contact surface 10, the grooves and the recess portions are closed while the tread contact surface 10 is in contact with the road surface (FIGS. 5 and 6). This secures the block stiffness (shear stiffness) of the land portions 20 compared to the case where gaps are formed while the tread contact surface 10 is in contact with the road surface. Accordingly, in an initial stage of wear of the pneumatic tire 1, deformation of the land portions 20 is suppressed during braking of a vehicle fitted with the tire and the braking performance can be thereby improved.

Moreover, the deep groove portions 50 are recessed more inwardly in the tire radial direction TR than the shallow groove portions 40 with the groove bottoms 40c of the shallow groove portions 40 being the upper ends of the deep groove portions 50. This increases the block stiffness of the land portions 20 as the heights of the land portions 20 decrease from the initial stage of wear to a time after a certain amount of wear. Accordingly, deformation of the land portions 20 is suppressed and an edge component is increased by the shallow groove portions 40 and the deep groove portions 50. Hence, the braking performance is improved.

As mentioned above, since the tread contact surface 10 forms the smooth surfaces and the deep groove portions 50 are recessed more inwardly in the tire radial direction TR than the shallow groove portions 40, the tire can exert a more stable braking performance from the initial stage of wear to the time after the certain amount of wear.

Incidentally, when gaps are formed while the tread contact surface 10 is in contact with the road surface as in the conventional art, on a wet road surface, flows of rain water and the like in the circumferential grooves are turned into turbulent flows by the auxiliary lateral grooves and the drainage (hydroplaning performance) deteriorates. However, the tread contact surface 10 forms the smooth surfaces in the embodiment. Flows of water in the circumferential grooves 30 (circumferential groove 31 and circumferential groove 33) are thereby less likely to turn into turbulent flows and are stable. Hence, the drainage is can be improved.

Moreover, in the conventional land portion in which the auxiliary lateral grooves are formed, end portions of blocks which are close to the auxiliary lateral grooves deform to turn up during braking of a vehicle fitted with such a tire and the wear resistance is also deteriorated. However, in the embodiment, no grooves or recess portions are formed in the tread contact surface 10 and the tread contact surface 10 in the land portions 20 thereby stably comes into contact with the ground. Hence, the wear resistance is also improved.

Further, the deep groove portions 50 are recessed more inwardly in the tire radial direction TR than the shallow groove portions 40 with the groove bottoms 40c of the shallow groove portions 40 being the upper ends of the deep groove portions 50. This increases the volume of the circumferential grooves 30 compared to the case where protrusions protruding outward in the tire radial direction TR are formed in the circumferential grooves 30 with the groove bottoms 40c of the shallow groove portions 40 being lower ends of the protrusions. Hence, the drainage can be further improved.

In the embodiment, the sidewalls 40a of each shallow groove portion 40 are inclined such that the distance CP between each sidewall 40a and the corresponding one of the straight lines PL becomes longer toward the groove bottom 40c of the shallow groove 40 in the tread-width-direction cross section, the straight lines PL being parallel to the tire equator line CL and passing through the ends of the land portions 20 on the sides close to the circumferential grooves 30. In the embodiment, the sidewalls 40a of the shallow groove portions 40 each have a shape like a half-moon recessed inward in the tire radial direction TR in the tread-width-direction cross section. This causes the block stiffness of the land portions 20 to increase as the wear progresses and the edge component of the shallow groove portions 40 and the deep groove portions 50 can be thereby exerted gradually. Hence, a more stable braking performance can be exerted from the initial stage of wear to the time after the certain amount of wear.

In the embodiment, the deep groove portions 50 have a more rectangular shape than the shallow groove portions 40 in the tread-width-direction cross section. This allows the edge component of the shallow groove portions 40 to be surely secured until the progress of wear reaches the deep groove portions 50, even when the shallow groove portions 40 wear along with wear of the land portions 20. Hence, a more stable braking performance can be exerted from the initial stage of wear to the time after the certain amount of wear.

(6) Other Modifications of First Embodiment

As described above, the contents of the present invention are disclosed through the embodiment of the present invention. However, the descriptions and drawings forming part of this disclosure should not be understood to limit the present invention. Various alternative modes, embodiments, and operation techniques are made obvious to those skilled in the art from the disclosure.

For example, the embodiment of the present invention can be modified as follows. Specifically, the tire is described as the pneumatic tire 1 filled with air or a nitrogen gas. However, the tire is not limited to this and may be a solid tire filled with no air or nitrogen gas.

Moreover, in the above description, the shallow groove portions 40 and the deep groove portions 50 extend to curve in the tread width direction TW in the tread-contact-surface view. However, the shallow groove portions 40 and the deep groove portions 50 are not limited to this and may extend, for example, in a linear shape. The shape of the shallow groove portions 40 and the shape of the deep groove portions 50 are not necessary limited to the ones described in the embodiment and may be set appropriately depending on a purpose. For example, the inner shallow groove 41 is not required to be connected to the outer shallow groove 42 and may be separated from each other at the center point P1 of each shallow groove portion 40. Similarly, the inner deep groove 51 and the outer deep groove 52 may be separated from each other at the center point P2 of each deep groove portion 50. In this case, the volume of the circumferential groove 31 is increased and the drainage is further improved.

As described above, the present invention includes various embodiments which are not described herein as a matter of course. Accordingly, the technical scope of the present invention should be determined only by the matters to define the invention in the scope of claims regarded as appropriate based on the above descriptions.

Second Embodiment

Conventionally, a method of forming multiple circumferential grooves in a tread has been widely used in tires to be fitted to a passenger automobile and the like, in order to secure drainage on a wet road surface. Wall surfaces and groove bottom portions of such circumferential grooves are generally formed to be smooth so as not to interrupt draining.

Meanwhile, a tire is known in which a small spiral-shaped protrusion is provided in a groove bottom portion of a circumferential groove in a tire circumferential direction to actively drain rain water entering the circumferential groove (for example, Japanese Patent Application Publication No. 2005-170381 (Page 3, FIG. 2)). In such a tire, a water flow is generated in the rain water entering the circumferential groove and the drainage is thereby improved.

However, the conventional tires described above have the following problems. Specifically, the tire in which the wall surfaces and the groove bottom portions of the circumferential grooves are formed to be smooth and the tire in which a small spiral-shaped protrusion is provided in the groove bottom portion have such a problem that buckling in which a tread warps inward in a tire radial direction is likely to occur near the circumferential grooves. When buckling occurs, a contact performance with the road surface deteriorates and the braking performance and the like thereby deteriorate.

Meanwhile, although it is conceivable to reinforce the wall surfaces and the groove bottom portions of the circumferential grooves to suppress occurrence of buckling near the circumferential grooves, such reinforcement may cause another problem in which the cross-sectional areas of the circumferential grooves are reduced and the drainage thereby deteriorates.

In view of these problems, an object of the present invention is to provide such a tire that, when a circumferential groove is formed in a tread, deterioration in the braking performance and the like due to buckling is suppressed with drainage being secured.

To solve the aforementioned problems, the present invention has the following characteristic. First, the characteristic of the present invention is a tire (pneumatic tire 101) including multiple rib-shaped land portions (for example, land portion 121) extending in a tire circumferential direction (tire circumferential direction TC), the tire having a circumferential groove (for example, circumferential groove 131) formed which is adjacent to the land portions and which extends in the tire circumferential direction, wherein the circumferential groove includes: a first groove portion (shallow groove portion 140) formed between adjacent ones of the land portions; and a second groove portion (deep groove portion 150) being adjacent to the first groove portion in the tire circumferential direction and formed between the adjacent land portions, the second groove portion is recessed more inwardly in a tire radial direction than the first groove portion with a groove bottom (groove bottom 140c) of the first groove portion being an upper end of the second groove portion, the first groove portion includes: a low-angle groove section (low-angle groove section 144) in which an angle (angle θ1) formed between the first groove portion and a straight line (straight line L1) orthogonal to a tire equator line (tire equator line CL) is smaller than a predetermined angle (predetermined angle θ); and a high-angle groove section (high-angle groove section 146) which is continuous with the low-angle groove section and in which an angle formed between the first groove portion and the straight line is equal to or larger than the predetermined angle, and the high-angle groove section is located closer to a groove center line (groove center line DCL) than the low-angle groove section is, the groove center line passing through a center of the circumferential groove in a tread width direction (tread width direction TW).

In the characteristic described above, since the low-angle groove section is located closer to the land portions than the high-angle groove section is, the land portions can be reinforced. Particularly, since the angle formed between the first groove portion and the straight line orthogonal to the tire equator line is smaller than the predetermined angle, the low-angle groove section can have a more improved stiffness in the tread width direction than the high-angle groove section. Accordingly, occurrence of buckling in which a tread warps inward in the tire radial direction can be suppressed near the circumferential groove.

Meanwhile, in the high-angle groove section, since the angle formed between the first groove portion and the straight line orthogonal to the tire equator line is equal to or larger than the predetermined angle, the high-angle groove section is formed such that an extending direction of the high-angle groove section is closer to the tire circumferential direction than that of the low-angle groove section is. Moreover, the high-angle groove section is located closer to the groove center line than the low-angle groove section is. Hence, occurrence of turbulent flow is suppressed in the high-angle groove section. This secures the drainage of the tire.

Accordingly, in the tire as described above, deterioration in braking performance due to buckling can be suppressed with the drainage being secured.

Next, a second embodiment of a pneumatic tire of the present invention is described with reference to the drawings. Specifically, descriptions are given of (1) an overall configuration of the pneumatic tire, (2) a detailed configuration of circumferential grooves, (3) modified examples, (4) comparative evaluations, (5) operations and effects, and (6) other embodiments.

Note that the same or similar portions are denoted by the same or similar reference numerals in the following descriptions of the drawings. It should be noted however that the drawings are schematic and proportions of dimensions and the like are different from the actual ones.

Accordingly, specific dimensions and the like should be determined in consideration of the following descriptions. Moreover, the drawings include parts showing the dimensional relationships and proportions different from each other, as matter of course.

(1) Overall Configuration of Pneumatic Tire

Figure 11:
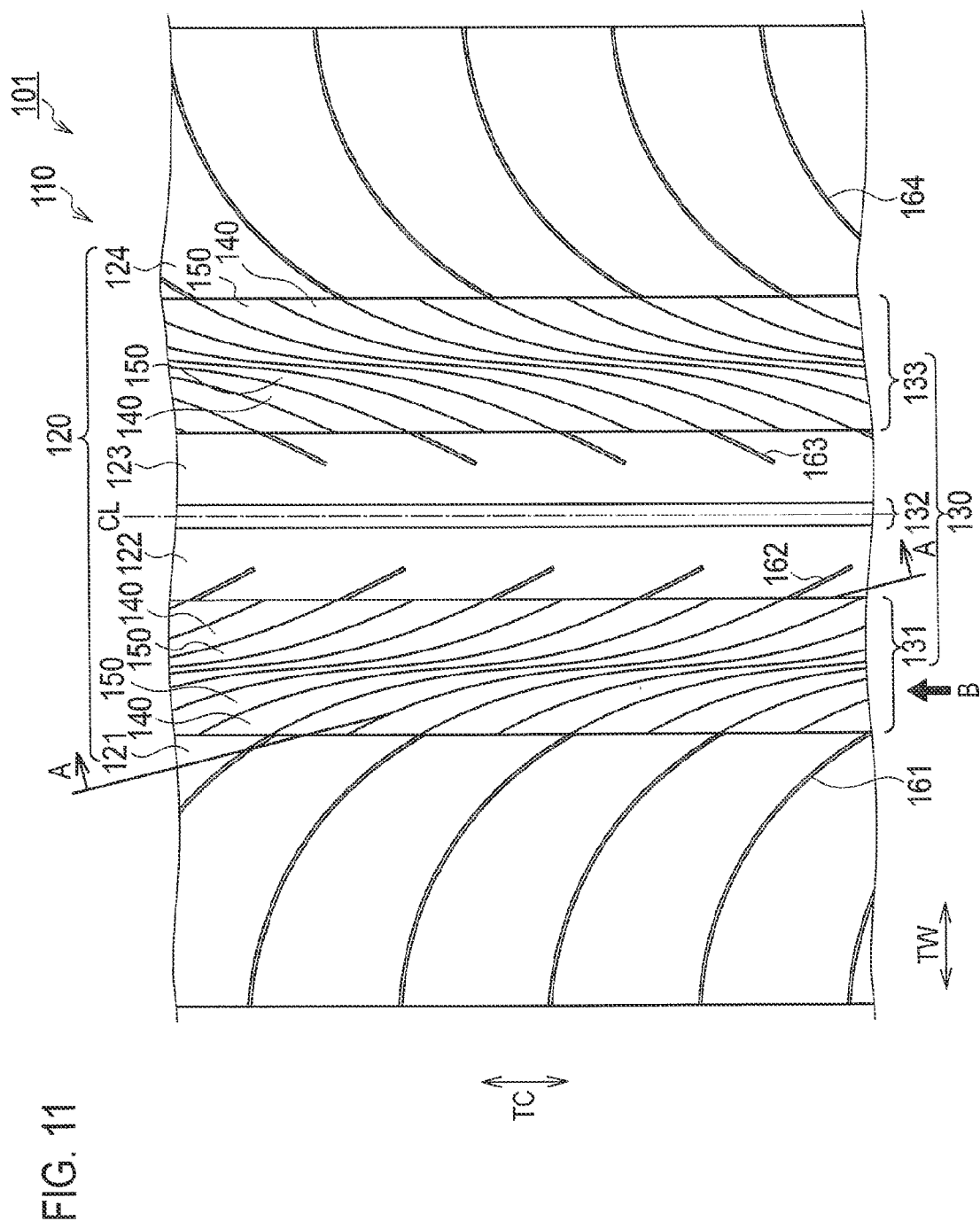
FIG. 11 is a developed view showing part of a tread contact surface 110 of the pneumatic tire 101 of the embodiment.

First, an overall configuration of a pneumatic tire 101 of the embodiment is described with reference to the drawings. FIG. 11 is a developed view showing part of a tread contact surface 110 of the pneumatic tire 101 of the embodiment. The pneumatic tire 101 may be filled with an inert gas such as a nitrogen gas instead of air.

As shown in FIG. 11, the pneumatic tire 101 includes rib-shaped land portions 120 extending in a tire circumferential direction TC. In the tread contact surface 110 in the land portions 120, circumferential grooves 130 are formed which are adjacent to the land portions 120 and which extend in the tire circumferential direction TC.

Specifically, the land portions 120 include a land portion 121, a land portion 122, a land portion 123, and a land portion 124 arranged sequentially from left to right in FIG. 11. The circumferential grooves 130 include a circumferential groove 131, a circumferential groove 132, and a circumferential groove 133 arranged sequentially from left to right in FIG. 11.

Multiple auxiliary lateral grooves are provided in the land portions 120. Specifically, multiple auxiliary lateral grooves 161 are formed in the land portion 121 with predetermined intervals in the tire circumferential direction TC. Similarly, multiple auxiliary lateral grooves 164 are formed in the land portion 124 with predetermined intervals in the tire circumferential direction TC. Each of the auxiliary lateral grooves 161 and the auxiliary lateral grooves 164 extends to curve in a tread width direction TW in a tread-contact-surface view and is opened to the circumferential groove 131 or the circumferential groove 133. Each of the auxiliary lateral grooves 161 and the auxiliary lateral grooves 164 has a width smaller than the width of any of the circumferential groove 131, the circumferential groove 132, and the circumferential groove 133 in the tread width direction TW.

As in the case with the auxiliary lateral grooves 161, a set of multiple auxiliary lateral grooves 162 and a set of multiple auxiliary lateral grooves 163 are formed respectively in the land portion 122 and the land portion 123 with predetermined intervals in the tire circumferential direction TC. Each of the auxiliary lateral grooves 162 and the auxiliary lateral grooves 163 is formed on an extended line along a corresponding one of the auxiliary lateral grooves 161 or on an extended line along a corresponding one of the auxiliary lateral grooves 164. One end of each of the auxiliary lateral grooves 162 and the auxiliary lateral grooves 163, which is located on the outer side in the tread width direction TW, is opened to the circumferential groove 131 or the circumferential groove 133. Meanwhile, the other end of each of the auxiliary lateral grooves 162 and the auxiliary lateral grooves 163, which is located on a side closer to the tire equator line CL, is terminated in the land portion 122 or the land portion 123. Note that the width of the auxiliary lateral grooves 162 and the auxiliary lateral grooves 163 is the same as the width of the auxiliary lateral grooves 161 and the auxiliary lateral grooves 164.

(2) Detailed Configuration of Circumferential Grooves

Figure 12:
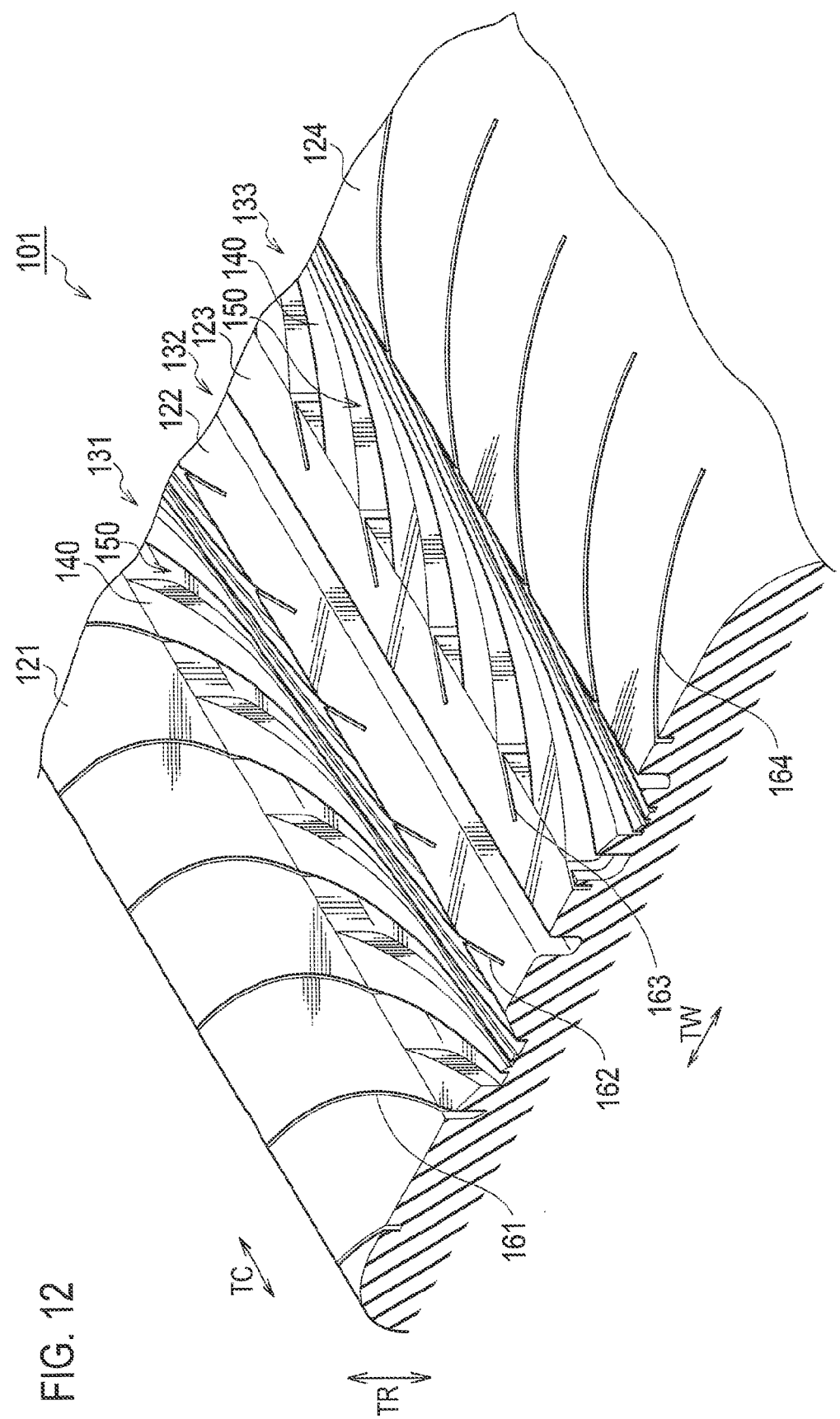
FIG. 12 is a perspective view showing part of the tread contact surface 110 of the pneumatic tire 101 of the embodiment.
Figure 14:
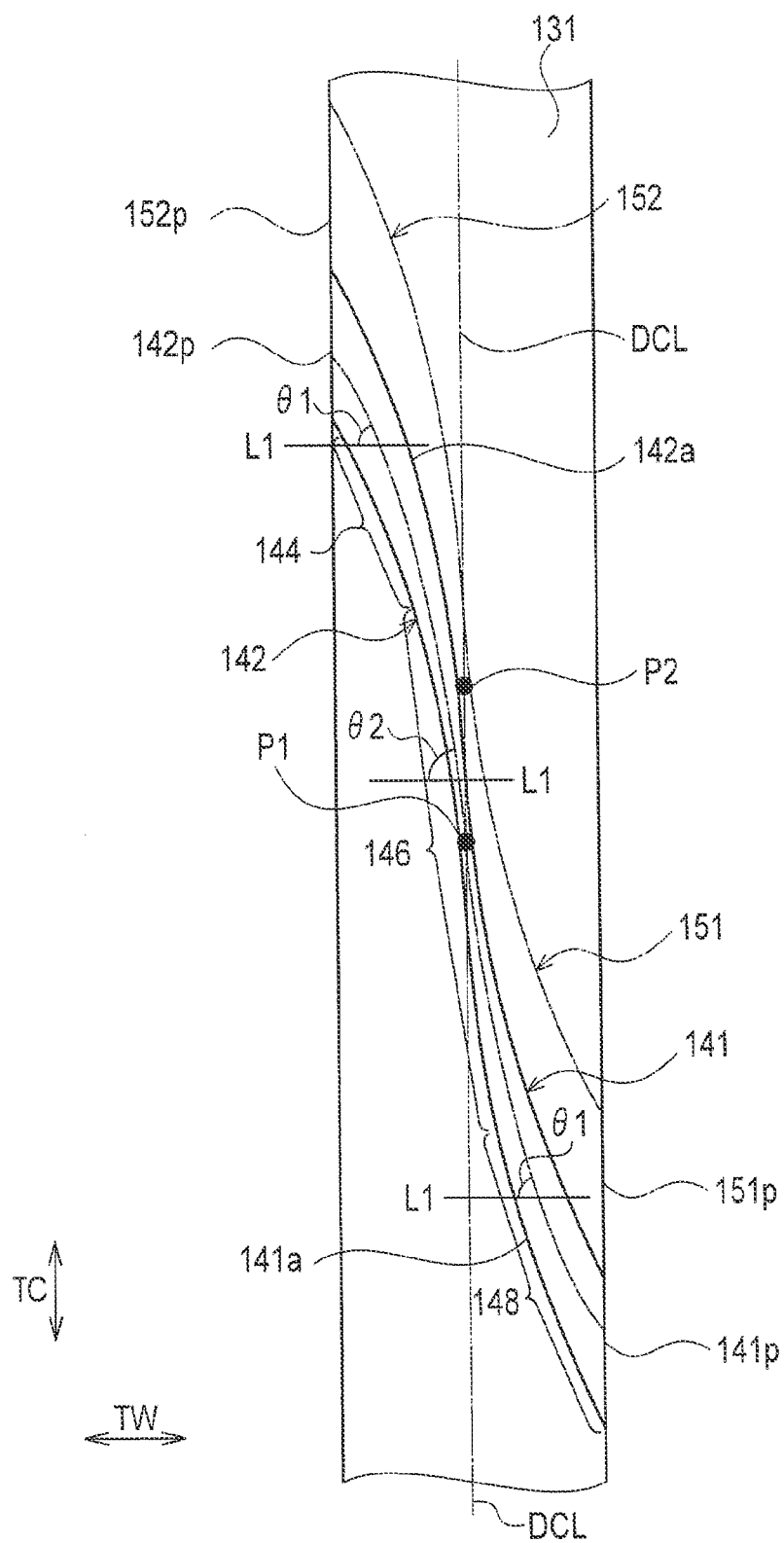
FIG. 14 is an enlarged schematic view showing the shallow groove portion 140 and a deep groove portion 150.

Next, descriptions are given of the configuration of the aforementioned circumferential grooves 130 with reference to FIGS. 11 to 14. FIG. 12 is a perspective view showing part of the tread contact surface 110 of the pneumatic tire 101 of the embodiment. FIG. 13 includes cross-sectional views of the tread contact surface 110 of the pneumatic tire 101 of the embodiment. Specifically, FIG. 13(a) is a view of a cross section of the line A-A in FIG. 11 which is taken in a tire radial direction TR, as viewed in a direction of the arrow B in FIG. 11. Moreover, FIG. 13(b) is a schematic view for explaining the shape of shallow groove portions 140. FIG. 14 is an enlarged schematic view showing the shallow groove portion 140 and a deep groove portion 150.

As shown in FIGS. 11 to 14, among the circumferential grooves 130, the circumferential groove 131 and the circumferential groove 133 include the shallow groove portions 140 forming a first groove portion and the deep groove portions 150 forming a second groove portion. Note that since the configuration of the circumferential groove 131 and the configuration of the circumferential groove 133 are identical, only the circumferential groove 131 is shown in FIGS. 13 and 14 and the description of the circumferential groove 133 is omitted.

The shallow groove portions 140 extend in the tread width direction TW. Specifically, the shallow groove portions 140 extend to curve in the tread width direction TW in the tread-contact-surface view. The shallow groove portions 140 have a shape which becomes narrower in the tread width direction TW toward an inner side in the tire radial direction.

As shown in FIG. 13, in the view of the cross section A-A as viewed in the direction of the arrow B, each shallow groove portion 140 has such a curved shape that the shallow groove portion 140 gradually becomes narrower in the tread width direction TW toward the inner side in the tire radial direction. In other words, the sidewalls 140a of the shallow groove portion 140 each have a shape like a half-moon recessed inward in the tire radial direction in the view of the cross section A-A as viewed in the direction of the arrow B. As shown in FIG. 13 (b), the sidewalls 140a of at least each of the shallow groove portions 140 among the shallow groove portions 140 and the deep groove portions 150 are inclined such that a distance CP between each sidewall 140a and a corresponding one of straight lines PL becomes longer toward a deepest portion 140b of the shallow groove portion 140. Note that, in the view of the cross section A-A as viewed in the direction of the arrow B, the straight lines PL are straight lines which pass through end portions of the land portion 121 and the land portion 122 on sides close to the circumferential groove 131, respectively, and which are parallel to the tire equator line CL. Each shallow groove portion 140 is formed of an inner shallow groove 141 and an outer shallow groove 142.

The inner shallow groove 141 is located closer to the tire equator line CL than a groove center line DCL is, the groove center line DCL passing through the center of the circumferential groove 131 in the tread width direction TW. The outer shallow groove 142 is continuous with the inner shallow groove 141 and is located more outwardly in the tread width direction TW than the groove center line DCL. The inner shallow groove 141 and the outer shallow groove 142 are curved to be opposite to each other in the tire circumferential direction TC. Specifically, as shown in FIG. 14, an outward protruding portion 141a protruding due to the curving of the inner shallow groove 141 and an outward protruding portion 142a protruding due to the curving of the outer shallow groove 142 are each located on a side close to the groove centerline DCL. In other words, the inner shallow groove 141 and the outer shallow groove 142 are provided to be point symmetric to each other with respect to a center point P1 of the shallow groove portion 140 which is located on the groove center line DCL. Moreover, an end portion 141p of the inner shallow groove 141 on a side close to the land portion 122 and an end portion 142p of the outer shallow groove 142 on a side close to the land portion 121 are disposed to be offset from each other in the tire circumferential direction TC.

The outer shallow groove 142 of each shallow groove portion 140 includes a low-angle groove section 144 and a high-angle groove section 146. Similarly, the inner shallow groove 141 of each shallow groove portion 140 includes a low-angle groove section 148 and a high-angle groove section 146. In other words, the low-angle groove section 144 and the low-angle groove section 148 are provided respectively on both ends of the groove portion 140 in the tread width direction TW. Since the low-angle groove section 148 of the inner shallow groove 141 is similar to the low-angle groove section 144 of the outer shallow groove 142, only the low-angle groove section 144 is described hereafter and the description of the low-angle groove section 148 is omitted.

In the low-angle groove section 144, an angle θ1 formed between the shallow groove portion 140 and a straight line L1 orthogonal to the tire equator line CL is smaller than a predetermined angle θ. The low-angle groove section 144 extends in the tread width direction TW. The low-angle groove section 144 is continuous with the land portion 121.

The high-angle groove section 146 is continuous with the low-angle groove section 144. In the high-angle groove section 146, an angle θ2 formed between the shallow groove portion 140 and the straight line L1 is equal to or larger than the predetermined angle θ. The high-angle groove section 146 is located closer to the tire equator line CL than the low-angle groove section 144 is. The high-angle groove section 146 extends in the tire circumferential direction TC. The width of the high-angle groove section 146 in the tire circumferential direction TC is almost constant. The high-angle groove section 146 has a tapered shape which becomes narrower toward the groove center line DCL. Note that the angle θ1 and the angle θ2 are each calculated from an angle formed between the center line of the shallow groove portion 140 and the straight line L1.

The deep groove portions 150 are adjacent to the shallow groove portions 140 in the tire circumferential direction TC, respectively, and extend in the tread width direction TW. Specifically, the shallow groove portions 140 and the deep groove portions 150 are alternately formed in the tire circumferential direction TC. The proportion of the area of the deep groove portions 150 to the area of the circumferential groove 131 is about 20% to 50% of the area of the circumferential groove 131. The deep groove portions 150 extend to curve in the tread width direction TW in the tread-contact-surface view. The deep groove portions 150 are recessed more inwardly in the tire radial direction TR than the shallow groove portions 140 with groove bottoms 140c of the shallow groove portions 140 being upper ends of the deep groove portions 150. Specifically, the deep groove portions 150 have a more rectangular shape than the shallow groove portions 140 in the view of the cross section A-A as viewed in the direction of the arrow B.

The shape of sidewalls 150a of the deep groove portions 150 is a linear shape extending in the tire radial direction TR, in the view of the cross section A-A as viewed in the direction of the arrow B. Moreover, the shape of groove bottoms 150b of the deep groove portions 150 is a linear shape extending in the tread width direction TW, in the view of the cross section A-A as viewed in the direction of the arrow B. Boarders between the sidewalls 150a and the groove bottoms 150b are formed to have a curved shape in the view of the cross section A-A as viewed in the direction of the arrow B. Each deep groove portion 150 is formed of an inner deep groove 151 and an outer deep groove 152.

The inner deep groove 151 is located closer to the tire equator line CL than the groove center line DCL is. The outer deep groove 152 is continuous with the inner deep groove 151 and is located more outwardly in the tread width direction TW than the groove center line DCL. The inner deep groove 151 and the outer deep groove 152 are curved to be opposite to each other in the tire circumferential direction TC. Specifically, as shown in FIG. 14, an outward protruding portion 151a protruding due to the curving of the inner deep groove 151 and an outward protruding portion 152a protruding due to the curving of the outer deep groove 152 are each located on a side close to the groove center line DCL. In other words, the inner deep groove 151 and the outer deep groove 152 are provided to be point symmetric to each other with respect to a center point P2 of the deep groove portion 150 which is located on the groove center line DCL. Moreover, an end portion 151p of the inner deep groove 151 on a side close to the land portion 122 and an end portion 152p of the outer deep groove 152 on a side close to the land portion 121 are disposed to be offset from each other in the tire circumferential direction TC.

(3) Modified Examples

Next, modified examples of the tread contact surface 110 of the pneumatic tire 101 of the aforementioned embodiment are described with reference to the drawings. Note that portions which are the same as those of the tread contact surface 110 of the pneumatic tire 101 of the aforementioned embodiment are denoted by the same reference numerals and portions which are different are mainly described.

(3-1) Modified Example 1

Figure 15:
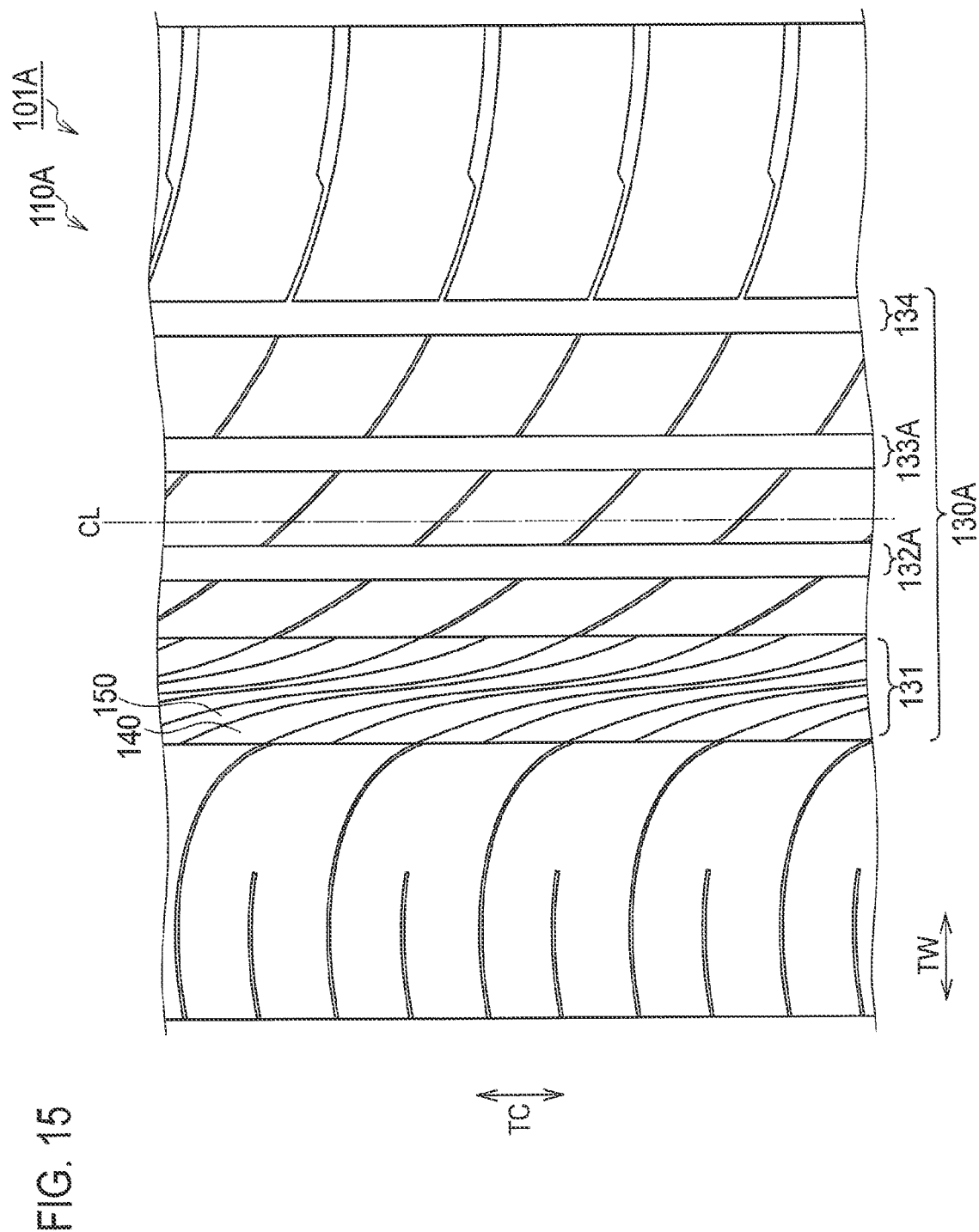
FIG. 15 is a developed view showing part of the tread contact surface 110A of the pneumatic tire 101A of Modified Example 1.
Figure 16:
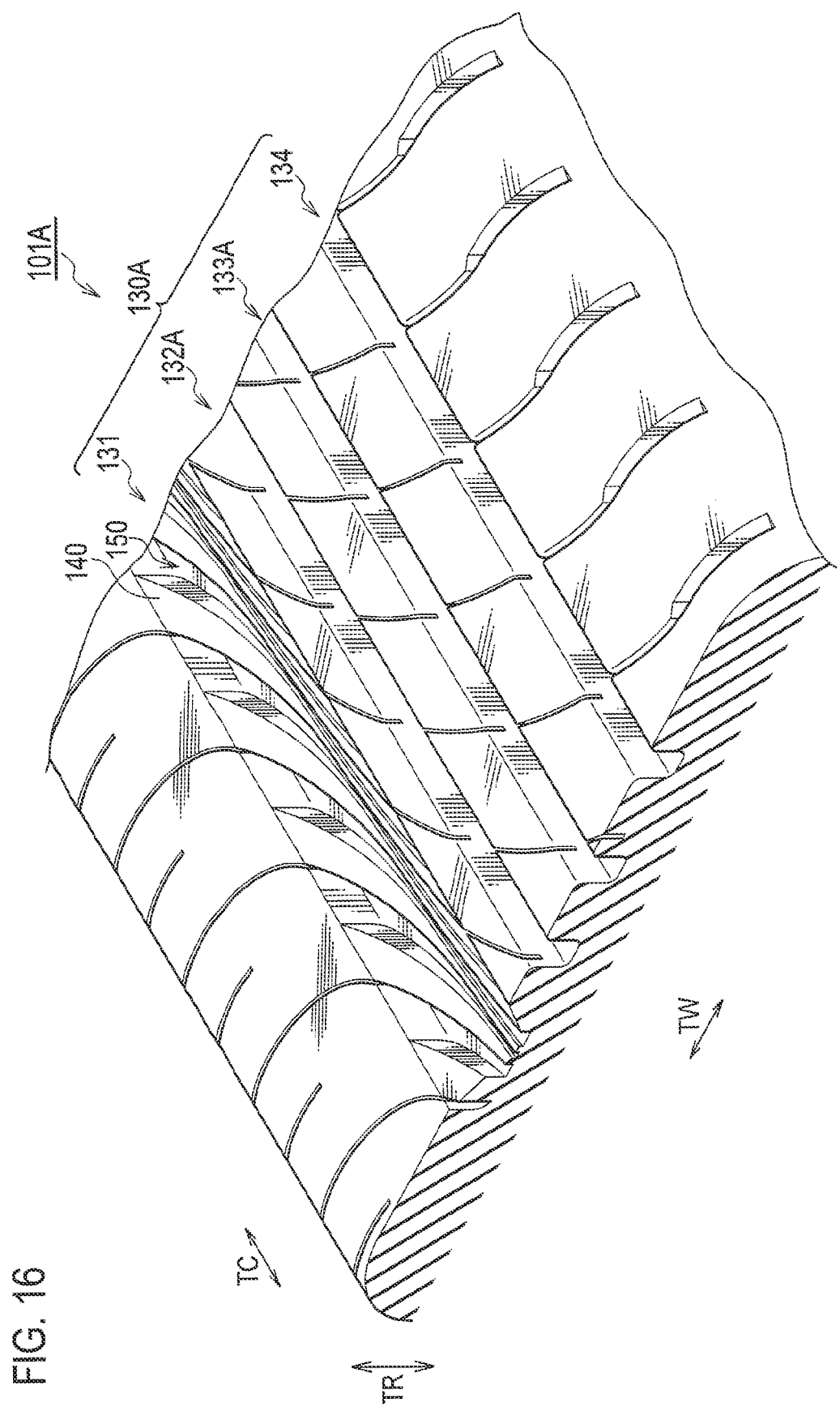
FIG. 16 is a perspective view showing part of the tread contact surface 110A of the pneumatic tire 101A of Modified Example 1.

First, a configuration of a tread contact surface 110A of a pneumatic tire 101A of Modified Example 1 is described with reference to the drawings. FIG. 15 is a developed view showing part of the tread contact surface 110A of the pneumatic tire 101A of Modified Example 1. FIG. 16 is a perspective view showing part of the tread contact surface 110A of the pneumatic tire 101A of Modified Example 1.

In the aforementioned embodiment, the shallow groove portions 140 and the deep groove portions 150 are provided in the two circumferential grooves (circumferential groove 131 and the circumferential groove 133). Meanwhile in Modified Example 1, as shown in FIGS. 15 and 16, the shallow groove portions 140 and the deep groove portions 150 are provided in a single circumferential groove.

Specifically, the shallow groove portions 140 and the deep groove portions 150 are provided only in the circumferential groove 131 located leftmost with respect to the tire equator line CL. In Modified Example 1, circumferential grooves 130A include four circumferential grooves. Specifically, the circumferential grooves 130A include the circumferential groove 131, a circumferential groove 132A, a circumferential groove 133A, and a circumferential groove 134.

The number of the circumferential grooves 130 and the configuration (the shapes, the number, and the like) of the auxiliary lateral grooves are not limited to the ones described in the embodiment and can be selected appropriately depending on a purpose.

Moreover, the shallow groove portions 140 and the deep groove portions 150 are not necessarily provided only in the circumferential groove 131 located leftmost with respect the tire equator line CL and may be provided, for example, only in the circumferential groove 132A and the circumferential groove 133A located near the tire equator line CL or only in the circumferential groove 134 located rightmost with respect to the tire equator line CL.

(3-2) Modified Example 2

Figure 17:
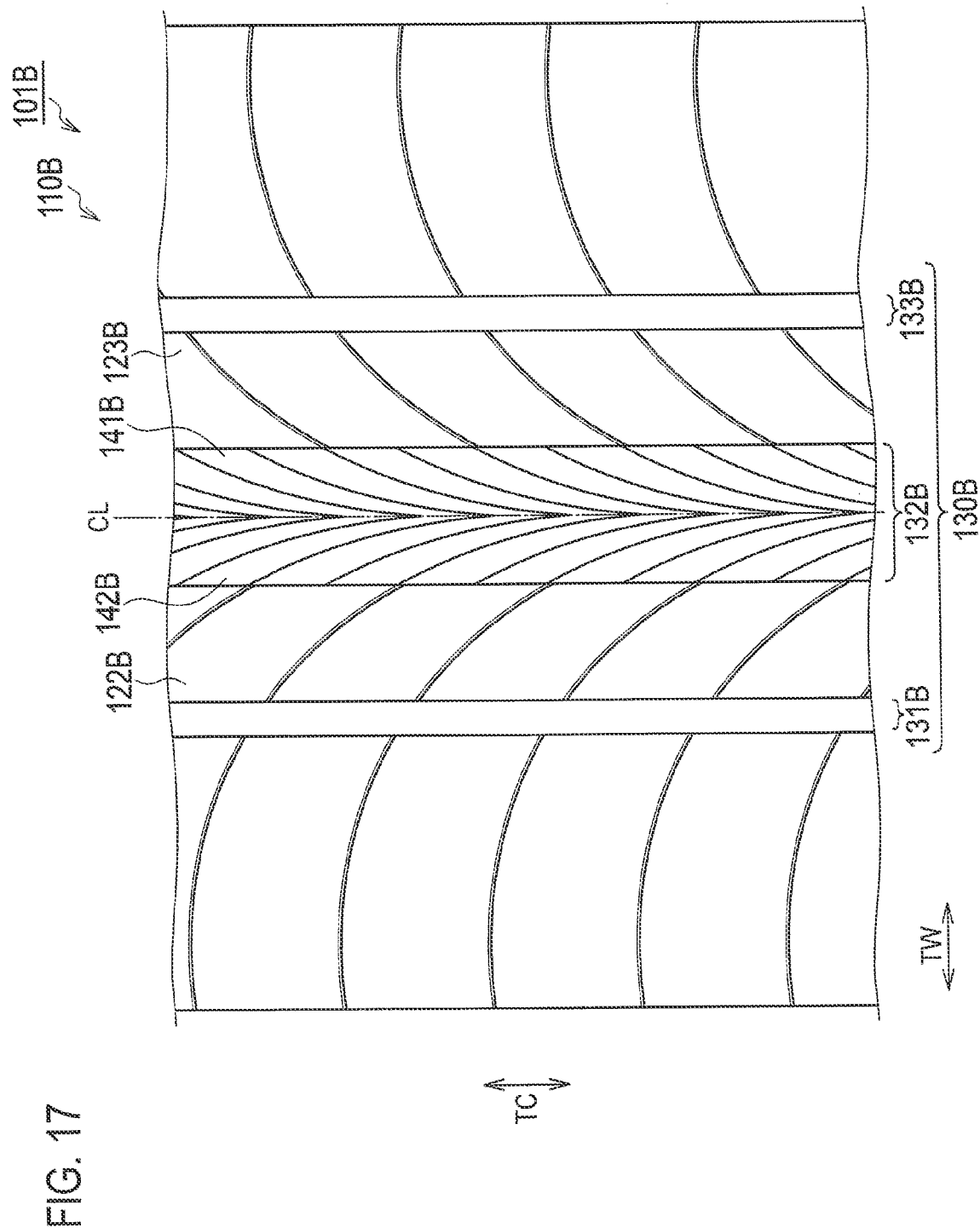
FIG. 17 is a developed view showing part of the tread contact surface 110B of the pneumatic tire 101B of Modified Example 2.
Figure 18:
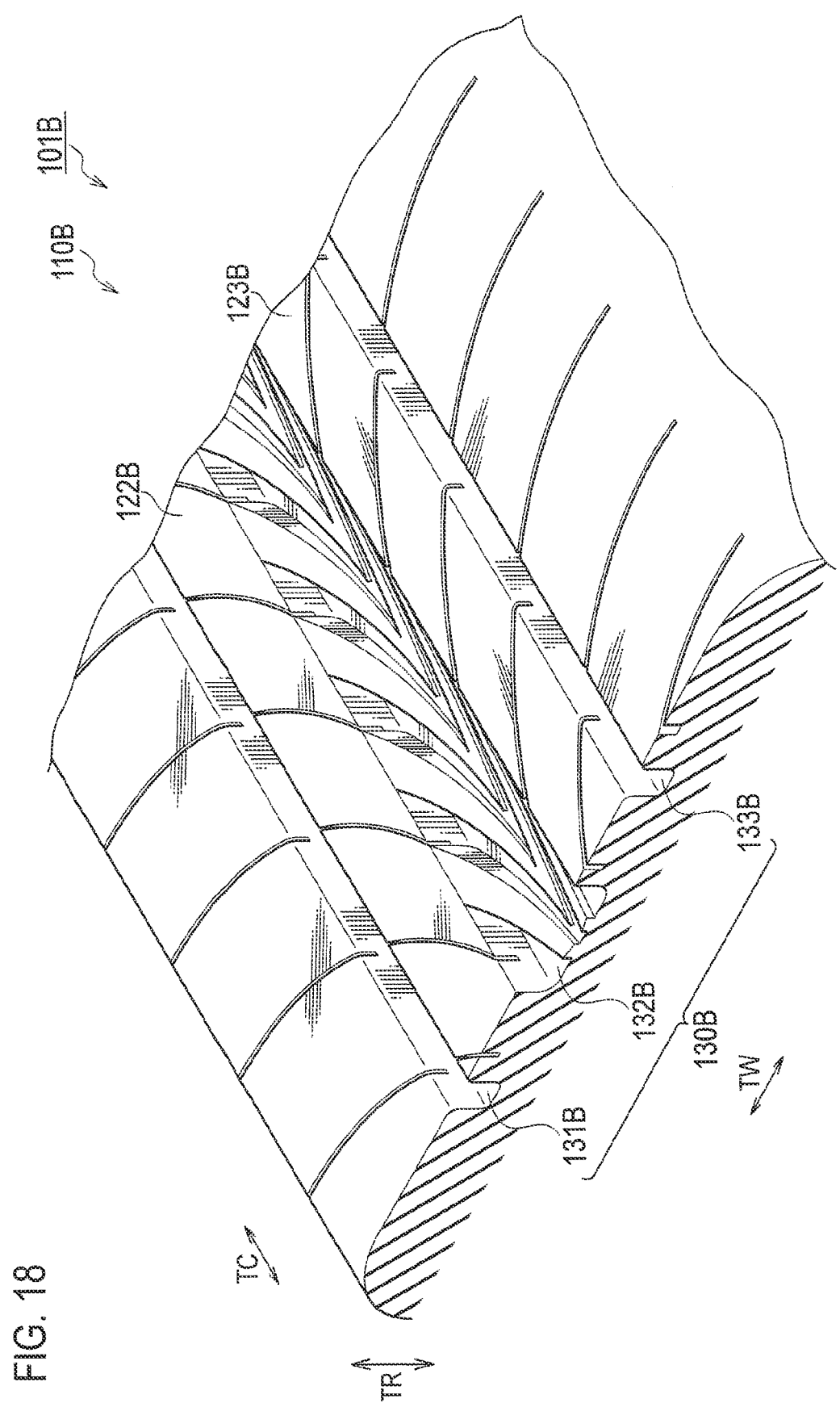
FIG. 18 is a perspective view showing part of the tread contact surface 110B of the pneumatic tire 101B of Modified Example 2.

Next, a configuration of a tread contact surface 110B of a pneumatic tire 101B of Modified Example 2 is described with reference to the drawings. FIG. 17 is a developed view showing part of the tread contact surface 110B of the pneumatic tire 101E of Modified Example 2. FIG. 18 is a perspective view showing part of the tread contact surface 110B of the pneumatic tire 101B of Modified Example 2.

In the aforementioned embodiment, the end portion 141p of each inner shallow groove 141 on the side close to the land portion 122 and the end portion 142p of the corresponding outer shallow groove 142 on the side close to the land portion 121 are disposed to be offset from each other in the tire circumferential direction TC. Moreover, in the embodiment, the end portion 151p of each inner deep groove 151 on the side close to the land portion 122 and the end portion 152p of the corresponding outer deep groove 152 on the side close to the land portion 121 are disposed to be offset from each other in the tire circumferential direction TC.

Meanwhile in Modified Example 2, as shown in FIGS. 17 and 18, the end portion 141p of each inner shallow grooves 141 on the side close to the land portion 122 and the end portion 142p of a corresponding one of outer shallow grooves 142B on the side close to the land portion 121 are disposed respectively at positions which are the same in the tire circumferential direction TC. In other words, the inner shallow grooves 141 and the outer shallow grooves 142B are located to be line symmetric to each other with respect to the tire equator line CL.

Similarly, the end portion 151p of each inner deep groove 151 on the side close to the land portion 122 and the end portion 151p of a corresponding one of outer deep grooves 152B on the side close to the land portion 122 are curved in the same direction with respect to the tire circumferential direction TC. Moreover, the inner deep grooves 151 and the outer deep grooves 152B are located to be line symmetric to each other with respect to the tire equator line CL.

In FIGS. 17 and 18, the circumferential grooves 130B include a circumferential groove 131B, a circumferential groove 132B, and a circumferential groove 133B. Moreover, the shallow groove portions 140 and the deep groove portions 150 are formed only in the circumferential groove 132 located on the tire equator line CL.

Note that the number of circumferential grooves 130 and the configuration (the shapes, the number, and the like) of the auxiliary lateral grooves are not limited to the ones described in the embodiment and can be selected appropriately depending on a purpose.

Furthermore, the shallow groove portions 140 and the deep groove portions 150 are not necessary formed only in the circumferential groove 132 located on the tire equator line CL and may be formed, for example, only in the circumferential groove 131 located leftmost with respect to the tire equator line CL or only in the circumferential groove 133 located rightmost with respect to the tire equator line CL.

(4) Comparative Evaluations

Next, descriptions are given of comparative evaluations performed using pneumatic tires of a comparative example and an example described below to further clarify the effects of the present invention. Specifically, (4-1) configurations of respective pneumatic tires and (4-2) evaluation results are described. Note that the present invention is not limited by these examples.

(4-1) Configurations of Respective Pneumatic Tires

First, brief descriptions are given of the pneumatic tires of the comparative example and the example. Data on the pneumatic tires was measured under the following condition.
Tire size: 225/45R17
Rim size: 7J-17
Vehicle condition: Japanese FF car (displacement of 2000 cc)
Inflation pressure condition: Standard inflation pressure
Load condition: Load of the driver+600 N In the pneumatic tire of the comparative example, no shallow groove portions 140 or deep groove portions 150 described in the embodiment are formed in circumferential grooves. Moreover, auxiliary lateral grooves communicating with the circumferential grooves are formed in land portions. The width of these auxiliary lateral grooves is larger than the width of the auxiliary lateral grooves described in the embodiment.

Meanwhile, in the pneumatic tire of the example, the shallow groove portions 140 and the deep groove portions 150 are formed in the circumferential groove 130. It is assumed that the pneumatic tires of the comparative example and the example each have the tread pattern shown in the modified example of the embodiment described above, as shown in FIGS. 15 and 16. The pneumatic tires of the comparative example and the example are the same except for the configuration of circumferential grooves and the configuration of auxiliary lateral grooves.

(4-2) Evaluation Results

Next, descriptions are given of evaluation results on braking performances of vehicles fitted with the respective types of tires, with reference to FIG. 37.

The braking performance was evaluated as follows. An index of "100" is assigned to a distance (deceleration speed) at which the vehicle fitted with the pneumatic tires of the comparative example took to stop from a speed of 60 km/h by application of full brake on a test course having a water depth of 2 mm and a professional driver performed a feeling evaluation on a deceleration speed of the vehicle the fitted with pneumatic tires of the example. A larger index means a better braking performance.

As a result, as shown in FIG. 37, it was found that the braking performance of the vehicle fitted with the pneumatic tires of the example was better than the braking performance of the vehicle fitted with the pneumatic tires of the comparative example.

(5) Operations and Effects

In the pneumatic tire 101, since the low-angle groove sections 144 are located closer to the land portion 121 than the high-angle groove sections 146 are, the land portion 121 can be easily reinforced. Particularly, since the angle θ1 formed between each shallow groove portion 140 and the corresponding straight line L1 orthogonal to the tire equator line CL is smaller than the predetermined angle θ, the low-angle groove sections 144 can have better stiffness in the tread width direction TW than the high-angle groove sections 146. Accordingly, occurrence of buckling in which the tread warps inward in the tire radial direction can be suppressed near the circumferential groove 131.

Meanwhile, in the high-angle groove sections 146, since the angle θ2 formed between each shallow groove portion 140 and the corresponding straight line L1 orthogonal to the tire equator line CL is equal to or larger than the predetermined angle θ, the high-angle groove sections 146 are formed such that an extending direction of the high-angle groove sections 146 is closer to the tire circumferential direction TC than that of the low-angle groove sections 144 is. Moreover, the high-angle groove sections 146 are disposed closer to the groove center line DCL than the low-angle groove sections 144 are. Hence, occurrence of turbulent flow is suppressed in the high-angle groove sections 146. This secures the drainage of the pneumatic tire 101.

Accordingly, in the pneumatic tire 101, deterioration in braking performance and the like due to buckling can be suppressed with the drainage being secured.

In the embodiment, the low-angle groove sections 144 extend in the tread width direction TW. Hence, the stiffness of the sidewalls 150a of the circumferential groove 131 in the tread width direction TW can be surely improved. Meanwhile, the high-angle groove sections 146 extend in the tire circumferential direction TC. Thus, a water flow in the circumferential groove 131 can be made stable for sure. This surely secures the drainage of the pneumatic tire 101.

In the embodiment, each shallow groove portion 140 has the shape which becomes narrower in the tread width direction TW toward the inner side in the tire radial direction. Hence, at the cross section, the land portion 121 has a shape which becomes wider in the tread width direction TW toward the inner side in the tire width direction, due to the shallow groove portion 140. Hence, the land portion 121 can be further reinforced.

In the embodiment, each high-angle groove section 146 has a tapered shape which becomes narrower toward the groove center line DCL. Thus, occurrence of turbulent flow is further suppressed in the high-angle groove section 146.

In the embodiment, the low-angle groove sections 144 are continuous with the land portion 121 and the land portion 121 thereby has a shape which becomes wider in the tread width direction TW. Hence, the land portion 121 can be more surely reinforced.

In the embodiment, the low-angle groove sections are provided respectively at both ends of each shallow groove portion 140 in the tread width direction TW. Specifically, the shallow groove portion 140 includes the low-angle groove section 144 in the end portion close to the land portion 121 and the low-angle groove section 148 in the end portion close to the land portion 122. Accordingly, it is possible to surely reinforce the sidewalls 150a of the circumferential groove 131 and the sidewalls 150a of the circumferential groove 132 which are located at both ends of the shallow groove portions 140 in the tread width direction TW.

In the embodiment, the shallow groove portions 140 and the deep groove portions 150 are alternately formed in the tire circumferential direction TC. Accordingly, the shallow groove portions 140 can effectively reinforce the sidewalls 150a of the circumferential groove 131 in the tire circumferential direction TC.

In the embodiment, the proportion of the area of the high-angle groove sections 146 to the area of the circumferential groove 131 is equal to or smaller than the proportion of the area of the low-angle groove sections 144 to the area of the circumferential groove 131 in the tread-contact-surface view. Specifically, the proportion of the area of the high-angle groove sections 146 to the area of the circumferential groove 131 is equal to or smaller than the proportion of the total area of the low-angle groove sections 144 and the low-angle groove sections 148 to the area of the circumferential groove 131. Hence, the resistance of each shallow groove portion 140 against a water flow in the circumferential groove 131 becomes smaller from the low-angle groove section 144 toward the high-angle groove section 146. Thus, the drainage improves from the low-angle groove section 144 toward the high-angle groove section 146.

Note that descriptions are given only of the low-angle groove sections 144 in the aforementioned operations and effects. However, similar operations and effects can be obtained from the low-angle groove sections 148 as a matter of course.

(6) Other Embodiments

As described above, the contents of the present invention are disclosed through the embodiment of the present invention. However, the descriptions and drawings forming part of this disclosure should not be understood to limit the present invention. Various alternative modes, embodiments, and operation techniques are made obvious to those skilled in the art from the disclosure.

For example, the embodiment of the present invention can be modified as follows. Specifically, in the aforementioned embodiment, the angle θ1 of the low-angle groove sections 144 is set to be smaller than the predetermined angle θ and the angle θ2 of the high-angle groove sections 146 is set to be equal to or larger than the predetermined angle θ. However, the present invention is not limited to this and may be configured such that, for example, the angle θ1 of the low-angle groove sections 144 is set to be 0° or more and 70° or less and the angle θ2 of the high-angle groove sections 146 is set to be 45° or more and 90° or less. Particularly, the angle θ1 of the low-angle groove sections 144 is preferably smaller than the angle θ2 of the high-angle groove sections 146. In this configuration, the stiffness in the tread width direction TW can be improved by the low-angle groove sections 144. Hence, the stiffness of the land portion 121 can be further improved. In addition, occurrence of turbulent flow can be further suppressed by the high-angle groove sections 146.

Moreover, in the aforementioned embodiment, the tire is the pneumatic tire 101 filled with air or a nitrogen gas. However, the tire is not limited to this and may be a solid tire filled with no air or nitrogen gas.

Moreover, in the above description, the shallow groove portions 140 and the deep groove portions 150 curve in the tread width direction TW in the tread-contact-surface view. However, the shallow groove portions 140 and the deep groove portions 150 are not limited to this and may extend, for example, in a linear shape. The shape of the shallow groove portions 140 and the shape of the deep groove portions 150 are not necessary limited to the ones described in the embodiment and may be set appropriately depending on a purpose.

As described above, the present invention includes various embodiments which are not described herein as a matter of course. Accordingly, the technical scope of the present invention should be determined only by the matters to define the invention in the scope of claims regarded as appropriate based on the above descriptions.

Third Embodiment

Conventionally, tires to be fitted to passenger automobiles and the like have widely employed a tread pattern in which lateral grooves extending in a tread width direction are formed in rib-shaped land portions extending in a tire circumferential direction, in order to improve the braking performance. For example, a tire is known in which many auxiliary lateral grooves are formed in rib-shaped land portions, the auxiliary lateral grooves extending in the tread width direction and dividing the land portions (For example, Japanese Patent Application Publication No. 2004-66922 (page 4, FIG. 1)). In such a tire, a so-called edge component is increased by the many auxiliary lateral grooves and the braking performance is thereby improved.

Moreover, pitch variation in which pitches of the land portions in the tire circumferential direction are varied is widely employed in such a tire to reduce a tire noise (for example, pattern noise and road noise) caused by traveling of a vehicle (for example, Japanese Patent Application Publication No. 2007-168572 (page 5, FIG. 1).

Generally, multiple (for example, nine) metal molds (split mold) being separate in the tire circumferential direction are used in a curing process of the tire. In a tire employing the pitch variation described above, the metal molds thus can not be formed into the same shape and metal molds with different patterns need to be made depending on the positions thereof in the tire circumferential direction. In other words, a tire employing the pitch variation has a problem that a metal mold cost may increase compared to a tire with a constant pitch.

In view of this problem, an object of the present invention is to provide such a tire that an increase in a manufacturing cost due to a metal mold cost is suppressed while a tire noise caused by traveling of a vehicle is suppressed and a braking performance is improved.

To solve the aforementioned problems, the present invention has the following characteristic. First, the characteristic of the present invention is a tire (for example, a pneumatic tire 201) having a circumferential groove (circumferential groove) formed which extends in a tire circumferential direction (tire circumferential direction TC), wherein the circumferential groove includes: a first groove portion (shallow groove portion 240) extending in a tread width direction; and a second groove portion (deep groove portion 250) being adjacent to the first groove portion in the tire circumferential direction and extending in the tread width direction, the second groove portion is recessed more inwardly in a tire radial direction (tire radial direction TR) than the first groove portion with a groove bottom of the first groove portion being an upper end of the second groove portion, and a repetition cycle (λ1) of the first groove portion is almost constant in an entire circumference of the tire.

In the characteristic described above, the repetition cycle λ1 of the first groove portion is almost constant (so-called mono-pitch) in the entire circumference of the tire (tire circumferential direction). This allows at least some of the metal molds being separate in the tire circumferential direction to have the same shape. Hence, there is no need to form metal molds with different patterns as in metal molds used to form a tread pattern with the pitch variation. Accordingly, an increase in manufacturing cost due to a metal mold cost is suppressed.

Moreover, the first groove portion and the second groove portion are included in the circumferential groove. Hence, in an initial stage of a wear, the first groove portion and the second groove portion do not come into contact with the ground. Thus, a noise caused when the first groove portion and the second groove portion come into contact with the ground (so-called pattern noise) does not occur. Meanwhile, even when the first groove portion and the second groove portion come into contact with the ground from the initial stage of wear to a time after a certain amount of wear, the pattern noise occurring after the wear is not a problem compared to the pattern noise occurring in the initial stage of wear. As a result, occurrence of tire noise caused by traveling of a vehicle can be suppressed.

Furthermore, the second groove portion is recessed more inwardly in the tire radial direction than the first groove portion with the groove bottom of the first groove portion being the upper end of the second groove portion. In this configuration, the first groove portion and the second groove portion appear in a contact surface in land portions from the initial stage of wear to the time after the certain amount of wear (latter stage of wear). Accordingly, in the latter stage of wear, an edge component in the contact surface is increased by the first groove portion and the second groove portion and the braking performance is thereby improved.

Next, a third embodiment of a pneumatic tire of the present invention is described with reference to the drawings. Specifically, descriptions are given of (1) an overall configuration of the pneumatic tire, (2) a detailed configuration of a circumferential groove, (3) modified examples, (4) comparative evaluations, (5) operations and effects, and (6) other embodiments.

Note that the same or similar portions are denoted by the same or similar reference numerals in the following descriptions of the drawings. It should be noted however that the drawings are schematic and proportions of dimensions and the like are different from the actual ones.

Accordingly, specific dimensions and the like should be determined in consideration of the following descriptions. Moreover, the drawings include parts showing the dimensional relationships and proportions different from each other, as matter of course.

(1) Overall Configuration of Pneumatic Tire

Figure 19:
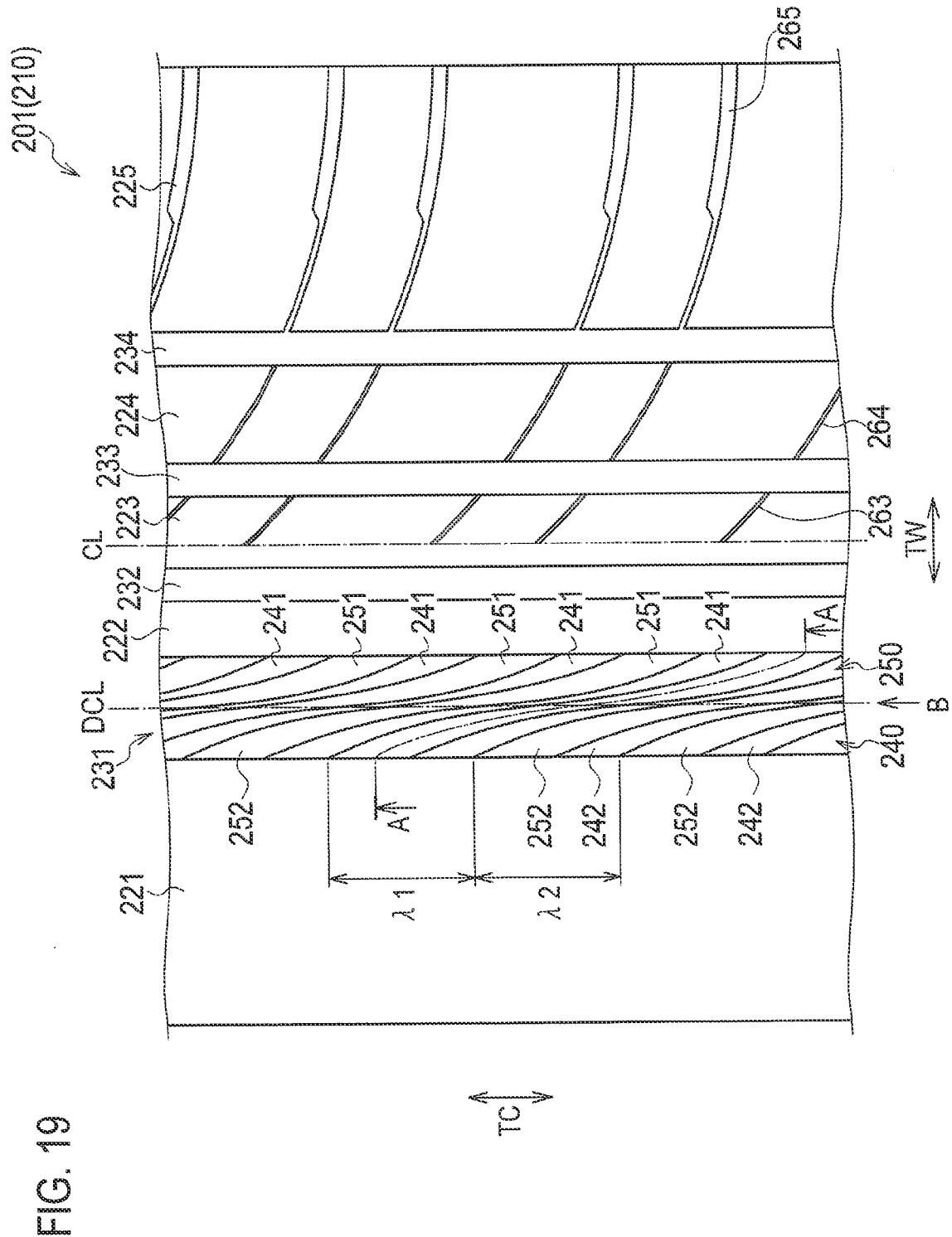
FIG. 19 is a developed view showing part of a tread contact surface 210 of the pneumatic tire 201 of the embodiment.

First, an overall configuration of a pneumatic tire 201 of the embodiment is described with reference to the drawings. FIG. 19 is a developed view showing part of a tread contact surface 210 of the pneumatic tire 201 of the embodiment. The pneumatic tire 201 may be filled with an inert gas such as a nitrogen gas instead of air.

As shown in FIG. 19, the pneumatic tire 201 includes a rib-shaped land portions extending in a tire circumferential direction TC. In the tread contact surface 210 in the land portions, circumferential grooves are formed which are adjacent to the land portions and which extend in the tire circumferential direction TC.

Specifically, the land portions include a land portion 221, a land portion 222, a land portion 223, a land portion 224, and a land portion 225 arranged sequentially from left to right in FIG. 19. Meanwhile, the circumferential grooves include a circumferential groove 231, a circumferential groove 232, a circumferential groove 233, and a circumferential groove 234 arranged sequentially from left to right in FIG. 19.

Among these circumferential grooves, the circumferential groove 231 includes shallow groove portions 240 (first groove portion) and deep groove portions 250 (second groove portion). Specifically, the shallow groove portions 240 and the deep groove portions 250 are included in the circumferential groove 231 formed in the tread contact surface 210 in the land portions on one side of a tire equator line CL. The details of the circumferential groove 231 are described later.

Multiple auxiliary lateral grooves are provided in the land portions. In the embodiment, no auxiliary lateral grooves (grooves or recessed portions) are formed in the tread contact surface 210 in the land portions on the one side (left side in FIG. 19) of the tire equator line CL. Moreover, the auxiliary lateral grooves are formed in the tread contact surface 210 in the land portions on the other side (right side in FIG. 19) of the tire equator line CL.

Specifically, no auxiliary lateral grooves are formed in the land portion 221 and the land portion 222. A set of multiple auxiliary lateral grooves 263, a set of multiple auxiliary lateral grooves 264, and a set of multiple auxiliary lateral grooves 265 are formed respectively in the land portion 223, the land portion 224, and the land portion 225 with predetermined intervals in the tire circumferential direction TC. Each of the auxiliary lateral grooves 263, the auxiliary lateral grooves 264, and the auxiliary lateral grooves 265 curves in a tread width direction TW in a tread-contact-surface view. One end of each of the auxiliary lateral grooves 263, which is located on an outer side in the tread width direction TW, is opened to the circumferential groove 233. Meanwhile, the other end of the auxiliary lateral groove 263, which is located on a side close to the tire equator line CL, is terminated in the land portion 223 (at the tire equator line CL).

Each of the auxiliary lateral grooves 263 and the auxiliary lateral grooves 264 is provided on an extended line along a corresponding one of the auxiliary lateral grooves 265. Each of the auxiliary lateral grooves 263, the auxiliary lateral grooves 264, and the auxiliary lateral grooves 265 has a width smaller than the width of any of the circumferential groove 231, the circumferential groove 232, the circumferential groove 233, and the circumferential groove 234 in the tread width direction TW.

Cycles (so-called pitches) at which the auxiliary lateral grooves 263, the auxiliary lateral grooves 264, and the auxiliary lateral grooves 265 are repeated vary in the entire circumference of the pneumatic tire 201 (tire circumferential direction TC). In other words, the tread contact surface 210 in the land portion 223, the land portion 224, and the land portion 225 is provided with pitch variation in which a pitch is varied in the tire circumferential direction TC.

Here, the tread contact surface 210 in the land portions forms smooth surfaces with no gap when a normal load is applied to the pneumatic tire 201 and the tread contact surface 201 is in contact with the road surface. In other words, no auxiliary lateral grooves are formed in the land portion 221 and the land portion 222. Moreover, when the land portions are in contact with the road surface, the auxiliary lateral grooves (for example, the auxiliary lateral grooves 263 and the auxiliary lateral grooves 264) formed in the land portions in contact with the road surface are closed. The tread contact surface 210 in the land portions thereby forms smooth surfaces.

(2) Detailed Configuration of Circumferential Groove

Figure 20:
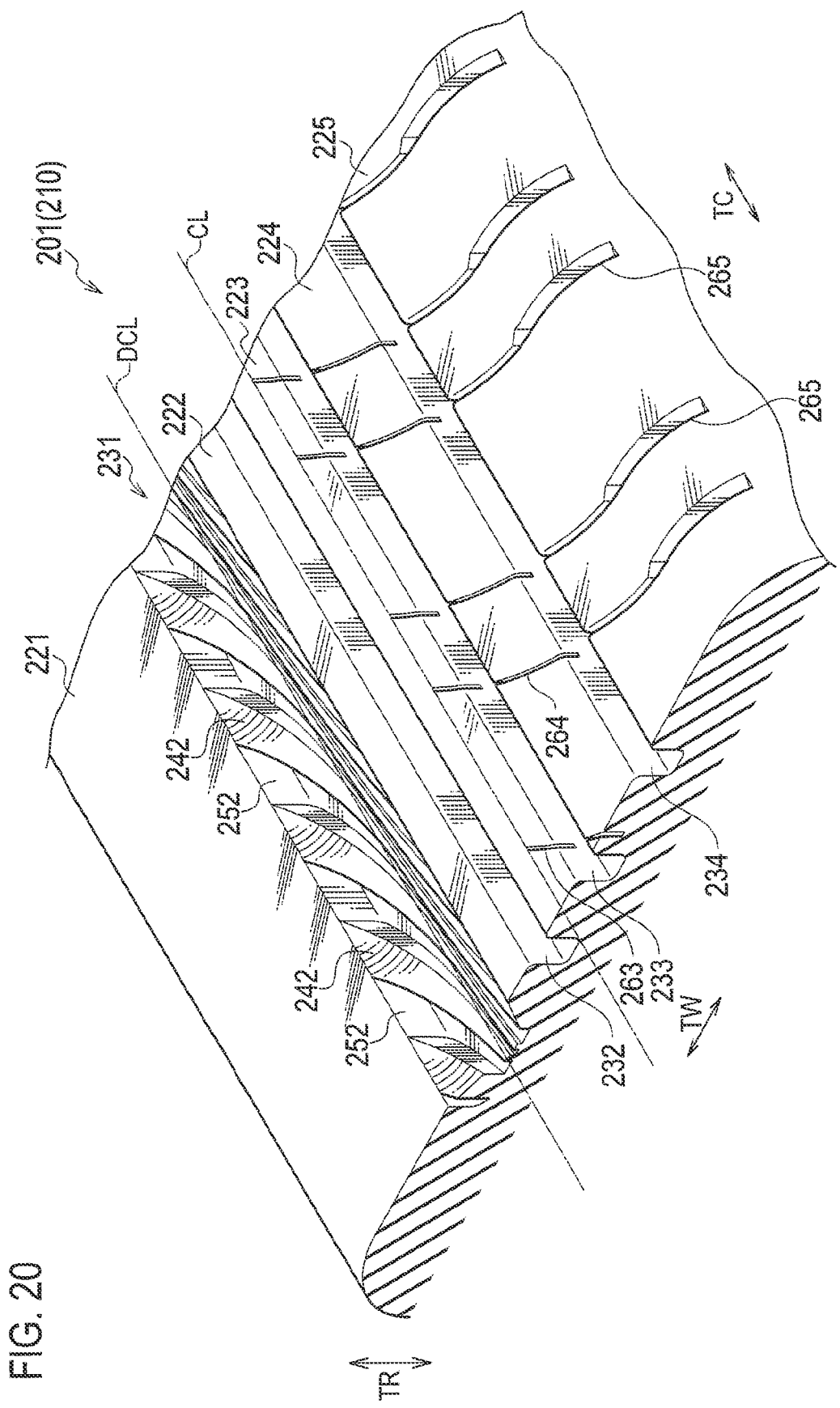
FIG. 20 is a perspective view showing part of the tread contact surface 210 of the pneumatic tire 201 of the embodiment.
Figure 22:
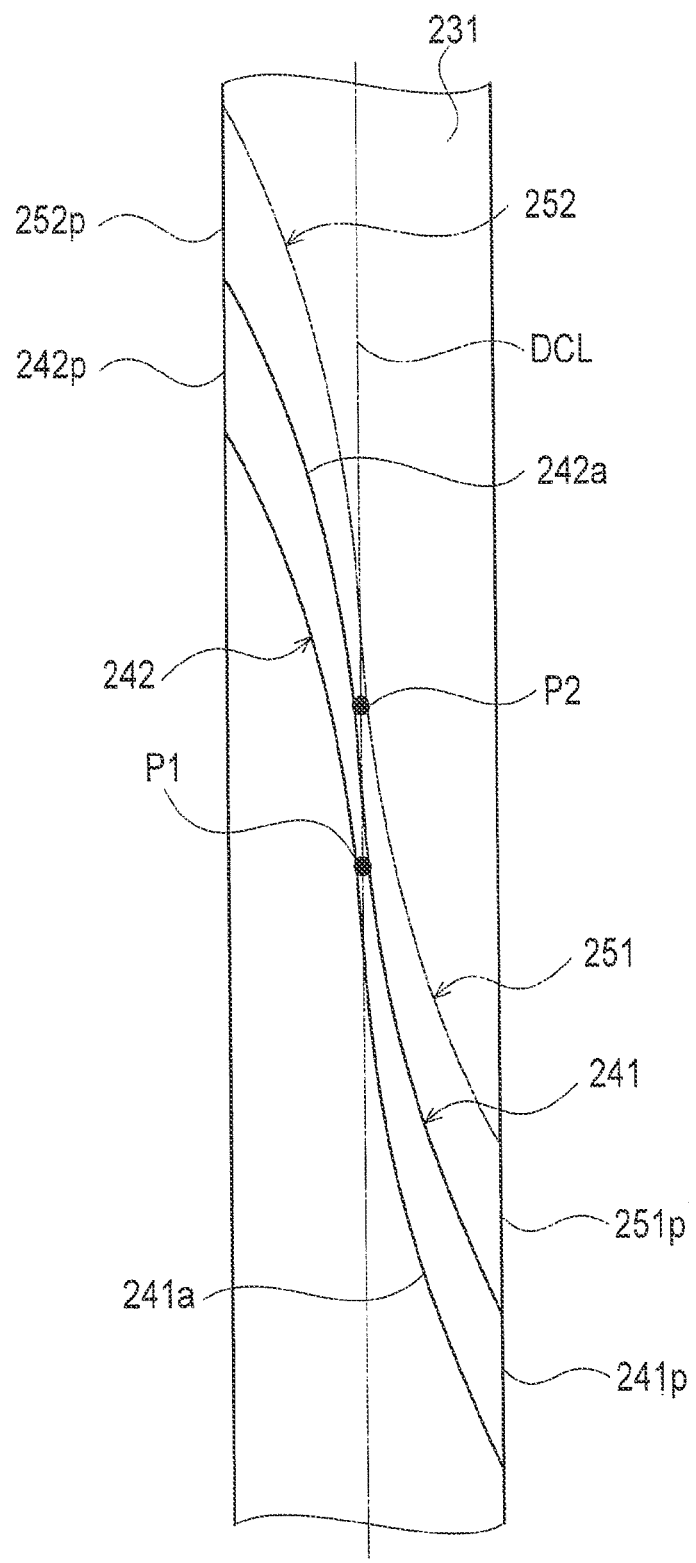
FIG. 22 is an enlarged schematic view showing the shallow groove portion 240 and the deep groove portion 250.

Next, descriptions are given of the detailed configuration of the aforementioned circumferential groove 231 with reference to the drawings. FIG. 20 is a perspective view showing part of the tread contact surface 210 of the pneumatic tire 201 of the embodiment. FIG. 21(a) is a cross-sectional view showing part of the tread contact surface 210 of the pneumatic tire 201 of the embodiment. Specifically, FIG. 21(a) shows a view of a cross section of the line A-A in FIG. 19, which is taken in a tire radial direction TR, as viewed in the direction B in FIG. 19. FIG. 21(b) is an enlarged schematic view showing the circumferential groove 231 in FIG. 21(a). FIG. 22 is an enlarged schematic view showing the shallow groove portion 240 and the deep groove portion 250.

As shown in FIGS. 19 to 22, the shallow groove portions 240 are formed between the land portion 221 and the land portion 222 adjacent to each other. The sidewalls 240a of the shallow groove portions 240 each have a shape like a half-moon recessed inward in the tire radial direction TR, in a tread-width-direction cross section (see FIGS. 20 and 21).

As shown in FIG. 21(b), the sidewalls 240a of at least each of the shallow groove portions 240 among the shallow groove portions 240 and the deep groove portions 250 are inclined such that a distance CP between each sidewall 240a and a corresponding one of straight lines PL becomes longer toward a deepest portion 240b of the shallow groove 240 in the tread-width-direction cross section, the straight lines PL being parallel to the tire equator line CL and passing through ends of the land portions on sides close to the circumferential groove 231. Each shallow groove portion 240 is formed of an inner shallow groove 241 and an outer shallow groove 242 (see FIGS. 19 to 21).

The inner shallow groove 241 is located closer to the tire equator line CL than a groove center line DCL is, the groove center line DCL passing through the tread width direction TW of the circumferential groove 231. The outer shallow groove 242 is continuous with the inner shallow groove 241 and is located more outwardly in the tread width direction TW than the groove center line DCL.

The inner shallow groove 241 and the outer shallow groove 242 are curved to be opposite to each other in the tire circumferential direction TC. Specifically, as shown in FIG. 22, an outward protruding portion 241a protruding due to the curving of the inner shallow groove 241 and an outward protruding portion 242a protruding due to the curving of the outer shallow groove 242 are each located on a side close to the groove center line DCL. In other words, the inner shallow groove 241 and the outer shallow groove 242 are provided to be point symmetric to each other with respect to a center point P1 of the shallow groove portion 240 which is located on the groove center line DCL. Moreover, an end portion 241p of the inner shallow groove 241 on a side close to the land portion 222 and an end portion 242p of the outer shallow groove 242 on a side close to the land portion 221 are disposed to be offset from each other in the tire circumferential direction TC.

The deep groove portions 250 are adjacent to the shallow groove portions 240 in the tire circumferential direction TC, respectively, and extend in the tread width direction TW. Specifically, the deep groove portions 250 extend to curve in the tread width direction TW in the tread-contact-surface view. The deep groove portions 250 are recessed more inwardly in the tire radial direction TR than the shallow groove portions 240 with groove bottoms 240c of the shallow groove portions 240 being upper ends of the deep groove portions 250.

A repetition cycle λ1 of the shallow groove portions 240 (inner shallow grooves 241 and outer shallow grooves 242) as described above is almost constant in the entire circumference (tire circumferential direction TC) of the pneumatic tire 201 (so-called mono-pitch).

The deep groove portions 250 have a more rectangular shape than the shallow groove portions 240 in the tread-width-direction cross section. Specifically, the shape of sidewalls 250a of the deep groove portions 250 is a linear shape extending in the tire radial direction TR, in the tread-width-direction cross section. The shape of groove bottoms 250b of the deep groove portions 250 is a linear shape extending in the tread width direction TW, in the tread-width-direction cross section. Boarders between the sidewalls 250a and the groove bottoms 250b are such that the sidewalls 250a and the groove bottoms 250b are continuous in a curved shape in the tread-width-direction cross section. Each deep groove portion 250 is formed of an inner deep groove 251 and an outer deep groove 252 (see FIGS. 19 to 22).

The inner deep groove 251 is located closer to the tire equator line CL than the groove center line DCL is. The outer deep groove 252 is continuous with the inner deep groove 251 and is located more outwardly in the tread width direction TW than the groove center line DCL.

The inner deep groove 251 and the outer deep groove 252 are curved to be opposite to each other in the tire circumferential direction TC. Specifically, as shown in FIG. 22, an outward protruding portion 251a protruding due to the curving of the inner deep groove 251 and an outward protruding portion 252a protruding due to the curving of the outer deep groove 252 are each located on a side close to the groove center line DCL. In other words, the inner deep groove 251 and the outer deep groove 252 are provided to be point symmetric to each other with respect to a center point P2 of the deep groove portion 250 which is located on the groove center line DCL. Moreover, an end portion 251p of the inner deep groove 251 on a side close to the land portion 222 and an end portion 252p of the outer deep groove 252 on a side close to the land portion 221 are disposed to be offset from each other in the tire circumferential direction TC.

A repetition cycle λ2 of the deep groove portions 250 (inner deep grooves 251 and outer deep grooves 252) as described above is almost constant in the entire circumference of the pneumatic tire 201 as in the case with the repetition cycle λ1 of the shallow groove portions 240.

As described above, in the present embodiment, the tread contact surface 210 in the land portions on the one side (left side in FIG. 19) of the tire equator line CL has a tread pattern with the mono-pitch. Meanwhile, the tread contact surface 210 in the land portions on the other side (right side in FIG. 19) of the tire equator line CL has a tread pattern with the pitch variation.

(3) Modified Examples

Next, modified examples of the tread contact surface 210 of the pneumatic tire 201 of the aforementioned embodiment are described with reference to the drawings. Note that portions which are the same as those of the tread contact surface 210 of the pneumatic tire 201 of the aforementioned embodiment are denoted by the same reference numerals and portions which are different are mainly described.

(3-1) Modified Example 1

Figure 23:
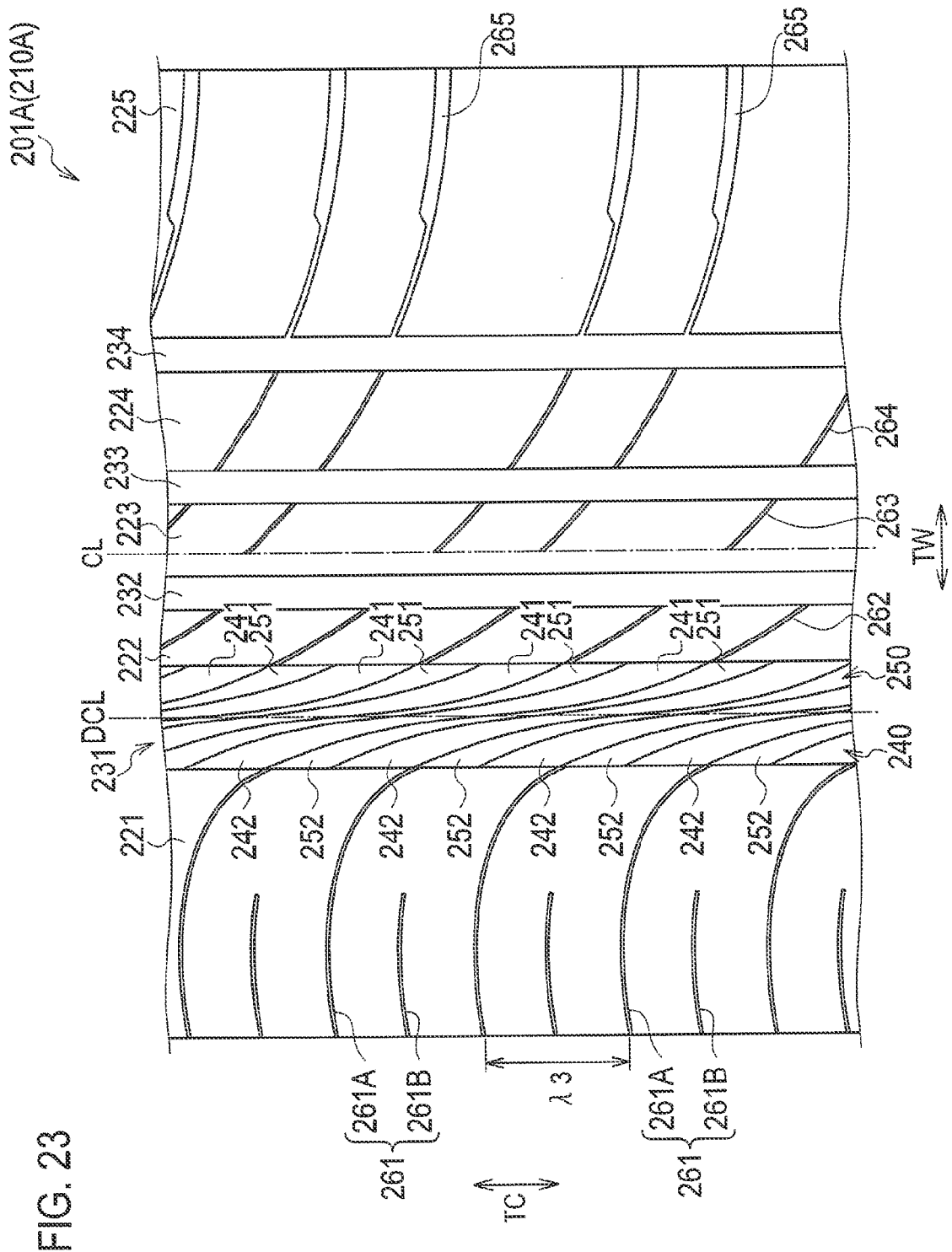
FIG. 23 is a developed view showing part of the tread contact surface 210A of the pneumatic tire 201A of Modified Example 1.
Figure 24:
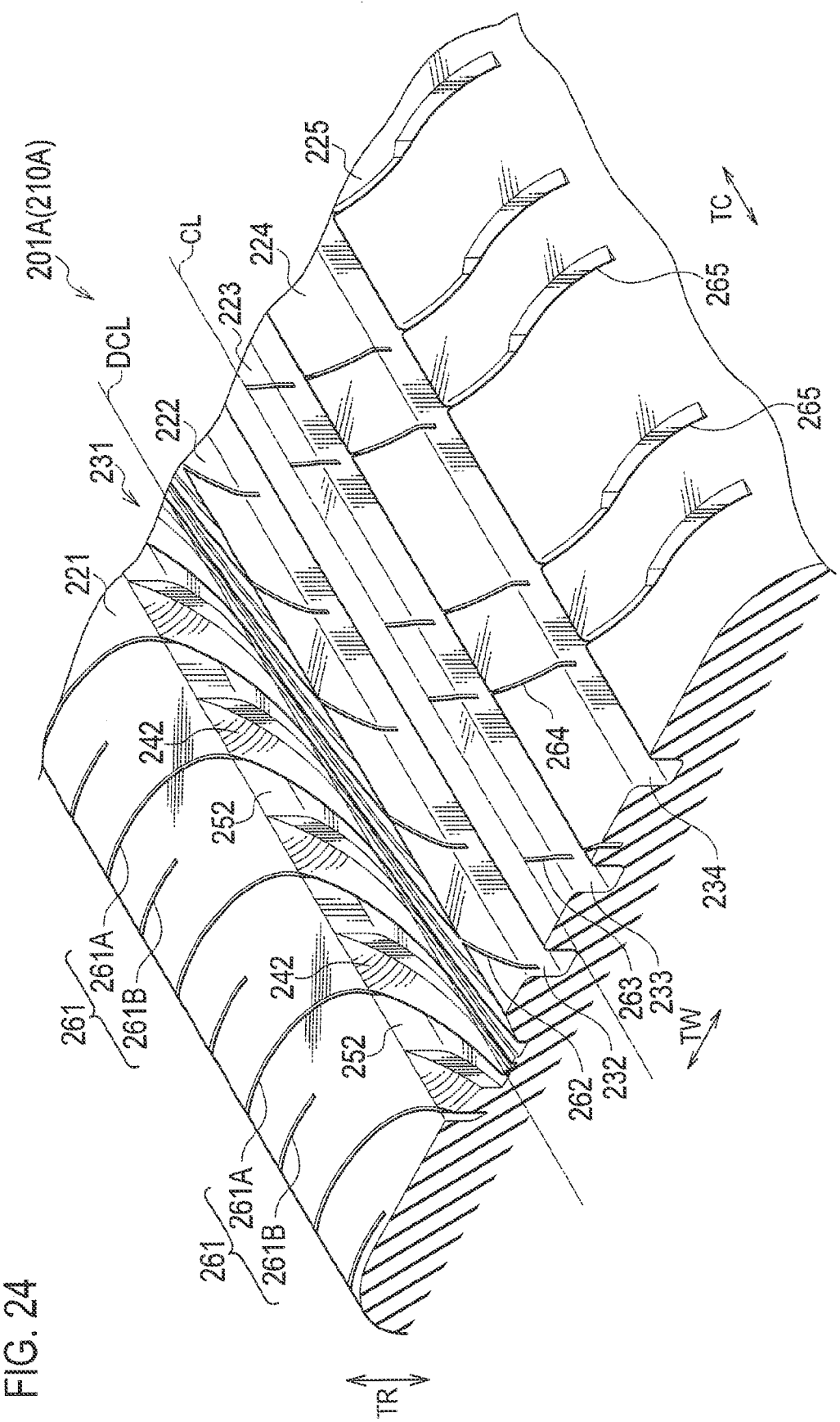
FIG. 24 is a perspective view showing part of the tread contact surface 210A of the pneumatic tire 201A of Modified Example 1.

First, a configuration of a tread contact surface 210A of a pneumatic tire 201A of Modified Example 1 is described with reference to the drawings. FIG. 23 is a developed view showing part of the tread contact surface 210A of the pneumatic tire 201A of Modified Example 1. FIG. 24 is a perspective view showing part of the tread contact surface 210A of the pneumatic tire 201A of Modified Example 1.

In the aforementioned embodiment, no auxiliary lateral grooves are formed in the land portion 221 and the land portion 222. Meanwhile in Modified Example 1, as shown in FIGS. 23 and 24, auxiliary lateral grooves are formed in the land portion 221 and the land portion 222.

Specifically, multiple auxiliary lateral grooves 261 are formed in the land portion 221 with predetermined intervals in the tire circumferential direction TC. The auxiliary lateral grooves 261 include open grooves 261A opened to the circumferential groove 231 and terminated-end grooves 261B whose ends are terminated in the land portion 221. Multiple auxiliary lateral grooves 262 are formed in the land portion 222 with predetermined intervals in the tire circumferential direction TC. The auxiliary lateral grooves 262 are opened to the circumferential groove 231 and the circumferential groove 232.

A repetition cycle λ3 of the auxiliary lateral grooves 261 (open grooves 261A and terminated-end grooves 261B) and the auxiliary lateral grooves 262 as described above is almost constant in the entire circumference (tire circumferential direction TC) of the pneumatic tire 201. In other words, the tread contact surface 210 in the land portions on one side (left side in FIG. 19) of the tire equator line CL has a tread pattern with the mono-pitch.

In this case also, the tread contact surface 210 in the land portions forms smooth surfaces with no gap when a normal load is applied to the pneumatic tire 201 and the tread surface 210 is in contact with the road surface. Specifically, the auxiliary lateral grooves 261, the auxiliary lateral grooves 262, the auxiliary lateral grooves 263, the auxiliary lateral grooves 264, and the auxiliary lateral grooves 265 are closed in the state in contact with the road surface. The tread contact surface 210 in the land portions thereby forms the smooth surfaces.

(3-2) Modified Example 2

Figure 25:
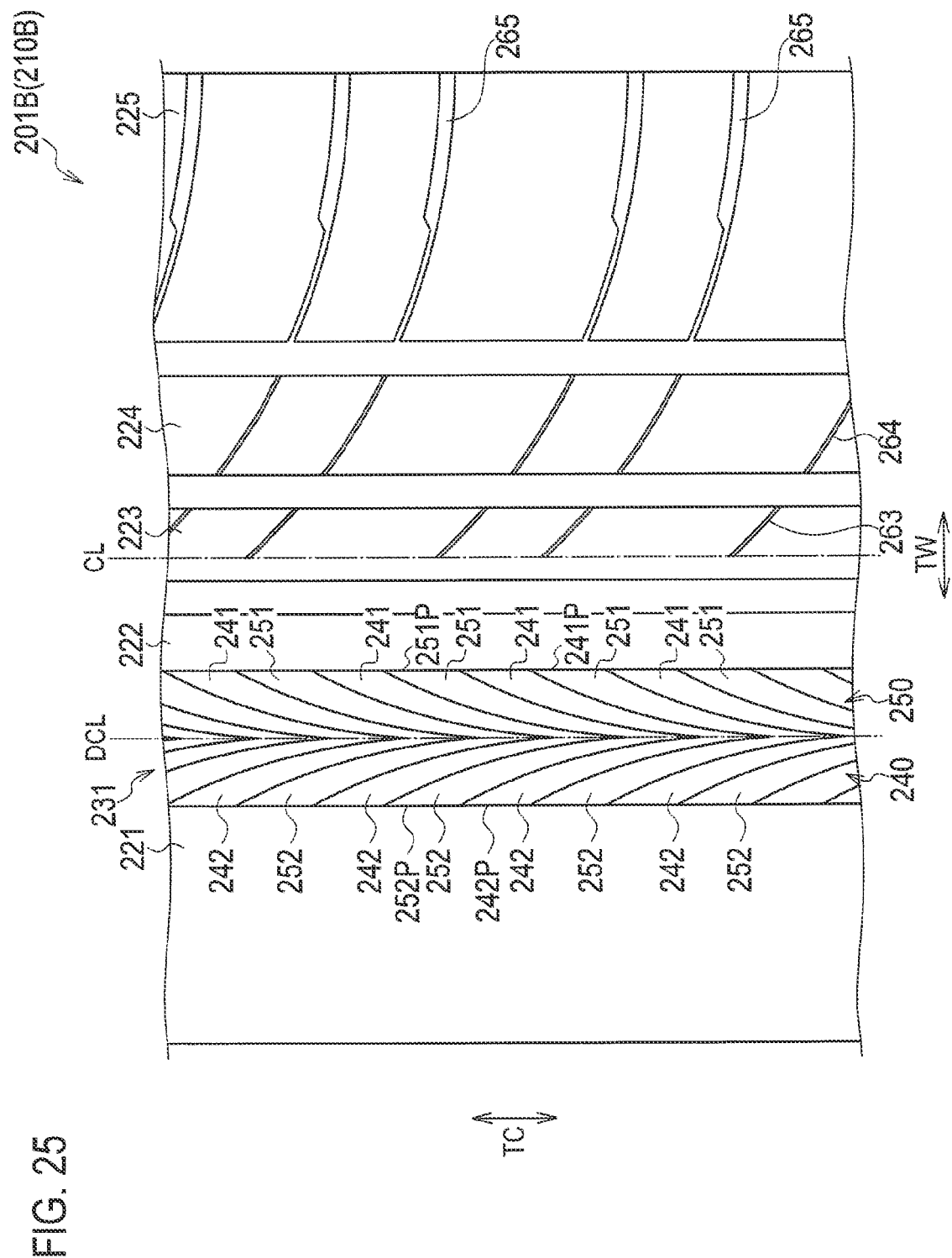
FIG. 25 is a developed view showing part of the tread contact surface 210B of the pneumatic tire 201B of Modified Example 2.
Figure 26:
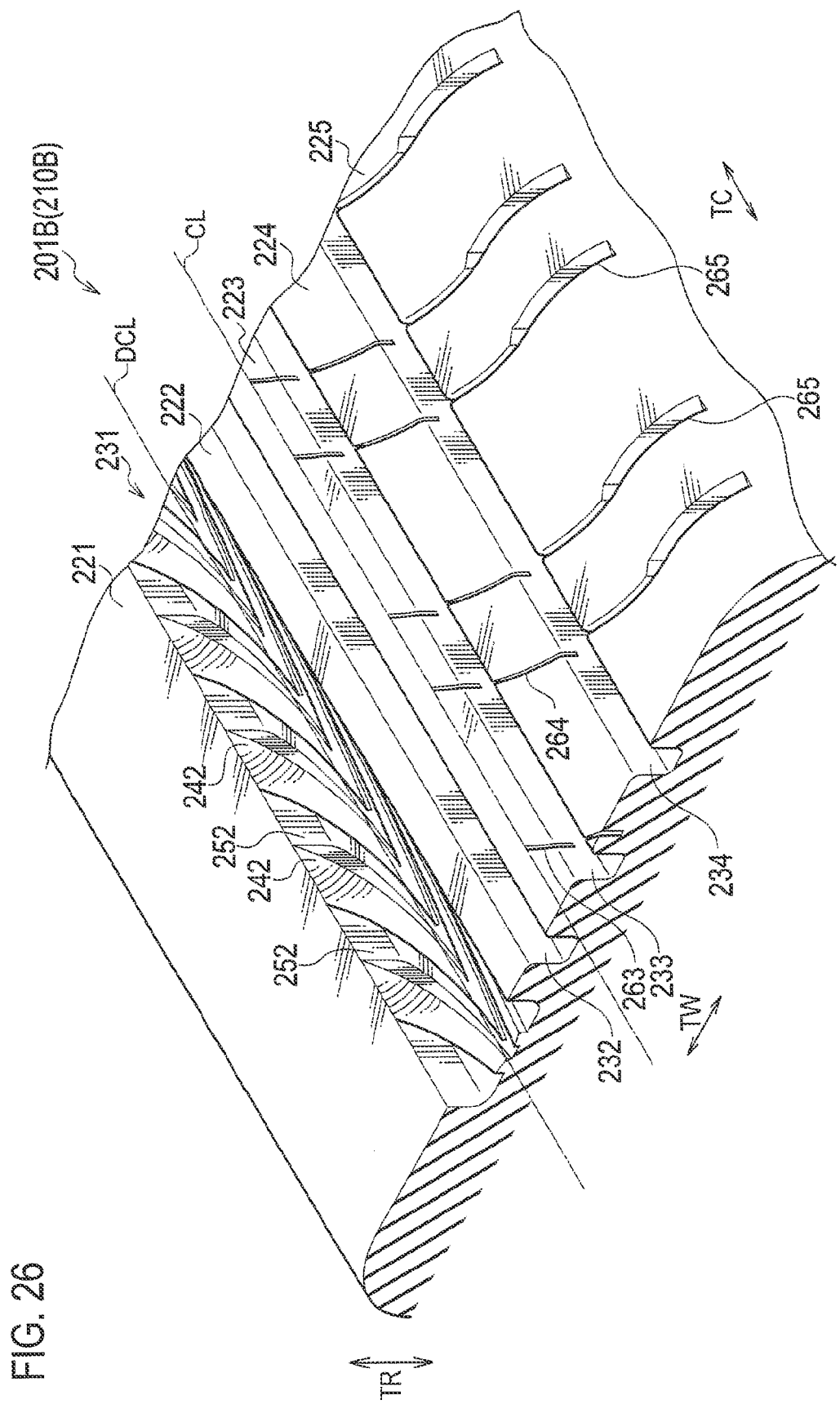
FIG. 26 is a perspective view showing part of the tread contact surface 210B of the pneumatic tire 201B of Modified Example 2.

Next, a configuration of a tread contact surface 210B of a pneumatic tire 201B of Modified Example 2 is described with reference to the drawings. FIG. 25 is a developed view showing part of the tread contact surface 210B of the pneumatic tire 201B of Modified Example 2. FIG. 26 is a perspective view showing part of the tread contact surface 210B of the pneumatic tire 201B of Modified Example 2.

In the aforementioned embodiment, the end portion 241p of each inner shallow groove 241 on the side close to the land portion 222 and the end portion 242p of the corresponding outer shallow groove 242 on the side close to the land portion 221 are disposed to be offset from each other in the tire circumferential direction TC. Moreover, in the embodiment, the end portion 251p of each inner deep groove 251 on the side close to the land portion 222 and the end portion 252p of the corresponding outer deep groove 252 on the side close to the land portion 221 are disposed to be offset from each other in the tire circumferential direction TC.

Meanwhile in Modified Example 3, as shown in FIGS. 25 and 26, the end portion 241p of each inner shallow groove 241 on the side close to the land portion 222 and the end portion 242p of the corresponding outer shallow groove 242 on the side close to the land portion 221 are disposed respectively at positions which are the same in the tire circumferential direction TC. In other words, the inner shallow groove 241 and the outer shallow groove 242 are provided to be line symmetric to each other with respect to the tire equator line CL (groove center line DCL).

Similarly, the end portion 251p of each inner deep groove 251 on the side close to the land portion 222 and the end portion 252p of the corresponding outer deep groove 252 on the side close to the land portion 221 are disposed respectively at positions which are the same in the tire circumferential direction TC. The inner deep groove 251 and the outer deep groove 252 are provided to be line symmetric to each other with respect to the tire equator line CL (groove center line DCL).

(4) Comparative Evaluations

Next, descriptions are given of comparative evaluations performed using pneumatic tires of a comparative example and an example described below to further clarify the effects of the present invention. Specifically, (4-1) configurations of respective pneumatic tires and (4-2) evaluation results are described. Note that the present invention is not limited by these examples.

(4-1) Configurations of Respective Pneumatic Tires

Brief descriptions are given of the pneumatic tires of the comparative example and the example. Data on the pneumatic tires was measured under the following condition.

Tire size: 225/45R17
Rim size: 7J-17
Vehicle condition: Japanese FF car (displacement of 2000 cc)
Inflation pressure condition: Standard inflation pressure
Load condition: Load of the driver+600 N In the pneumatic tire of the comparative example, no shallow groove portions 240 or deep groove portions 250 described in the embodiment are formed in circumferential grooves. Moreover, auxiliary lateral grooves communicating with the circumferential grooves are formed in land portions. These auxiliary lateral grooves have a width larger than the width of the auxiliary lateral grooves described in the embodiment.

Meanwhile, in the pneumatic tire of the example, the shallow groove portions 240 and the deep groove portions 250 are formed in the circumferential groove. No grooves or recess portions are formed in the tread contact surface 210 of the pneumatic tire of the example.

It is assumed that the pneumatic tires of the comparative example and the example each have the tread pattern shown in the aforementioned embodiment (FIGS. 19 to 22). The pneumatic tires of the comparative example and the example are the same except for the configuration of circumferential grooves and the configuration of auxiliary lateral grooves.

(4-2) Evaluation Results

Next, descriptions are given of evaluation results on braking performances and a noise performance of vehicles fitted with the respective types of tires (in a brand-new state and in a worn state), with reference to FIG. 38.

(4-2-1) Braking Performance

The Braking performance when tires were brand new was evaluated as follows. An index of "100" is assigned to a distance (deceleration speed) at which the vehicle fitted with the pneumatic tires of the comparative example took to stop from a speed of 60 km/h by application of full brake on a test course having a water depth of 2 mm and a professional driver performed a feeling evaluation on a deceleration speed of the vehicle fitted with pneumatic tires of the example. A larger index means a better braking performance.

As a result, as shown in FIG. 38, it was found that the braking performance of the vehicle fitted with the pneumatic tires of the example was better than the braking performance of the vehicle fitted with the pneumatic tires of the comparative example.

(5) Operations and Effects

In the embodiment, the repetition cycle λ1 of the shallow groove portions 240 is almost constant (so-called monopitch) in the entire circumference (tire circumferential direction TC) of the pneumatic tire 201. Accordingly, the repetition cycle λ2 of the deep groove portions 250 adjacent to the shallow groove portions 240 is almost constant in the entire circumference of the pneumatic tire 201. This allows at least some of the metal molds being separate in the tire circumferential direction to have the same shape. Hence, there is no need to make metal molds with different patterns as in metal molds used to form a tread pattern with the pitch variation. Accordingly, an increase in manufacturing cost due to the metal mold cost is suppressed.

Moreover, since the shallow groove portions 240 and the deep groove portions 250 are included in the circumferential groove 231, the shallow groove portions 240 and the deep groove portions 250 do not come into contact with the ground in an initial stage of wear. Thus, a noise caused when the shallow groove portions 240 and the deep groove portions 250 come into contact with the ground (so-called pattern noise) does not occur. Meanwhile, from the initial stage of wear to the time after the certain amount of wear, the pattern noise occurring after the wear is not a problem compared to the pattern noise occurring in the initial stage of wear even when the shallow groove portions 240 and the deep groove portions 250 come into contact with the ground. As a result, occurrence of tire noise caused by traveling of a vehicle can be suppressed.

Furthermore, the deep groove portions 250 are recessed more inwardly in the tire radial direction TR than the shallow groove portions 240 with the groove bottoms 240c of the shallow groove portions 240 being the upper ends of the deep groove portions 250. In this configuration, the shallow groove portions 240 and the deep groove portions 250 appear on the tread contact surface 210 from the initial stage of wear to the time after the certain amount of wear (latter stage of wear). Accordingly, in the latter stage of wear, the edge component in the tread contact surface 210 is increased by the shallow groove portions 240 and the deep groove portions 250 and the braking performance can be thereby improved.

Moreover, since the deep groove portions 250 are recessed more inwardly in the tire radial direction TR than the shallow groove portions 240 with the groove bottoms 240c of the shallow groove portions 240 being the upper ends of the deep groove portions 250, the volume of the circumferential groove increases compared to the case where protrusions protruding outward in the tire radial direction TR are formed in the circumferential groove with the groove bottoms 240c of the shallow groove portions 240 being lower ends of the protrusions. As a result, the drainage on a wet road surface is improved and the braking performance on the wet road surface can be thereby improved.

Incidentally, when grooves for exerting edge component of land portions are provided as in conventional land portions in which auxiliary lateral grooves are formed, the heights of the land portions are large and the depths of the grooves are large in the initial stage of wear. Accordingly, the block stiffness (shear stiffness) of the land portions are low and end portions of the land portions which are on sides close to the grooves deform to turn up during braking of a vehicle fitted with the tires. The braking performance thereby deteriorates in some cases.

In view of this problem, in the embodiment, the tread contact surface 210 forms smooth surfaces with no gap when a normal load is applied to the pneumatic tire 201 and the tread contact surface 210 is in contact with the road surface. In other words, no auxiliary lateral grooves are formed in the land portion 221 and the land portion 222. Moreover, when the land portions are in contact with the road surface, the auxiliary lateral grooves (for example, auxiliary lateral grooves 263 and auxiliary lateral grooves 264) formed in the land portions in contact with the road surface are closed. This allows the block stiffness (shear stiffness) of the land portions to be secured more easily compared to the case where the auxiliary lateral grooves are not closed when the land portions are in contact with the road surface. Accordingly, in the initial stage of wear of the pneumatic tire 201, deformation of the land portions during braking of a vehicle fitted with the tire is suppressed and the braking performance can be thereby improved.

In the embodiment, the shallow groove portions 240 and the deep groove portions 250 are included in the circumferential groove 231 formed in the tread contact surface 210 in the land portions (land portion 221 and land portion 222) on the one side of the tire equator line CL. In this configuration, in a two-piece split mold which is divided into two pieces in the tread width direction, at least metal molds being separate in the tire circumferential direction TC, which are included in one piece of the split mold (so-called side mold), can have the same shape. Accordingly, there is no need to make metal molds with different patterns as in metal molds for forming a tread pattern with pitch variation.

Moreover, in the embodiment, the tread contact surface 201 in the land portions (land portion 223, land portion 224, and land portion 225) on the other side of the tire equator line CL has the tread pattern with pitch variation. Accordingly, an energy of noise due to the land portion 223, the land portion 224, and the land portion 225 which are divided by the auxiliary lateral grooves (for example, auxiliary lateral grooves 263, auxiliary lateral grooves 264, and the auxiliary lateral grooves 265) can be distributed. Hence, the peak of sound pressure is reduced (so-called "turned into a white noise") and occurrence of tire noise caused by traveling of a vehicle can be thereby suppressed.

Incidentally, when auxiliary lateral grooves are formed in the land portion 221 and the land portion 222 as in the conventional technique, the auxiliary lateral grooves turn a flow of rain water and the like in the circumferential groove into turbulent flow on a wet road surface and the drainage (hydroplaning performance) is thereby deteriorated. However, in the embodiment, since no auxiliary lateral grooves (grooves or recess portions) are formed in the tread contact surface 210 in the land portion 221 and the land portion 222, a water flow in the circumferential groove 231 is less likely to turn into turbulent flow and is stable. As a result, the drainage on a wet road surface is improved and the braking performance on the wet road surface can be thereby improved.

In the embodiment, the sidewalls 240a of each shallow groove portion 240 are inclined such that the distance CP between each sidewall 240a and the corresponding one of the straight lines PL becomes longer toward the groove bottom 240c of the shallow groove portion 240 in the tread-width-direction cross section, the straight lines PL being parallel to the tire equator line CL and passing through the ends of the land portions on the sides close to the circumferential groove. In the embodiment, the sidewalls 240a of each shallow groove portion 240 each have a shape like a half-moon recessed inward in the tire radial direction TR in the tread-width-direction cross section. Thus, the edge component in the tread contact surface 210 is made to be small in the initial stage of wear to prevent tuning-up of the end portions of land portions which occurs due to low block stiffness of the land portions. Meanwhile, in the latter stage of wear, the edge component in the tread contact surface 210 is made to gradually increase as the block stiffness of the land portions increases with the progress of wear. Hence, a more stable braking performance can be exerted from the initial stage of wear to the time after the certain amount of wear.

In the embodiment, the deep groove portions 250 have a more rectangular shape than the shallow groove portions 240 in the tread-width-direction cross section. This allows the edge component in the tread contact surface 210 to be surely secured until the progress of wear reaches the deep groove portions 250, even when the shallow groove portions 240 wear along with the wear of land portions. Hence, a more stable braking performance can be exerted from the initial stage of wear to the time after the certain amount of wear.

(6) Other Embodiments

As described above, the contents of the present invention are disclosed through the embodiment of the present invention. However, the descriptions and drawings forming part of this disclosure should not be understood to limit the present invention. Various alternative modes, embodiments, and operation techniques are made obvious to those skilled in the art from the disclosure.

For example, the embodiment of the present invention can be modified as follows. Specifically, the tire is described as the pneumatic tire 201 filled with air or a nitrogen gas. However, the tire is not limited to this and may be a solid tire filled with no air or nitrogen gas.

Moreover, the tread pattern of the pneumatic tire 201 is not limited to the ones described above and may be set as appropriate depending on a purpose, as a matter of course. Specifically, the configurations (the shapes and the numbers) of land portions, circumferential grooves, and auxiliary lateral grooves can be set as appropriate depending on a purpose.

Moreover, the shallow groove portions 240 and the deep groove portions 250 are not necessarily provided only in the circumferential groove 231 located leftmost with respect to the tire equator line CL and may be provided, for example, only in the circumferential groove 232 and the circumferential groove 233 located near the tire equator line CL, only in the circumferential groove 234 located rightmost with respect to the tire equator line CL, or in all of the circumferential grooves.

Moreover, the descriptions are given that the shallow groove portions 240 and the deep groove portions 250 each extend to curve in the tread width direction TW in the tread-contact-surface view. However, the shallow groove portions 240 and the deep groove portions 250 are not limited to this and may each extend in, for example, a linear shape. In addition, the shape of the shallow groove portions 240 and the shape of the deep groove portions 250 are not necessary limited to the ones described in the embodiment and may be set as appropriate depending on a purpose.

Furthermore, the descriptions are given that the tread contact surface 210 has the tread pattern with mono-pitch in the land portions on the one side of the tire equator line CL and the tread pattern with pitch variation in the land portions on the other side of the tire equator line CL. However, the tread contact surface 210 is not limited to this and may have a tread pattern with a mono-pitch pattern over the entire tread contact surface 210.

Moreover, the tread contact surface 210 in the land portions is described to form smooth surfaces. However, the tread contact surface 210 is not limited to this and may not form smooth surfaces. Specifically, the auxiliary lateral grooves may not be closed when the tread contact surface 210 is in contact with the road surface.

As described above, the present invention includes various embodiments which are not described herein as a matter of course. Accordingly, the technical scope of the present invention should be determined only by the matters to define the invention in the scope of claims regarded as appropriate based on the above descriptions.

Fourth Embodiment

Conventionally, a method of forming multiple circumferential grooves in a tread has been widely used in tires to be fitted to a passenger automobile and the like, in order to secure drainage on a wet road surface. Wall surfaces and groove bottom portions of such circumferential grooves are generally formed to be smooth so as not to interrupt draining.

Meanwhile, a tire is known in which a small spiral-shaped protrusion is provided in a groove bottom portion of a circumferential groove to actively drain rain water entering the circumferential groove (for example, Japanese Patent Application Publication No. 2005-170381 (Page 3, FIG. 2)). In such a tire, a water flow is generated in the rain water entering the circumferential groove and the drainage is thereby improved.

However, the conventional tires described above have the following problems. Specifically, the tire in which the wall surfaces and the groove bottom portions of the circumferential grooves are formed to be smooth and the tire in which the small spiral-shaped protrusion is merely provided in the groove bottom portion have such a problem that buckling in which a tread warps inward in a tire radial direction is likely to occur near the circumferential grooves. Accordingly, the tires have a problem that a cracks are likely to occur in the circumferential grooves.

Meanwhile, although it is conceivable to reinforce the wall surfaces and the groove bottom portions of the circumferential grooves to suppress occurrence of buckling near the circumferential grooves, such reinforcement may cause another problem of an increase in weight of the tire.

In view of these problems, an object of the present invention is to provide such a tire that occurrence of crack in circumferential grooves which is caused by buckling can be suppressed with an increase in weight of the tire being suppressed.

To solve the aforementioned problems, the present invention has the following characteristics. First, a characteristic of the present invention is a tire (for example, pneumatic tire 301) including multiple rib-shaped land portions (for example, land portion 321) extending in a tire circumferential direction (tire circumferential direction TC), the tire having a circumferential groove (for example, circumferential groove 331) formed which is adjacent to the land portions and which extends in the tire circumferential direction, wherein the circumferential groove includes: a first groove portion (for example, shallow groove portion 340) formed between adjacent ones of the land portions; and a second groove portion (for example, deep groove portion 350) being adjacent to the first groove portion in the tire circumferential direction and formed between the adjacent land portions, the first groove portion has a shape which becomes narrower in a tread width direction (tread width direction TW) toward an inner side in a tire radial direction, the second groove portion is formed of: side walls located respectively on both sides in the tread width direction and extending in the tire radial direction (tire radial direction TR); and a groove bottom (groove bottom 340c) continuous with the side walls and extending in the tread width direction, and the second groove portion is recessed more inwardly in the tire radial direction than the first groove portion with the groove bottom of the first groove portion being an upper end of the second groove portion.

In the characteristic described above, the first groove portion of the circumferential groove is formed between the land portions and has the shape which becomes narrower in the tread width direction toward the inner side in the tire radial direction. In other words, the land portions have a shape which becomes wider in the tread width direction toward the inner side in the tire radial direction. Accordingly, the stiffness of the land portions in the tread width direction can be improved by the first groove portion. This suppresses occurrence of buckling near the circumferential groove and occurrence of crack in the circumferential groove which is caused by buckling is thereby suppressed.

Moreover, the second groove portion is recessed more inwardly in the tire radial direction TR than the first groove portion with the groove bottom of the first groove portion being the upper end of the second groove portion. Thus, the volume of the tire is reduced and the weight of tire can be thereby effectively reduced.

Accordingly, it is possible to provide such a tire that occurrence of crack in the circumferential groove which is caused by buckling can be suppressed with an increase in weight of the tire being suppressed.

Next, a fourth embodiment of a pneumatic tire of the present invention is described with reference to the drawings. Specifically, descriptions are given of (1) an overall configuration of the pneumatic tire, (2) a detailed configuration of circumferential grooves, (3) modified examples, (4) comparative evaluations, (5) operations and effects, and (6) other embodiments.

Note that the same or similar portions are denoted by the same or similar reference numerals in the following descriptions of the drawings. It should be noted however that the drawings are schematic and proportions of dimensions and the like are different from the actual ones.

Accordingly, specific dimensions and the like should be determined in consideration of the following descriptions. Moreover, the drawings include parts showing the dimensional relationships and proportions different from each other, as matter of course.

(1) Overall Configuration of Pneumatic Tire

Figure 27:
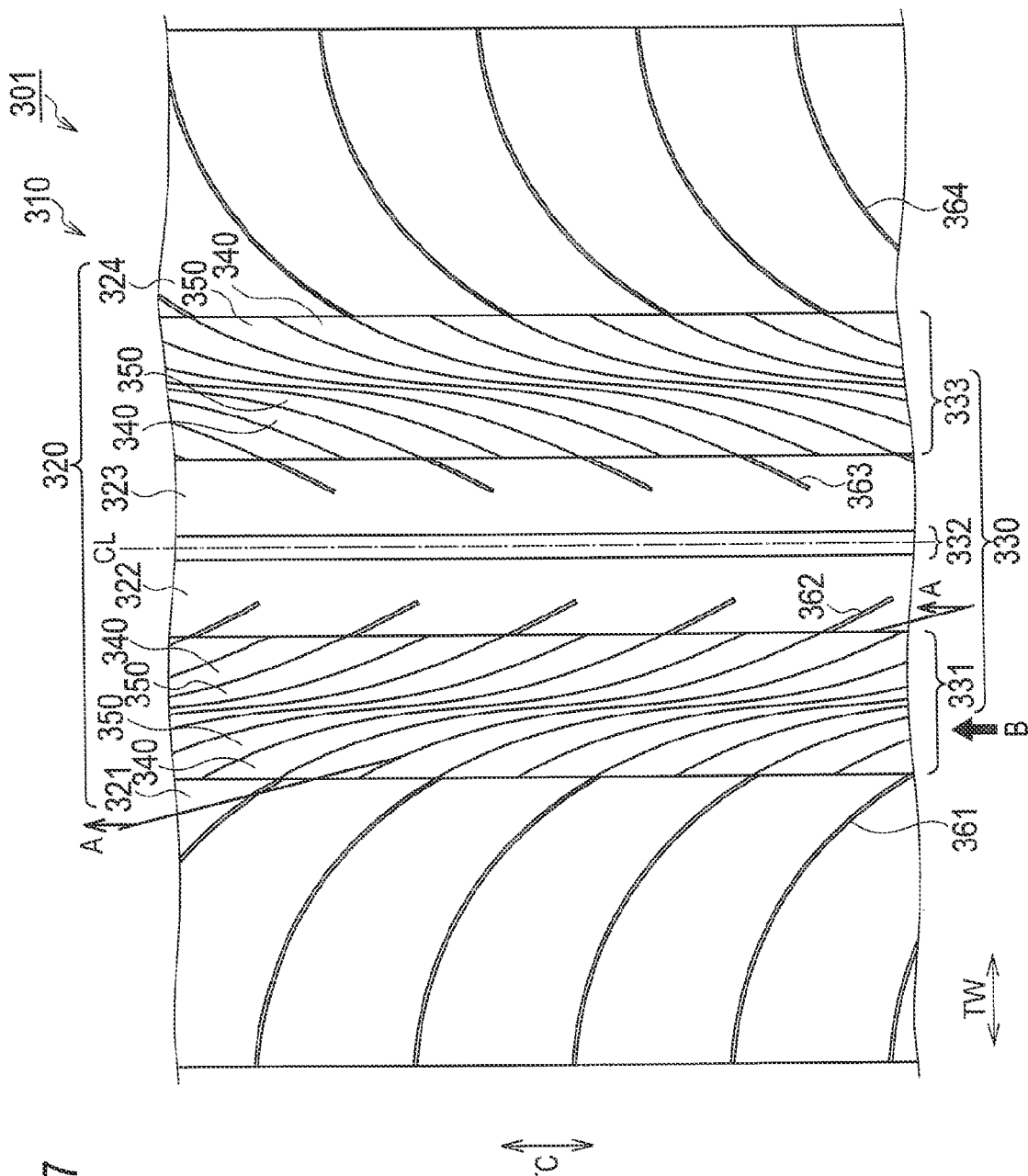
FIG. 27 is a developed view showing part of a tread contact surface 310 of the pneumatic tire 301 of the embodiment.

First, an overall configuration of a pneumatic tire 301 of the embodiment is described with reference to the drawings. FIG. 27 is a developed view showing part of a tread contact surface 310 of the pneumatic tire 301 of the embodiment. The pneumatic tire 301 may be filled with an inert gas such as a nitrogen gas instead of air.

As shown in FIG. 27, the pneumatic tire 301 includes rib-shaped land portions 320 extending in a tire circumferential direction TC. In the tread contact surface 310 in the land portions 320, circumferential grooves 330 are formed which are adjacent to the land portions 320 and which extend in the tire circumferential direction TC.

Specifically, the land portions 320 include a land portion 321, a land portion 322, a land portion 323, and a land portion 324 arranged sequentially from left to right in FIG. 27. Multiple circumferential grooves 330 are formed. Specifically, the circumferential grooves 330 include a circumferential groove 331, a circumferential groove 332, and a circumferential groove 333 arranged sequentially from left to right in FIG. 27.

Multiple auxiliary lateral grooves are provided in the land portions 320. Specifically, multiple auxiliary lateral grooves 361 are formed in the land portion 321 with predetermined intervals in the tire circumferential direction TC. Similarly, multiple auxiliary lateral grooves 364 are formed in the land portion 324 with predetermined intervals in the tire circumferential direction TC. Each of the auxiliary lateral grooves 361 and the auxiliary lateral grooves 364 extends to curve in a tread width direction TW in a tread-contact-surface view and is opened to the circumferential groove 331 or the circumferential groove 333. Each of the auxiliary lateral grooves 361 and the auxiliary lateral grooves 364 has a width smaller than the width of any of the circumferential groove 331, the circumferential groove 332, and the circumferential groove 333 in the tread width direction TW.

As in the case with the auxiliary lateral grooves 361, a set of multiple auxiliary lateral grooves 362 and a set of multiple auxiliary lateral grooves 363 are formed respectively in the land portion 322 and the land portion 323 with predetermined intervals in the tire circumferential direction TC. Each of the auxiliary lateral grooves 362 and the auxiliary lateral grooves 363 is formed on an extended line along a corresponding one of the auxiliary lateral grooves 361 or on an extended line along a corresponding one of the auxiliary lateral grooves 364. One end of each of the auxiliary lateral grooves 362 and the auxiliary lateral grooves 363, which is located on the outer side in the tread width direction TW, is opened to the circumferential groove 331 or the circumferential groove 333. Meanwhile, the other end of each of the auxiliary lateral grooves 362 and the auxiliary lateral grooves 363, which is located on a side closer to the tire equator line CL, is terminated in the land portion 322 or the land portion 323. Note that the width of the auxiliary lateral grooves 362 and the auxiliary lateral grooves 363 is the same as the width of the auxiliary lateral grooves 361 and the auxiliary lateral grooves 364.

(2) Detailed Configuration of Circumferential Grooves

Figure 28:
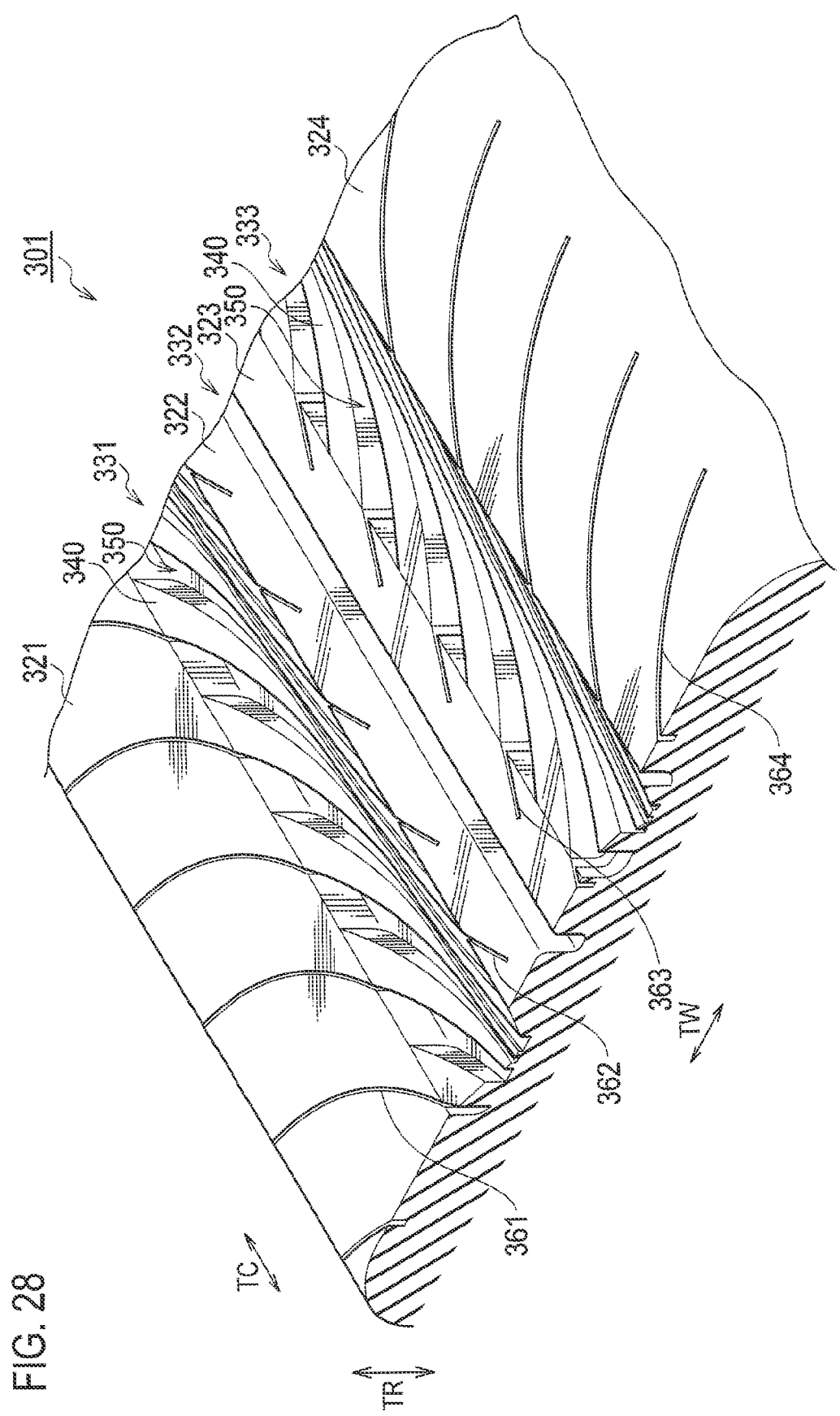
FIG. 28 is a perspective view showing part of the tread contact surface 310 of the pneumatic tire 301 of the embodiment.
Figure 30:
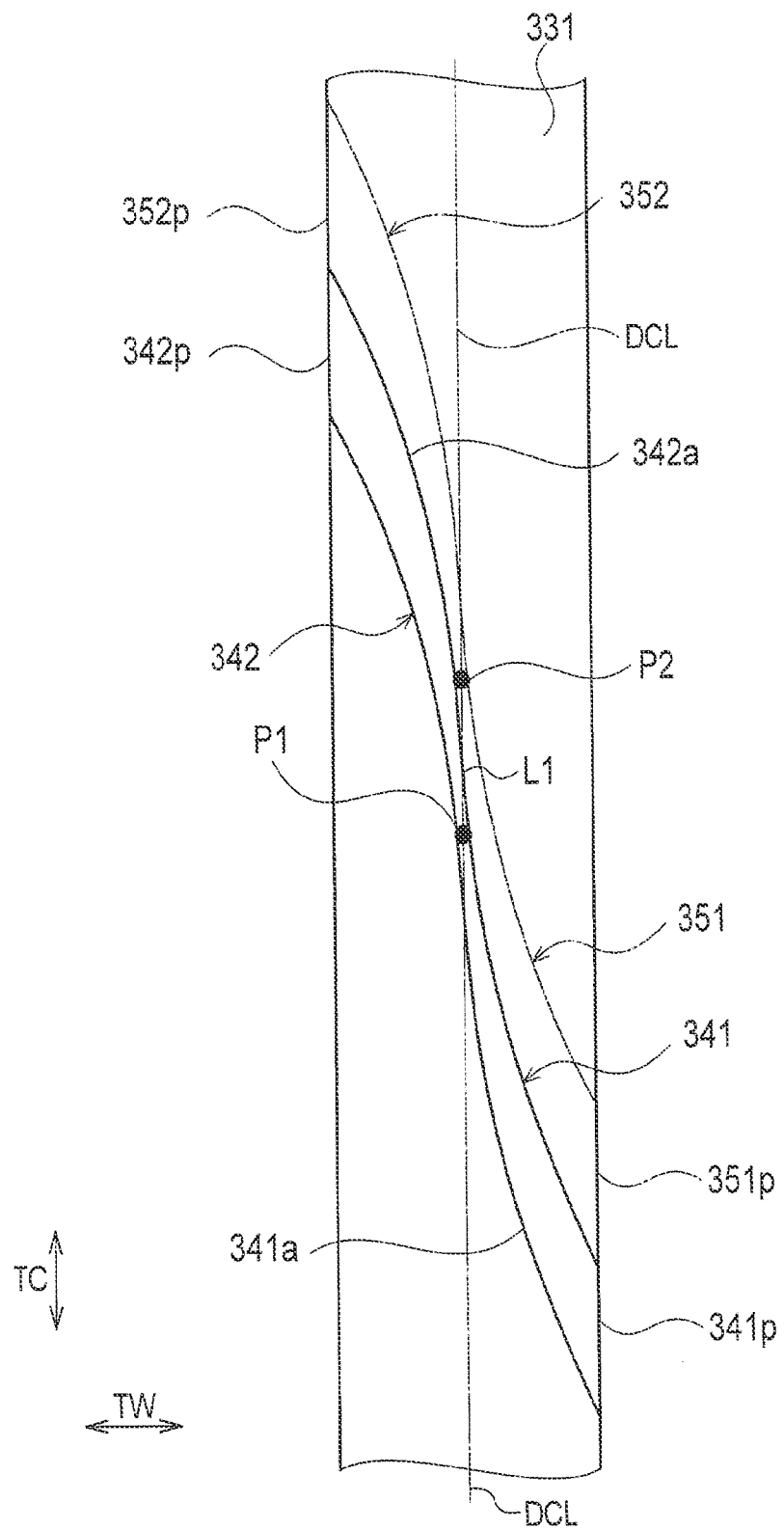
FIG. 30 is an enlarged schematic view showing the shallow groove portion 340 and a deep groove portion 350.

Next, descriptions are given of the configuration of the aforementioned circumferential grooves 330 with reference to FIGS. 27 to 30. FIG. 28 is a perspective view showing part of the tread contact surface 310 of the pneumatic tire 301 of the embodiment. FIG. 29 includes cross-sectional views of the tread contact surface 310 of the pneumatic tire 301 of the embodiment. Specifically, FIG. 29(a) is a cross-sectional view (cross-sectional view taken along the line A-A in FIG. 27) showing part of the tread contact surface 310 of the pneumatic tire 301. More specifically, FIG. 29(a) is a view of a cross section of the line A-A in FIG. 27 which is taken in a tire radial direction TR, as viewed in a direction of the arrow B in FIG. 27. Moreover, FIG. 29(b) is a schematic view for explaining the shape of shallow groove portions 340. FIG. 30 is an enlarged schematic view showing the shallow groove portion 340 and a deep groove portion 350.

As shown in FIGS. 27 to 30, among the circumferential grooves 330, the circumferential groove 331 and the circumferential groove 333 include the shallow groove portions 340 forming a first groove portion and the deep groove portions 350 forming a second groove portion. In other words, the shallow groove portions 340 and the deep groove portions 350 are formed in at least one of the circumferential grooves. Note that, since the configuration of the circumferential groove 331 and the configuration of the circumferential groove 333 are identical, only the circumferential groove 331 is shown in FIGS. 29 and 30 and the description of the circumferential groove 333 is omitted.

The shallow groove portions 340 extend in the tread width direction TW. Specifically, the shallow groove portions 340 extend to curve in the tread width direction TW in the tread-contact-surface view. The shallow groove portions 340 have a shape which becomes narrower in the tread width direction TW toward the inner side in the tire radial direction. Specifically, as shown in FIG. 29, in the view of the cross section A-A as viewed in the direction of the arrow B, each shallow groove portion 340 has such a curved shape that the shallow groove portion 340 gradually becomes narrower in the tread width direction TW toward the inner side in the tire radial direction. In other words, the sidewalls 340a of the shallow groove portion 340 each have a shape like a half-moon recessed inward in the tire radial direction TR in the view of the cross section A-A as viewed in the direction of the arrow B. As shown in FIG. 29(b), the sidewalls 340a of at least each of the shallow groove portions 340 among the shallow groove portions 340 and the deep groove portions 350 are inclined such that a distance CP between each sidewall 340a and a corresponding one of straight lines PL becomes longer toward a deepest portion 340b of the shallow groove portion 340. Note that, in the view of the cross section A-A as viewed in the direction of the arrow B, the straight lines PL are straight lines which pass through end portions of the land portion 321 and the land portion 322 on sides close to the circumferential groove 331, respectively, and which are almost parallel to a tire equator line CL. Each shallow groove portion 340 is formed of an inner shallow groove 341 and an outer shallow groove 342.

The inner shallow groove 341 is located closer to the tire equator line CL than a groove center line DCL is, the groove center line DCL passing through the center of the circumferential groove 331 in the tread width direction TW. The outer shallow groove 342 is continuous with the inner shallow groove 341 and is located more outwardly in the tread width direction TW than the groove center line DCL. The inner shallow groove 341 and the outer shallow groove 342 are curved to be opposite to each other in the tire circumferential direction TC. Specifically, as shown in FIG. 30, an outward protruding portion 341a protruding due to the curving of the inner shallow groove 341 and an outward protruding portion 342a protruding due to the curving of the outer shallow groove 342 are each located on a side close to the groove center line DCL. In other words, the inner shallow groove 341 and the outer shallow groove 342 are provided to be point symmetric to each other with respect to a center point P1 of the shallow groove portion 340 which is located on the groove center line DCL. Moreover, an end portion 341p of the inner shallow groove 341 on a side close to the land portion 322 and an end portion 342p of the outer shallow groove 342 on a side close to the land portion 321 are disposed to be offset from each other in the tire circumferential direction TC.

The deep groove portions 350 are adjacent to the shallow groove portions 340 in the tire circumferential direction TC, respectively, and extend in the tread width direction TW. Specifically, the shallow groove portions 340 and the deep groove portions 350 are alternately formed in the tire circumferential direction TC. The deep groove portions 350 extend to curve in the thread width direction TW in a tread surface view. The area of the deep groove portions 350 in the tread surface view is equal to or larger than the area of the shallow groove portions 340 in the tread surface view. Specifically, the area of the deep groove portions 350 in the tread surface view is 50% to 90% of the area of the circumferential groove 331 in the tread surface view.

The deep groove portions 350 are recessed more inwardly in the tire radial direction TR than the shallow groove portions 340 with groove bottoms 340c of the shallow groove portions 340 being upper ends of the deep groove portions 350. The deep groove portions 350 have a more rectangular shape than the shallow groove portions 340 in the view of the cross section A-A as viewed in the direction of the arrow B. Specifically, in the view of the cross section A-A as viewed in the direction of the arrow B, a greatest width W of each deep groove portion 350 in the tread width direction TW is larger than a greatest depth D of the deep groove portion 350 in the tire radial direction TR.

Each deep groove portion 350 includes side wall portions 350a and a groove bottom portion 350b. Each of the side wall portions 350a of the deep groove portion 350 is a side portion of the land portion 321 or a side portion of the land portion 322 and is provided linearly in the tire radial direction TR. The groove bottom portion 350b of the deep groove portion 350 is continuous with the side wall portions 350a, has the deepest portion of the deep groove portion 350 in the radial direction TR, and is provided to have an almost linear shape extending in the tire width direction TW. Boarders between the sidewalls 350a and the groove bottom 350b are formed to have a curved shape in the view of the cross section A-A as viewed in the direction of the arrow B. Each deep groove portion 350 is formed of an inner deep groove 351 and an outer deep groove 352.

The inner deep groove 351 is located closer to the tire equator line CL than the groove center line DCL is. The outer deep groove 352 is continuous with the inner deep groove 351 and is located more outwardly in the tread width direction TW than the groove center line DCL. The inner deep groove 351 and the outer deep groove 352 are curved to be opposite to each other in the tire circumferential direction TC. Specifically, as shown in FIG. 30, an outward protruding portion 351*a* protruding due to the curving of the inner deep groove 351 and an outward protruding portion 352*a* protruding due to the curving of the outer deep groove 352 are each located on a side close to the groove center line DCL. In other words, the inner deep groove 351 and the outer deep groove 352 are provided to be point symmetric to each other with respect to a center point P2 of the deep groove portion 350 which is located on the groove center line DCL. Moreover, an end portion 351*p* of the inner deep groove 351 on a side close to the land portion 322 and an end portion 352*p* of the outer deep groove 352 on a side close to the land portion 321 are disposed to be offset from each other in the tire circumferential direction TC.

(3) Modified Examples

Next, modified examples of the tread contact surface 310 of the pneumatic tire 301 of the aforementioned embodiment are described with reference to the drawings. Note that portions which are the same as those of the tread contact surface 310 of the pneumatic tire 301 of the aforementioned embodiment are denoted by the same reference numerals and portions which are different are mainly described.

(3-1) Modified Example 1

Figure 31:
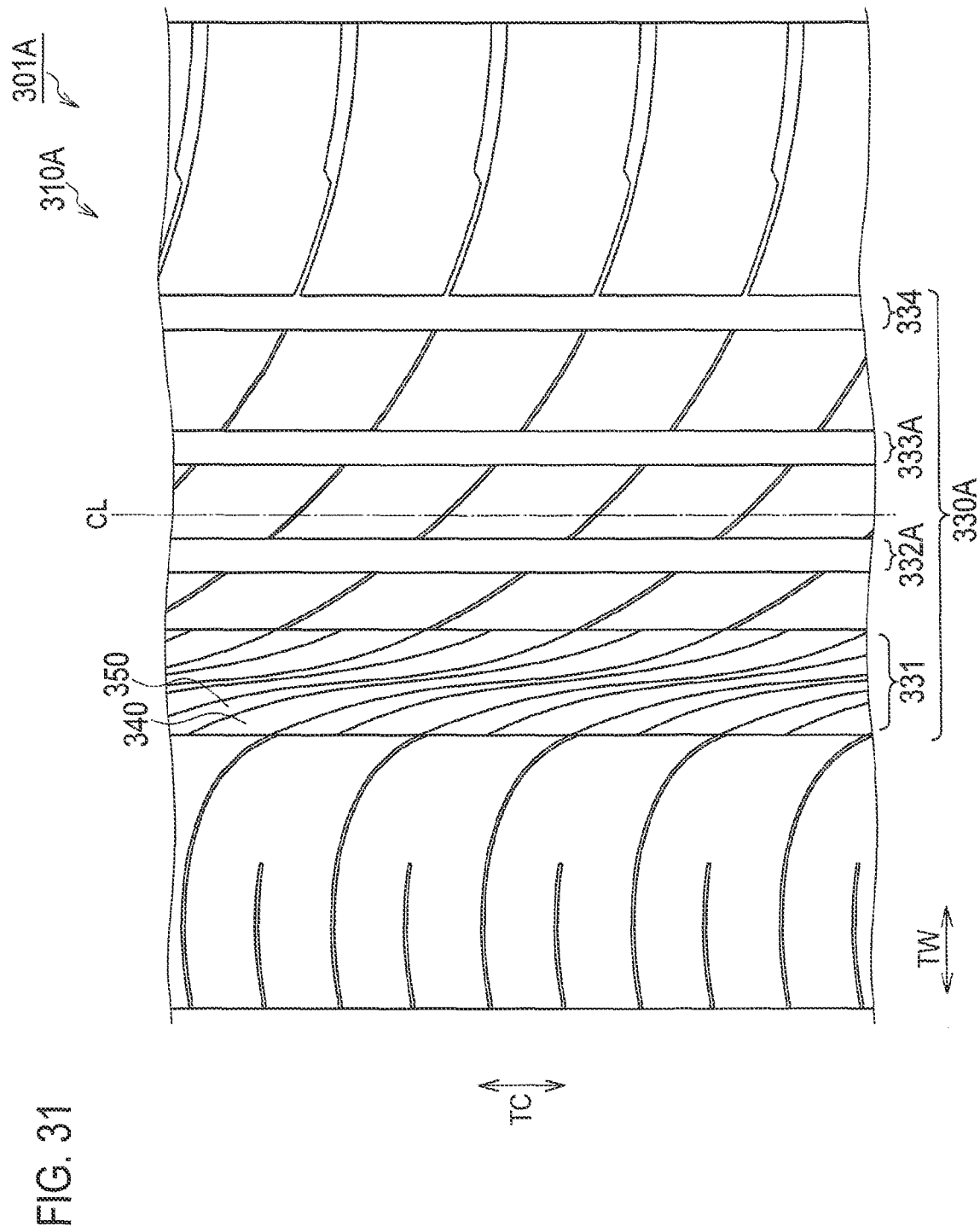
FIG. 31 is a developed view showing part of the tread contact surface 310A of the pneumatic tire 301A of Modified Example 1.
Figure 32:
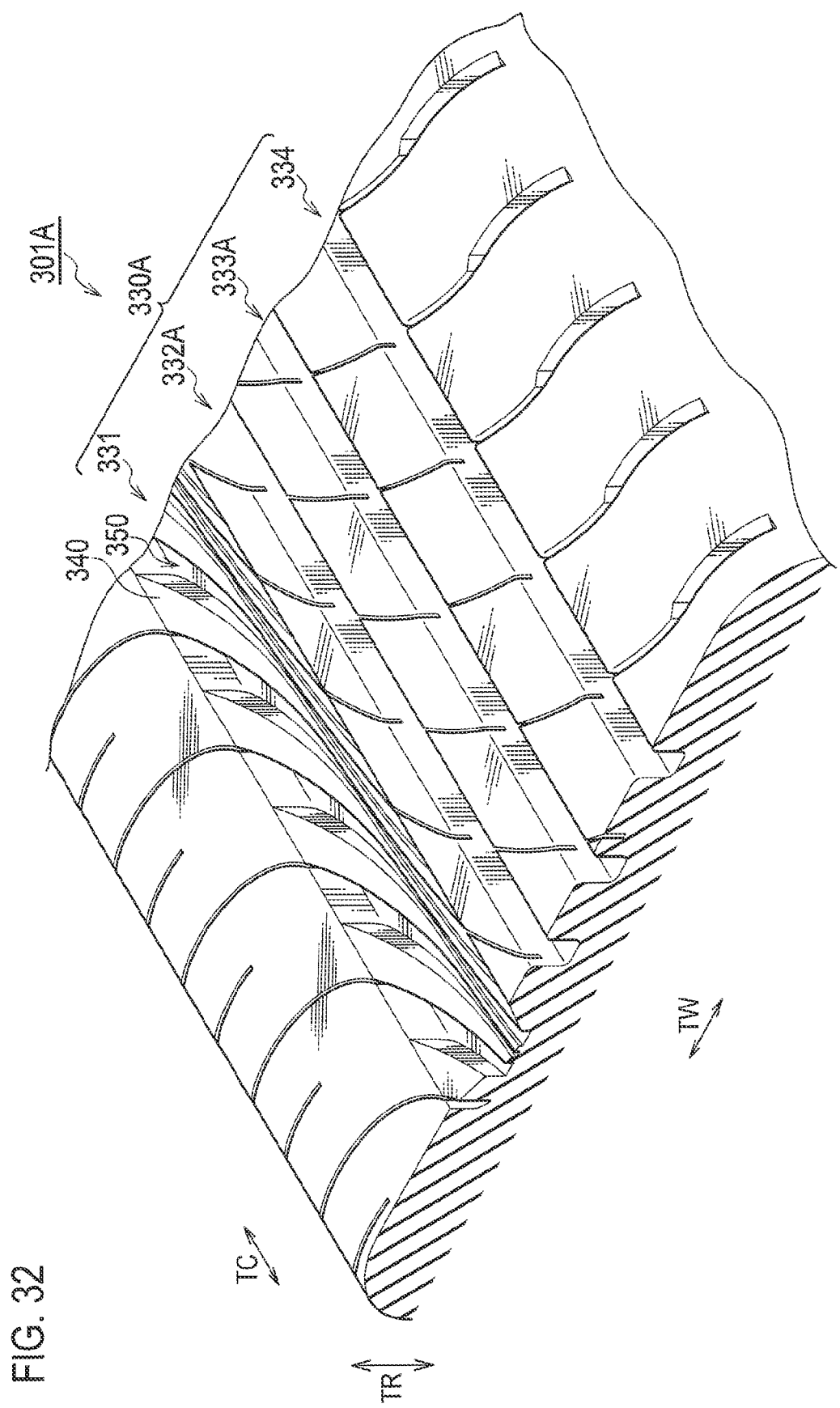
FIG. 32 is a perspective view showing part of the tread contact surface 310A of the pneumatic tire 301A of Modified Example 1.

First, a configuration of a tread contact surface 310A of a pneumatic tire 301A of Modified Example 1 is described with reference to the drawings. FIG. 31 is a developed view showing part of the tread contact surface 310A of the pneumatic tire 301A of Modified Example 1. FIG. 32 is a perspective view showing part of the tread contact surface 310A of the pneumatic tire 301A of Modified Example 1.

In the aforementioned embodiment, the shallow groove portions 340 and the deep groove portions 350 are provided in the two circumferential grooves (circumferential groove 331 and circumferential groove 333). Meanwhile in Modified Example 1, as shown in FIGS. 31 and 32, the shallow groove portions 340 and the deep groove portions 350 are provided in a single circumferential groove.

Specifically, the shallow groove portions 340 and the deep groove portions 350 are provided only in the circumferential groove 331 located leftmost with respect to the tire equator line CL. In Modified Example 1, circumferential grooves 330A include four circumferential grooves. Specifically, the circumferential grooves 330A include the circumferential groove 331, a circumferential groove 332A, a circumferential groove 333A, and the circumferential groove 334.

The number of circumferential grooves 330 and the configuration (the shapes, the number, and the like) of the auxiliary lateral grooves are not limited to the ones described in the embodiment and can be selected appropriately depending on a purpose.

Moreover, the shallow groove portions 340 and the deep groove portions 350 are not necessarily provided only in the circumferential groove 331 located leftmost with respect to the tire equator line CL and may be provided, for example, only in the circumferential groove 332A and the circumferential groove 333A located near the tire equator line CL or only in the circumferential groove 334 located rightmost with respect to the tire equator line CL.

(3-2) Modified Example 2

Figure 33:
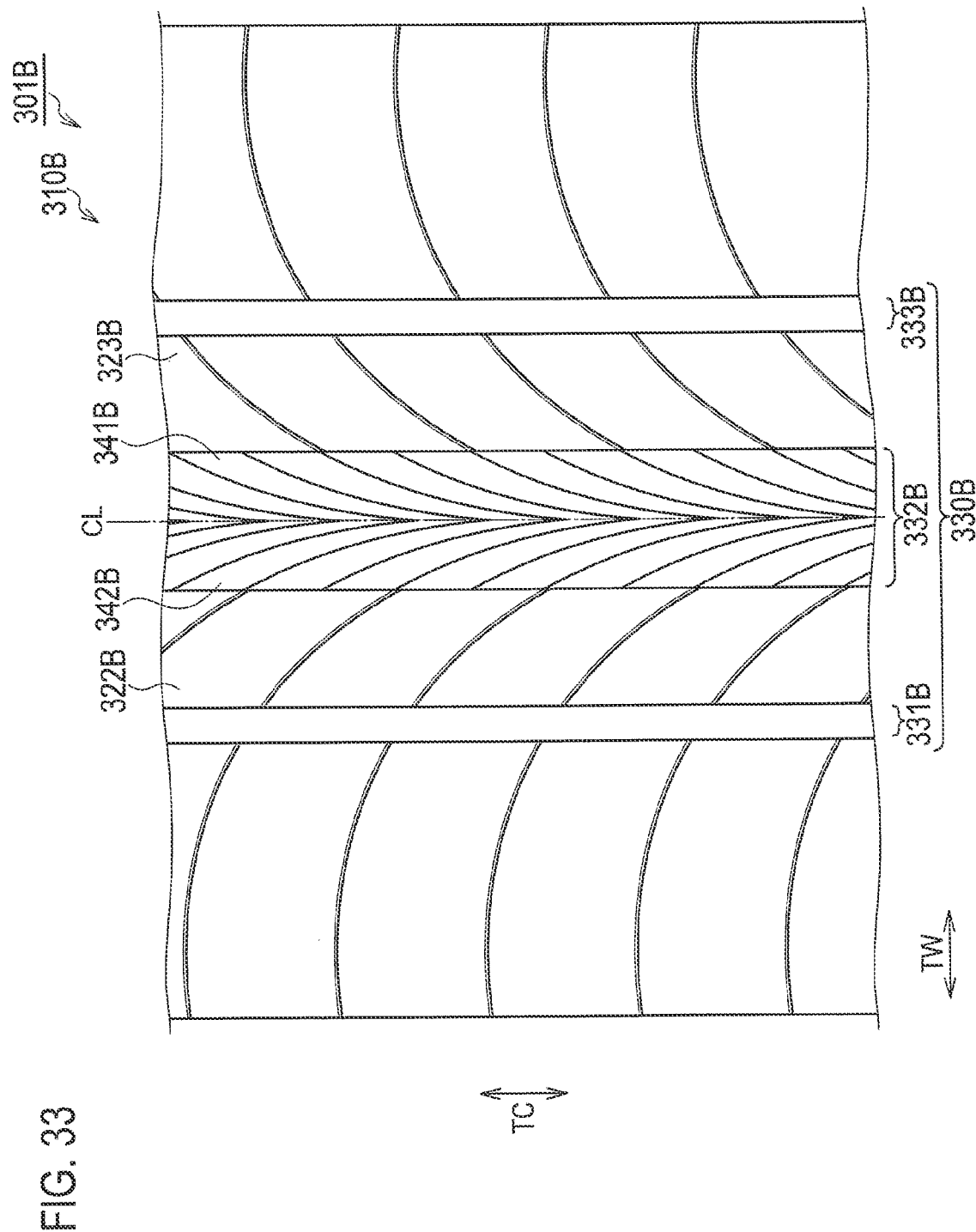
FIG. 33 is a developed view showing part of the tread contact surface 310B of the pneumatic tire 301B of Modified Example 2.
Figure 34:
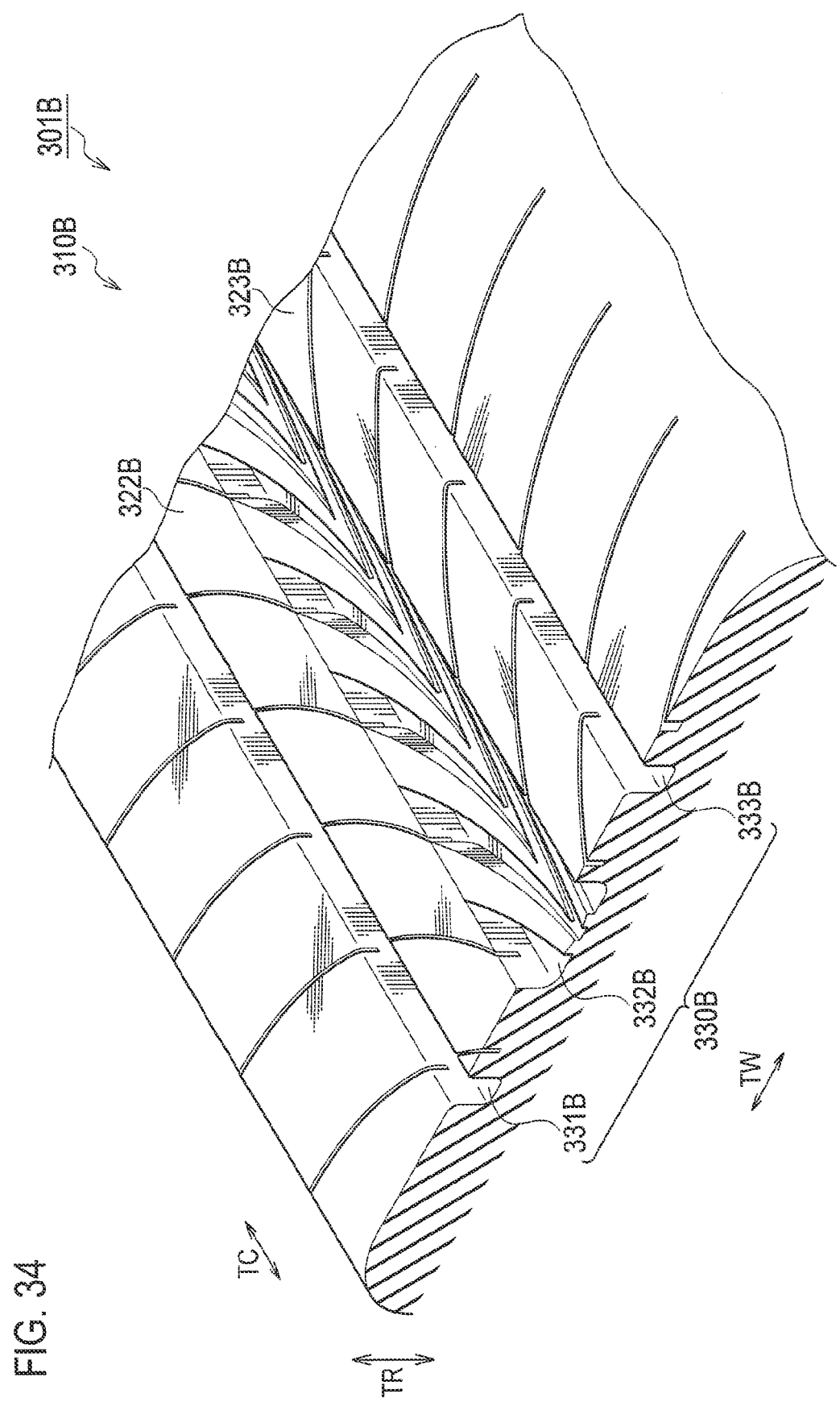
FIG. 34 is a perspective view showing part of the tread contact surface 310B of the pneumatic tire 301B of Modified Example 2.

Next, a configuration of a tread contact surface 310B of a pneumatic tire 301B of Modified Example 2 is described with reference to the drawings. FIG. 33 is a developed view showing part of the tread contact surface 310B of the pneumatic tire 301B of Modified Example 2. FIG. 34 is a perspective view showing part of the tread contact surface 310B of the pneumatic tire 301B of Modified Example 2.

In the aforementioned embodiment, the end portion 341*p* of each inner shallow groove 341 on the side close to the land portion 322 and the end portion 342*p* of the corresponding outer shallow groove 342 on the side close to the land portion 321 are disposed to be offset from each other in the tire circumferential direction TC. Moreover, in the embodiment, the end portion 351*p* of each inner deep groove 351 on the side close to the land portion 322 and the end portion 352*p* of the corresponding outer deep groove 352 on the side close to the land portion 321 are disposed to be offset from each other in the tire circumferential direction TC.

Meanwhile in Modified Example 2, as shown in FIGS. 33 and 34, the end portion 341*p* of each inner shallow grooves 341 on the side close to the land portion 322 and the end portion 342*p* of a corresponding one of outer shallow grooves 342B on the side close to the land portion 321 are disposed at positions which are the same in the tire circumferential direction TC. In other words, the inner shallow grooves 341 and the outer shallow grooves 342B are located to be line symmetric to each other with respect to the tire equator line CL.

Similarly, the end portion 351*p* of each inner deep groove 351 on the side close to the land portion 322 and the end portion 351*p* of a corresponding one of outer deep grooves 352B on the side close to the land portion 322 are curved in the same direction with respect to the tire circumferential direction TC. Moreover, the inner deep grooves 351 and the outer deep grooves 352B are located to be line symmetric to each other with respect to the tire equator line CL.

In FIGS. 33 and 34, the circumferential grooves 330B include a circumferential groove 331B, circumferential groove 332B, and circumferential groove 333B. Moreover, the shallow groove portions 340 and the deep groove portions 350 are formed only in the circumferential groove 332 located on the tire equator line CL.

Note that the number of circumferential grooves 330 and the configuration (the shapes, the number, and the like) of auxiliary lateral grooves are not limited to the ones described in the embodiment and can be selected appropriately depending on a purpose.

Furthermore, the shallow groove portions 340 and the deep groove portions 350 are not necessary formed only in the circumferential groove 332 located on the tire equator line CL and may be formed, for example, only in the circumferential groove 331 located leftmost with respect to the tire equator line CL or only in the circumferential groove 333 located rightmost with respect to the tire equator line CL.

(4) Comparative Evaluations

Next, descriptions are given of comparative evaluations performed using pneumatic tires of a comparative example and an example described below to further clarify the effects of the present invention. Specifically, (4-1) configurations of respective pneumatic tires and (4-2) evaluation results are described. Note that the present invention is not limited by these examples.

(4-1) Configurations of Respective Pneumatic Tires

Brief descriptions are given of the pneumatic tires of the comparative example and the example. Data on the pneumatic tires was measured under the following condition.
Tire size: 225/45R17
Rim size: 7J-17
Vehicle condition: Japanese FF car (displacement of 2000 cc)
Inflation pressure condition: Standard inflation pressure
Load condition: Load of the driver+600 N In the pneumatic tire of the comparative example, no shallow groove portions 340 or deep groove portions 350 described in the embodiment are formed in circumferential grooves. Moreover, auxiliary lateral grooves communicating with circumferential grooves are formed in land portions. The width of these auxiliary lateral grooves is larger than the width of the auxiliary lateral grooves described in the embodiment.

Meanwhile, in the pneumatic tire of the example, the shallow groove portions 340 and the deep groove portions 350 are formed in the circumferential groove 330. It is assumed that the pneumatic tires of the comparative example and the example each have the tread pattern shown in the modified example of the embodiment described above, as shown in FIGS. 31 and 32. The pneumatic tires of the comparative example and the example are the same except for the configuration of circumferential grooves and the configuration of auxiliary lateral grooves.

(4-2) Evaluation Results

Next, descriptions are given of evaluation results on braking performances of vehicles fitted with the respective types of tires, with reference to FIG. 39.

(4-2-1) Braking Performance Evaluation

The braking performances were evaluated as follows. An index of "100" is assigned to a distance (deceleration speed) at which the vehicle fitted with the pneumatic tires of the comparative example took to stop from a speed of 80 km/h by application of full brake on a test course having a water depth of 2 mm and a deceleration speed of the vehicle fitted with the pneumatic tires of the example was evaluated by measuring a distance. A larger index means a better braking performance.

The evaluations were made for the respective types of pneumatic tires when the tires were brand new and when the tires were worn. Note that such tires that the lengths of the circumferential grooves in the tire radial direction are worn by 50% were used as the worn tires.

As a result, as shown in FIG. 39, it was found that the braking performance of the vehicle fitted with the pneumatic tires of the example was a better than the braking performance of the vehicle fitted with the pneumatic tires of the comparative example.

(5) Operations and Effects

In the pneumatic tire 301, the shallow groove portions 340 of the circumferential groove 331 are formed between the land portion 321 and the land portion 322 and have the shape which becomes narrower in the tread width direction TW toward the inner side in the tire radial direction TR. Specifically, the land portion 321 and the land portion 322 each have a shape which becomes wider in the tread width direction TW toward the inner side in the tire radial direction TR. Accordingly, the stiffness of the land portion 321 and the land portion 322 in the tread width direction TW can be improved by the shallow groove portion 340. This suppresses occurrence of buckling near the circumferential groove 331 and can thereby suppress occurrence of crack in the circumferential groove 331 which is caused by the buckling.

Moreover, in the conventional pneumatic tire, although it is conceivable to reinforce the wall surfaces and the groove bottom portions of the circumferential grooves to suppress occurrence of buckling, such reinforcement may increase the weight of tire. Meanwhile, in the pneumatic tire 301, the deep groove portions 350 is recessed to the inner side in the tire radial direction TR than the shallow groove portions 340 with the bottom portions 340c of the shallow groove portions 340 being the upper ends of the deep groove portions 350. Thus, the volume of the tire is reduced and the weight of tire is thereby effectively reduced.

Accordingly, in the pneumatic tire 301, occurrence of crack in the circumferential grooves 330 which is caused by buckling can be suppressed with an increase in the weight of tire being suppressed.

In the embodiment, the area of the deep groove portions 350 in the tread surface view is equal to or larger than the area of the shallow groove portions 340 in the tread surface view. In other words, the region of the deep groove portions 350 recessed more inwardly in the tire radial direction TR than the shallow groove portions 340 is increased in the tread surface view. Accordingly, the volume of the circumferential groove 330 is further increased. Thus, the weight of tire is further reduced.

In the embodiment, the greatest width W of each deep groove portion 350 in the tread width direction TW is larger than the greatest depth D of the deep groove portion 350 in the tire radial direction TR. Accordingly, occurrence of buckling is suppressed by securing the thickness of rubber in the tire radial direction TR while an increase in the weight of tire can be suppressed by securing the volume of the circumferential groove 330.

In the embodiment, the shallow groove portions 340 and the deep groove portions 350 are alternately formed in the tire circumferential direction TC. Accordingly, the shallow groove portions 340 can effectively reinforce the land portion 321 and the land portion 322 in the tire circumferential direction TC.

In the embodiment, the deep groove portions 350 have a more rectangular shape than the shallow groove portions 340 in the view of the cross section A-A as viewed in the direction of the arrow B. Accordingly, the distances from the shallow groove portions 340 and the deep groove portions 350 to the road surface become smaller as the wear progresses, and the edge component provided by the shallow groove portions 340 and the deep groove portions 350 gradually increases. This allows a more stable braking performance to be exerted from the initial stage of wear to the time after the certain amount of wear, for example, until the depth D in the tire radial direction TR is reduced by 50%.

In the embodiment, the deep groove portions 350 are recessed more inwardly in the tire radial direction TR than the shallow groove portions 340 with the groove bottoms 340c of the shallow groove portions 340 being the upper ends of the deep groove portions 350. This increases the volume of the circumferential grooves 330 compared to the case where protrusions protruding outward in the tire radial direction TR are formed in the circumferential grooves 330 with the groove bottoms 340c of the shallow groove portions 340 being lower ends of the protrusions. Hence, the drainage can be further improved.

In the embodiment, lines extending along the side walls of land portion 321 and the land portion 322 extend in the tire radial direction. Accordingly, an increase in the weight of tire can be suppressed without the stiffness of the land portion 321 and the land portion 322 being reduced. Moreover, lines extending along the groove bottom portions of the deep groove portions 350 extend in the tread width direction. Accordingly, the edge component can be effectively increased and occurrence of buckling can be suppressed.

(6) Other Embodiments

As described above, the contents of the present invention are disclosed through the embodiment of the present invention. However, the descriptions and drawings forming part of this disclosure should not be understood to limit the present invention. Various alternative modes, embodiments, and operation techniques are made obvious to those skilled in the art from the disclosure.

For example, the embodiment of the present invention can be modified as follows. Specifically, in the aforementioned embodiment, the tire is the pneumatic tire 301 filled with air or a nitrogen gas. However, the tire is not limited to this and may be a solid tire filled with no air or nitrogen gas.

Figure 35:
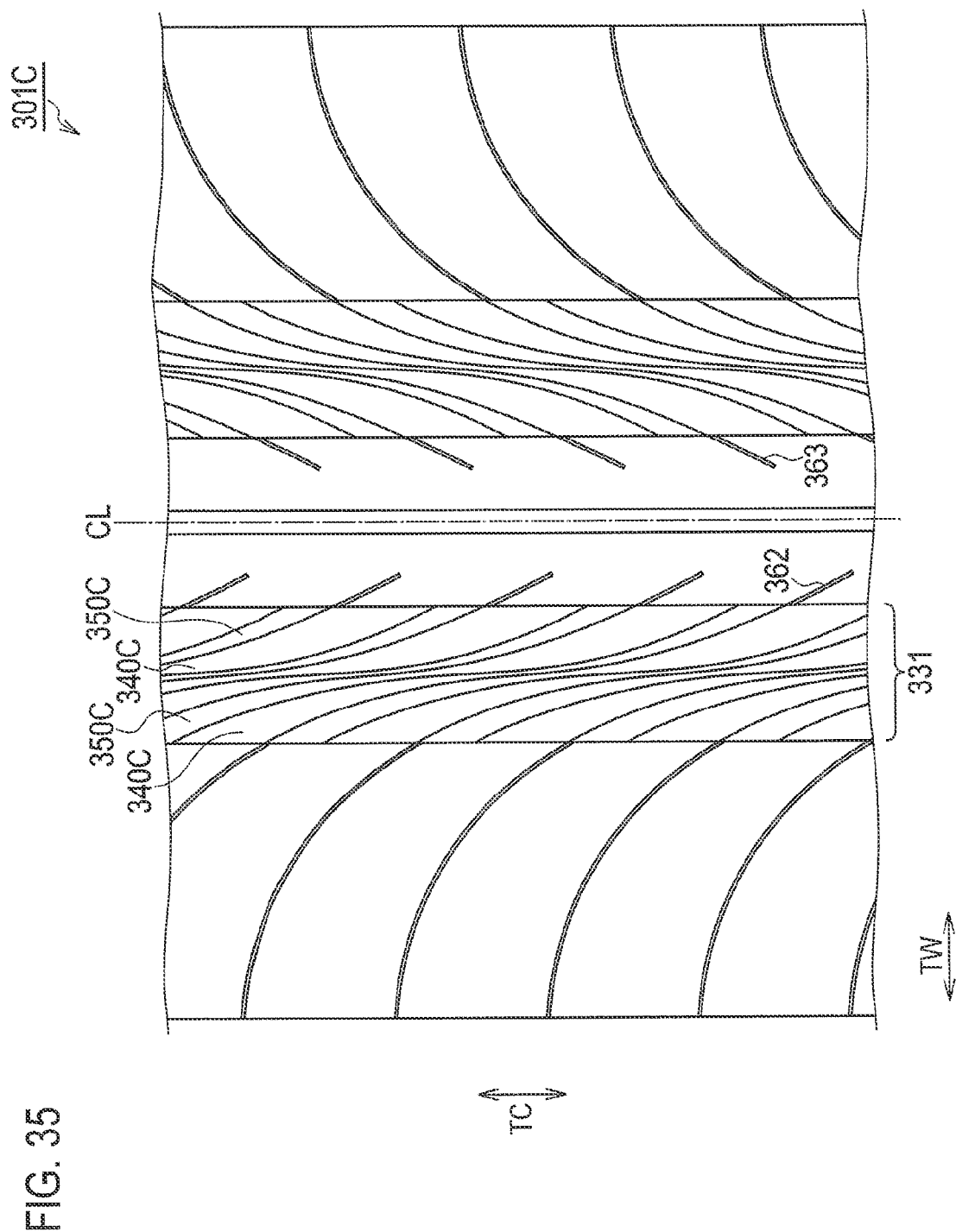
FIG. 35 is a developed view showing part of the tread contact surface 310C of the pneumatic tire 301C of other embodiments.

Moreover, in the aforementioned embodiment, the area of the deep groove portions 350 in the tread surface view is equal to or larger than the area of the shallow groove portions 340 in the tread surface view. However, the configuration is not limited to this and, for example as shown in FIG. 35, the area of shallow groove portions 340C forming the first groove portion in the tread surface view may be equal to or larger than the area of deep groove portions 350C forming the second groove portion in the tread surface view. This increases regions where the shallow groove portions 340C reinforce the land portion 321 and the land portion 322. Accordingly, occurrence of buckling is further suppressed.

Moreover, instead of setting the proportion of the area of the shallow groove portions 340C in the tread surface view to the area of the deep groove portions 350C to be the same on an outer side and an inner side of the tire equator line CL, it may be set such that, for example, the area of the deep groove portions is increased on the outer side of the tire equator line CL and the area of the shallow groove portions is increased on the inner side of the tire equator line CL, the outer side and the inner side being those in the state where the tire is fitted.

Moreover, in the aforementioned embodiment, the sidewalls 340a of the shallow groove portion 340 each have a shape like a half-moon in the view of the cross section A-A as viewed in the direction of the arrow B. However, the shape is not limited to this and the sidewalls 340a may have, for example, a shape extending linearly to the deepest portion 340b respectively from both ends of the shallow groove portion 340 in the tread width direction TW in the view of the cross section A-A as viewed in the direction of the arrow B. Moreover, the sidewalls 340a of the shallow groove portions 340 may each have such a shape that a portion of the sidewall 340a is formed as a curved portion and other portions extend almost linearly in the view of the cross section A-A as viewed in the direction of the arrow B.

As described above, the present invention includes various embodiments which are not described herein as a matter of course. Accordingly, the technical scope of the present invention should be determined only by the matters to define the invention in the scope of claims regarded as appropriate based on the above descriptions.

The entire contents of Japanese Patent Application No. 2009-263284 (filed on Nov. 18, 2009), Japanese Patent Application No. 2009-276252 (filed on Dec. 4, 2009), and Japanese Patent Application No. 2009-276254 (filed on Dec. 4, 2009) are incorporated in the description of the present application by reference.

INDUSTRIAL APPLICABILITY

As described above, the tires of the present invention can exert a more stable braking performance from the initial stage of wear to the time after the certain amount of wear and are thereby useful in radio communication such as mobile communication. Moreover, when the circumferential grooves are formed in the tread, in the tires of the present invention, deterioration in braking performance and the like which is caused by buckling can be suppressed with the drainage being secured. Thus, the present invention is useful in tires used in vehicles and the like. Moreover, in the tires of the present invention, an increase in manufacturing cost due to the metal mold cost is suppressed while occurrence of tire noise caused by traveling of a vehicle is suppressed and the braking performance is improved. Thus, the present invention is useful in tires used for vehicles and the like. Moreover, in the tires of the present invention, occurrence of crack in the circumferential grooves which is caused by buckling can be suppressed with an increase in the weight of tire being suppressed. Thus, the present invention is useful in tires used for vehicles and the like.

The invention claimed is:

1. A tire comprising a plurality of rib-shaped land portions extending in a tire circumferential direction, the tire having a circumferential groove formed which is adjacent to the land portions and which extends in the tire circumferential direction, wherein the circumferential groove includes:

a first groove portion formed between adjacent ones of the land portions; and a second groove portion being adjacent to the first groove portion in the tire circumferential direction and formed between the adjacent land portions, the first groove portion has a shape which becomes narrower in the tread width direction toward an inner side in a tire radial direction, and the second groove portion is formed of: side walls located respectively on both sides in the tread width direction and extending in the tire radial direction; and a groove bottom continuous with the side walls and extending in the tread width direction, and the second groove portion is recessed more inwardly in the tire radial direction than the first groove portion with a groove bottom of the first groove portion being an upper end of the second groove portion, wherein the first groove portion is curved such that an angle formed between the first groove portion and the straight line orthogonal to a groove center line of the circumferential groove becomes larger toward the groove center line, and the second groove portion is curved such that an angle formed between the second groove portion and the straight line orthogonal to the groove center line becomes larger toward the groove center line, wherein the first groove portion is formed of a first inner groove and a first outer groove, and the first inner groove and the first outer groove are curved to be opposite to each other in the tire circumferential direction.

2. The tire according to claim 1, wherein
a plurality of the circumferential grooves are formed, and
the first groove portion and the second groove portion are formed in at least one of the circumferential grooves.

3. The tire according to claim 1, wherein an area of the second groove portion in a tread surface view is equal to or larger than an area of the first groove portion in the tread surface view.

4. The tire according to claim 1, wherein a greatest width of the second groove portion in the tread width direction is larger than a greatest depth of the second groove portion in the tire radial direction.

5. The tire according to claim 1, wherein the first groove portion and the second groove portion are alternately formed in the tire circumferential direction.

6. The tire according to claim 1, wherein an area of the first groove portion in a tread surface view is equal to or larger than an area of the second groove portion in the tread surface view.

7. The tire according to claim 1, wherein a width of the first groove portion becomes narrower toward the groove center line, and
a width of the second groove portion becomes narrower toward the groove center line.

8. The tire according to claim 1, wherein an outward protruding portion protruding due to the curving of the first inner groove and an outward protruding portion protruding due to the curving of the first outer groove are each located on a side close to the groove center line.

\* \* \* \* \*